US012306128B2

(12) United States Patent
Alghamdi et al.

(10) Patent No.: US 12,306,128 B2
(45) Date of Patent: May 20, 2025

(54) INTERMITTENCY INERTIAL SENSORS

(71) Applicant: KING FAHD UNIVERSITY OF PETROLEUM AND MINERALS, Dhahran (SA)

(72) Inventors: Majed Saleh Bakheet Alghamdi, Dhahran (SA); Mahmoud Elsayed Khater, Dhahran (SA); Eihab Mohamed Abdel-Rahman, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 160 days.

(21) Appl. No.: 18/085,785

(22) Filed: Dec. 21, 2022

(65) Prior Publication Data
US 2024/0210346 A1 Jun. 27, 2024

(51) Int. Cl.
G01N 27/22 (2006.01)
(52) U.S. Cl.
CPC .................. *G01N 27/226* (2013.01)
(58) Field of Classification Search
CPC .................................................. G01N 27/226
See application file for complete search history.

(56) References Cited

U.S. PATENT DOCUMENTS

| 6,167,748 | B1* | 1/2001 | Britton, Jr. | G01N 27/227 435/7.1 |
| 6,953,977 | B2* | 10/2005 | Mlcak | H10N 30/076 257/421 |
| 8,536,962 | B2* | 9/2013 | Bilhaut | B82Y 15/00 335/78 |
| 2017/0299584 | A1 | 10/2017 | Adams | |

OTHER PUBLICATIONS

Alghamdi ; Electrostatic MEMS Bifurcation Sensors ; University of Waterloo ; 2018 ; 224 Pages.
(Continued)

*Primary Examiner* — Reena Aurora
(74) *Attorney, Agent, or Firm* — Oblon, McClelland, Maier & Neustadt, L.L.P.

(57) ABSTRACT

The present disclosure describes an intermittency-based analyte sensor and a method for using the intermittency-based analyte sensor. The intermittency-based analyte sensor includes a microcantilever, a substrate, a plurality of electrodes, a contact pad and a microcontroller. The microcantilever has a micromechanical beam having has a fixed end and a free end. The substrate is connected to the fixed end of the micromechanical beam. The plurality of electrodes are configured to connect to a biased source of alternating voltage. The frequency of the alternating voltage is in a frequency range which generates intermittencies in a motion of the free end. The microcontroller monitors a frequency response of the micromechanical beam; compares the frequency response to a calibration curve, and provides an alert that an analyte has deposited on the surface of the micromechanical beam when the frequency response is less than a calibrated frequency response.

19 Claims, 44 Drawing Sheets

(56) References Cited

OTHER PUBLICATIONS

Seleim, et al. ; Dynamics of a Close-Loop Controlled MEMS Resonator ; Mechanical Engineering Faculty Scholarship ; 2012 ; 27 Pages.
Kim, et al. ; Determination of Fluid Density and Viscosity by Analyzing Flexural Wave Propagations on the Vibrating Micro-Cantilever ; MDPI Sensors ; Oct. 27, 2017 ; 10 Pages.
Al-Ghamdi, et al. ; Aqueous Media Electrostatic MEMS Sensors ; Transducers 2019—Eurosensors XXXIII ; 4 Pages.

* cited by examiner

INTERMITTENCY INERTIAL SENSORS

BACKGROUND

Technical Field

The present disclosure is directed to intermittency-based sensors.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Sensors are used in a wide range of fields, such as the automotive, chemical, medical, biological, safety, aviation, and telecommunication sectors. Some sensors use chip-based technology, an example of which is a micro-electro-mechanical system (MEMS). A MEMS sensor detects an environmental change and translates it into an electrical signal. After an extended period of time and based on the usage and working environment, some changes in the properties of the MEMS sensor may occur, which may lead to inaccurate readings, thereby resulting in critical problems related to the working of a system attached to the sensor. For example, when MEMS sensors are deployed in devices or systems that require corresponding actuators to induce a larger range of movement or motion, nonlinearity may be introduced in the MEMS sensors. The nonlinearity can result in inaccurate results or inaccurate conclusions or can lead to substantial errors in devices or system dependent on it. Other sources of nonlinearity in MEMS sensors include dependence of the electrostatic force on displacement, geometric and inertial nonlinearities, and nonlinear damping mechanisms. The nonlinearity results in static and dynamic bifurcations, unpredictable measurement values and chaos.

In conventional techniques, an inertial sensor is used to detect a change in the MEMS sensor by observing sensor mass and/or stiffness. A physical phenomena or chemical reactions change the sensor mass, the mass of a detector material attached to the MEMS sensor, and/or the sensor stiffness. The conventional inertial sensor measures changes in the mass of the sensor as a shift in a resonant frequency or a change in the size of the periodic response. In another conventional technique, atomic force microscopy (AFM) is a method of measuring surface topography on a scale typically from a few angstroms or less to a hundred micrometers or more. A flexible AFM cantilever is used in AFM for surface scanning and for chemical, biological, and other sensing applications. In AFM, a sample is imaged by a probe suspended from one end of the microcantilever. A surface is probed using the suspended probe, and the interaction between the suspended probe and sample is measured.

In some conventional techniques, lasers have been used to detect frequency changes of a microcantilever oscillated by a piezoelectric transducer. The oscillation frequency changes are detected by a center-crossing photodiode that responds to a laser diode beam reflected from the microcantilever surface, resulting in an output frequency from the photodiode that is synchronous with the microcantilever frequency. (See: Alghamdi, M., "Electrostatic MEMS Bifurcation Sensors" published in UWSpace Home, University of Waterloo, on Aug. 24, 2018), which is incorporated herein by reference in its entirety. These techniques typically require external lighting for sample illumination and setup and are not very compact because of the long optical path, a need to have the photodetector at an ample distance from the sample, and constrained viewing and positioning systems for optical alignment.

Accordingly, it is one object of the present disclosure to provide an intermittency-based sensor that is configured to detect changes in frequency domains where intermittency appears, using capacitance based sensing, wherein the intermittency-based sensor is constructed around these detected frequency domains.

SUMMARY

In an exemplary embodiment, an intermittency-based analyte sensor is described. The intermittency-based analyte sensor includes a microcantilever having a micromechanical beam, wherein the micromechanical beam has a fixed end and a free end, a substrate connected to the fixed end of the micromechanical beam, wherein the substrate is shaped to have a depressed area which forms a gap below the micromechanical beam between the fixed end and the free end, and a plurality of electrodes arranged in the substrate below or beside the micromechanical beam, wherein the plurality of electrodes are configured to connect to a biased source of alternating voltage, wherein the frequency of the alternating voltage is in a frequency range which generates intermittencies in a motion of the free end, a contact pad connected to the fixed end, and a microcontroller configured to: monitor a frequency response of the micromechanical beam, in the frequency range of the alternating voltage which generates intermittencies, over at least 10,000 cycles, compare the frequency response to a calibration curve, and provide an alert that an analyte has deposited on the surface of the micromechanical beam when the frequency response is less than a calibrated frequency response in the frequency range of the alternating voltage which generates intermittencies in the motion of the free end.

In another exemplary embodiment, a method for using an intermittency-based analyte sensor is described. The method includes applying, with a function generator, an alternating current to a plurality of electrodes located in a substrate below a micromechanical beam of a microcantilever, wherein the microcantilever has a fixed end connected to the substrate and a free end, wherein the frequency of the alternating voltage is in a frequency range which generates intermittencies in a motion of the free end. The method includes applying, with a voltage supply, a bias voltage to the plurality of electrodes. The method further includes monitoring, with a microcontroller, at a contact pad located beneath the fixed end, a frequency response of the micromechanical beam, in the frequency range of the alternating voltage which generates intermittencies, over at least 10,000 cycles. The method further includes comparing, by the microcontroller, the frequency response to a calibration curve. The method further includes providing, by the microcontroller, an alert that an analyte has deposited on the surface of the micromechanical beam when the frequency response is less than a calibrated frequency response in the frequency range of the alternating voltage which generates intermittencies in the motion of the free end.

In another exemplary embodiment, a method for calibrating an intermittency based analyte sensor is described. The method includes applying, with a function generator, a first alternating voltage having a first amplitude to a plurality of electrodes located in a substrate below a micromechanical beam of a microcantilever, wherein the microcantilever has a fixed end connected to the substrate and a free end, wherein a first frequency of the first alternating voltage is swept over a first frequency range from five kHz to 90 kHz. The method further includes measuring, with a vibrometer, a first displacement of a tip of the micromechanical beam in response to the first alternating current. The method further includes monitoring, with a CCD video camera, changes in a first frequency response of the free end due to the first alternating current. The method further includes recording, with an oscilloscope, a first velocity of the free end. The method further includes detecting a second frequency range in which intermittencies in the first frequency response are found. The method further includes recording, in a database, a baseline calibration curve of the first amplitude and a baseline phase of a second frequency response in the second frequency range in which the intermittencies are found. The method further includes exposing the intermittency-based analyte sensor to a source of analyte. The method further includes generating a biased alternating current by increasing, with a voltage generator, an amplitude of the first alternating current. The method further includes sweeping, with the function generator, the biased alternating current over a third frequency range from 10 KHz below the second frequency range in which the intermittencies were found to 10 KHz above the second frequency range in which the intermittencies were found. The method further includes measuring, with the vibrometer, a second displacement of a tip of the micromechanical beam in response to the biased alternating current. The method further includes monitoring, with the CCD video camera, changes in the second displacement of the free end due to the biased alternating current. The method further includes recording, with the oscilloscope, a second velocity of the free end. The method further includes detecting a third frequency range in which intermittencies in the second frequency response are found. The method further includes determining a phase of the third frequency range. The method further includes comparing, by a microcontroller connected to the database, the function generator, the source of biased voltage, the vibrometer, the CCD camera and the oscilloscope, the phase of the third frequency range to the phase of the second frequency range. The method further includes generating, by the microcontroller, an analyte calibration curve of the biased amplitude and the phase of the third frequency range. The method further includes providing the third frequency range and the biased amplitude to intermittency based analyte sensor as operating parameters.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
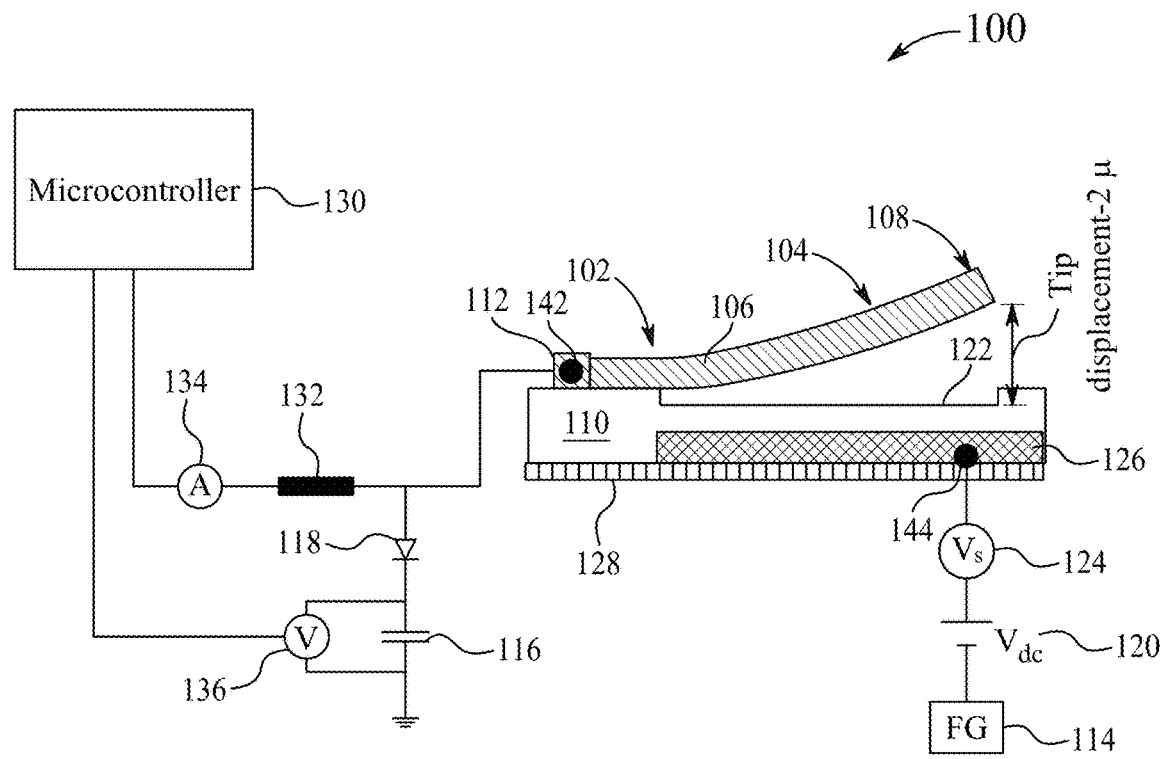
FIG. 1A is an exemplary schematic diagram of an intermittency-based analyte sensor, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to an intermittency-based analyte sensor and a method for using an intermittency-based analyte sensor. The intermittency-based analyte sensor is configured to detect changes in sensor mass, other physical phenomena, or chemical reactions that result in changes to the sensor mass, or the mass of a detector material attached to the sensor. In one aspect, the sensor detects a gas concentration in air, an analyte concentration in liquid, liquid inertial properties, or biological organisms.

The intermittency-based analyte sensor utilizes an aperiodic behavior in the sensor response, known as "an intermittency route to chaos", to achieve higher sensitivity. The present disclosure includes utilizing existing intermittencies to detect subtle (small) variations in the inertial response (due to changes in mass or stiffness of the sensor or the force fields it is immersed in, such as electrostatic or electromagnetic fields, etc.) of the intermittency-based analyte sensor, thereby forming an inertial (gas, mass, biological, chemical) sensor. The change in mass, stiffness, field strength or field distribution may arise naturally or by adding sensitive material to create or enhance that change (attract analyte mass, increase attracted mass, intensify a field).

There are four types of intermittencies that are known: type I, type II, type III, and type IV (switching intermittency). The intermittency-based analyte sensor is configured to use any of the types of intermittencies as a detection mechanism. The present disclosure includes producing a change in the output current or resistance of the intermittency-based sensor in the presence of a target analyte by using any of the four types of intermittencies. Identification of the target analyte is carried out by instrumenting the intermittency-based analyte sensor with a selective sensing material that absorbs or adsorbs the target analyte, resulting in the shifting of the sensor operating point from a periodic response to a point within the intermittency and an output current (or resistance) change. The shift in the operating point and the resulting change in output current (or resistance) are commensurate with the target analyte's concentration, resulting in a change in current (or resistance) that can be used to estimate the target analyte's concentration. Each combination of a target analyte, sensing material, and intermittency results in a calibration curve that relates a change in output current (resistance) to the target analyte's concentration.

Figure 1B:
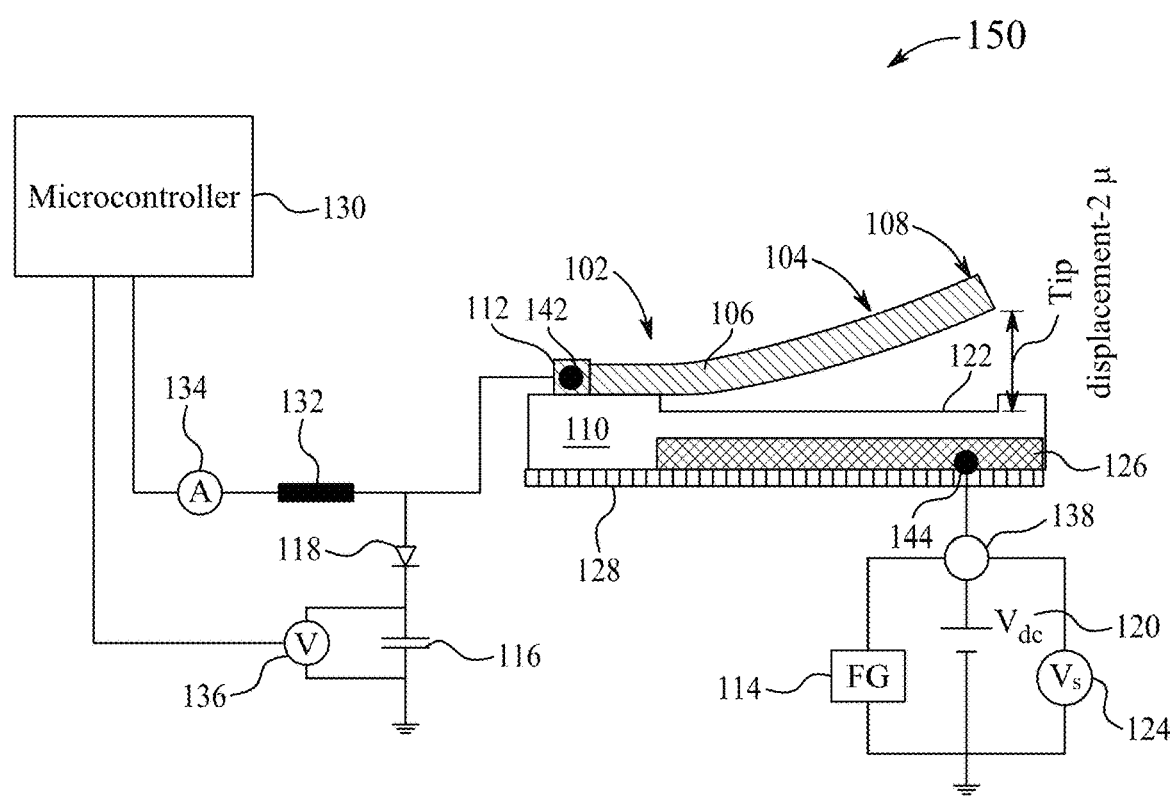
FIG. 1B is another exemplary schematic diagram of the intermittency-based analyte sensor, according to aspects of the present disclosure.

FIG. 1A-FIG. 1B illustrate an overall configuration a capacitance-based intermittency-based analyte sensor. FIG. 1A is an exemplary schematic diagram of the capacitance-based intermittency-based analyte sensor 100, (hereinafter interchangeably referred to as "the analyte sensor 100"), according to one or more aspects of the present disclosure. FIG. 1B is another exemplary schematic diagram of the analyte sensor 150, according to one or more aspects of the present disclosure.

Referring to FIG. 1A and FIG. 1B, the analyte sensor 100 includes a microcantilever 102, a substrate 110, a plurality of electrodes 126, a contact pad 112, and a microcontroller 130.

The microcantilever 102 includes a micromechanical beam 104. The micromechanical beam 104 has a fixed end 106 and a free end 108. Upon application of a voltage to the substrate 110, the free end 108 of the micromechanical beam 104 bends into a curved shape. In an aspect, the micromechanical beam 104 bends to have an inward-curved or outward-curved structure. In an example, the free end 108 of the micromechanical beam 104 has a plurality of alternating peaks and valleys. The tip displacement from the bottom of the gap 122 to the highest extent of the free end 108 is less than or equal to 2 microns.

The substrate 110 is connected to the fixed end 106 of the micromechanical beam 104. The substrate 110 is shaped to have a depressed area. The depressed area forms a gap 122 below the micromechanical beam 104 between the fixed end 106 and the free end 108. In an example, the substrate 110 may be substantially flat or arcuately curved. In an aspect, the substrate 110 is a glass substrate, a quartz substrate, a substrate formed of an insulator such as alumina, or a plastic substrate. An insulation layer 128 is provided beneath the substrate 110 as shown in the FIG. 1A. In a non-limiting example, the insulation layer 128 is made of $Si_3N_4$.

The plurality of electrodes 126 are arranged in the substrate 110 below the micromechanical beam 104. In an aspect, each electrode of the plurality of electrodes 126 has a shape selected from the group having a hexagonal shape, a pentagonal shape, a square shape, a triangular shape, and a circular shape. The plurality of electrodes 126 are spaced along a length of the substrate 110 below the fixed end 106 and the free end 108 of the micromechanical beam 104. In some examples, a gap separating any two adjacent electrodes chosen from the plurality of electrodes is uniform. In an example, the gap separating any two adjacent electrodes is variable. In an aspect, the plurality of electrodes 126 is connected to a function generator 114 and a biased source of alternating voltage through a gold pad 144. The gold pad 144 is configured to increase the conductivity between the alternating voltage source 124 and the plurality of electrodes 126. In an example, the biased source of alternating voltage includes an alternating voltage source 124 which is connected in series with a DC bias voltage source 120. Also, using the biased source of alternating voltage, a bias voltage is applied to the plurality of electrodes 126. The function generator 114 is configured to apply a waveform having a swept frequency to the biased source of alternating voltage. The function generator 114 is configured to generate different types of waveforms as an output signal. For example, the output signal may be a sinewave, a triangular wave, a square wave, or a sawtooth wave. The function generator 114 is configured to adjust the frequency of the output signal from a fraction of a hertz to several hundred kHz. In an aspect, the frequency lies in a frequency range that is configured to generate intermittencies in a motion of the free end 108 of the micromechanical beam 104.

Referring to FIG. 1B, the biased source of alternating voltage includes the alternating voltage source 124 connected in parallel with the DC bias voltage source 120. The biased source of alternating voltage is also parallelly connected with the function generator 114. As shown in FIG. 1B, in a parallel configuration, an adder 138 is employed that is configured to add the input voltages (the function generator 114, the alternating voltage source 124, and the DC bias voltage source 120) before applying the alternating voltage to the plurality of electrodes 126.

The contact pad 112 is connected to the fixed end 106. In an aspect, the contact pad 112 is configured to provide an electrical contact to the micromechanical beam 104. In some aspects, the contact pad 112 is a gold contact pad. In an aspect, the contact pad 112 has a gold pad 142. In an example, the gold pad 142 is a gold ball. The contact pad 112 is located on the substrate 110 at a base of the fixed end 106. In an aspect, the analyte sensor 100 has a second gold contact pad (i.e., the gold pad 144) to provide good contact between the input signal and the plurality of electrodes 126.

The electrical circuit of the analyte sensor 100 includes a diode 118, a capacitor 116, an ammeter 134 and a voltmeter 136. The diode 118 is connected to the contact pad 112 at the fixed end 106. The diode 118 is configured to eliminate the negative cycles from the alternating voltage before the alternating voltage is applied to the capacitor 116. The capacitor 116 is connected to the diode 118. The capacitor 116 is configured to be charged by the positive cycles. The capacitor 116 charges over a plurality of cycles to a voltage value directly related to the motion of the free end 108 in the intermittency region. As the diode 118 and capacitor 116 are connected in series, the capacitor 116 charges gradually through the diode 118, until the voltage reaches a maximum. Once the capacitor 116 is charged up to the maximum value, the alternating voltage does not change with dynamic cycles represents the movement of the free end 108. The voltmeter 136 measures an electric potential difference across the capacitor 116. In an example, the voltmeter 136 is configured to generate a digital value, which is fed to the microcontroller 130.

The ammeter 134 is used to measure the current in the circuit. The ammeter 134 is connected in series with the circuit. In an example, the ammeter 134 is configured to generate a digital value based on the current flow in the circuit. The ammeter 134 is connected to the contact pad via a resistor 132. The resistor 132 is a high value resistor, in the range of 2000Ω to 5000Ω, to protect the ammeter by limiting the flow of current through the ammeter.

The microcontroller 130 includes, inter alia, various circuitries including a memory, a processing unit, a voltage sensing unit, and a current sensing unit. In some examples, the microcontroller 130 may include one or more of input-output (I/O) ports (nodes), an analog-to-digital converter (ADC), precision timers, multifunction input and output nodes, charge time measurement unit (CTMU), multiplexers, digital-to-analog converter (DAC), or combinations thereof.

The memory is configured to store a set of program instructions, and calibrated voltage. The memory stores a set of values corresponding to calibration curves and monitored frequency responses. According to an aspect of the present disclosure, the microcontroller 130 may be implemented as one or more microprocessors, microcomputers, digital signal processors, central processing units, state machines, logic circuitries, and/or any devices that manipulate signals based on operational instructions. Among other capabilities, the microcontroller 130 may be configured to fetch and execute computer-readable instructions and the set of pre-determined rules stored in the memory. The memory may be coupled to the microcontroller 130 and may include any computer-readable medium including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes. The processing unit is configured to cooperate with the memory to receive and process the set of pre-determined rules to generate a set of system operating commands.

The microcontroller 130 uses the ADC for converting an analog voltage into a digital value. In an example, the ADC is 6 channels (marked as A0 to A5), 10-bit ADC. In an aspect, the microcontroller 130 is configured to receive the digital value from the voltmeter 136. In an aspect, the microcontroller 130 converts an analog voltage signal measured by an analog voltmeter 136 into a voltage data using the ADC. In an aspect, the microcontroller 130 is configured to receive the digital value from the ammeter 134. In an aspect, the microcontroller 130 converts an analog current signal measured by an analog ammeter 134 into a current data using the ADC.

Under the set of system operating commands, the microcontroller 130 is configured to monitor a frequency response of the micromechanical beam 104. The microcontroller 130 monitors the frequency response of the micromechanical beam 104 in the frequency range of the alternating voltage, which generates intermittencies in the sensor response, over a range of 1,000 to 10,000 cycles. The microcontroller 130 is configured to store the monitored frequency response in the memory. In an aspect, the number of the monitored frequency responses lies in the range of 1,000 to 10,000. In an aspect, the microcontroller 130 is a Microchip16F1619 PIC microcontroller (manufactured by Microchip Technology Inc., 2355 West Chandler Blvd, Chandler, Arizona, USA 85224-6199), or an Atmega328 (also manufactured by Microchip Technology Inc., 2355 West Chandler Blvd, Chandler, Arizona, USA 85224-6199). For example, a signal measurement timer module (SMT) in the Microchip16F1619 PIC microcontroller is configured for measuring the frequency response. In an example, the SMT can perform a variety of measurements such as gated timer, period and duty cycle acquisition, high and low measurement, windowed measurement, gated window measurement, time of flight, capture, counter, gated counter, and windowed counter. The microcontroller 130 is configured to average all the monitored intermittencies (frequency responses) over the range of 1,000 to 10,000 cycles. In one aspect, the microcontroller 130 is configured to monitor the frequency response of the micromechanical beam 104 after a predefined number of cycles. For example, the microcontroller 130 measures a first frequency response after the $1000^{th}$ cycle, a second frequency after the $2000^{th}$ cycle, and so on. After the predefined number of cycles, the voltage across the capacitor becomes saturated, and the microcontroller 130 measures the frequency responses in an accurate manner. Using a limited number of measured frequency responses, the analyte sensor 100 is able to avoid complex calculations and provides an accurate result using the limited number of frequency responses. The microcontroller 130 is configured to compare the averaged frequency response to the calibration curve fetched from the memory. Based upon the comparison, the microcontroller 130 is configured to provide an alert that an analyte has been deposited on the surface of the micromechanical beam 104. For example, when the analyte has been deposited on the surface of the micromechanical beam 104, the micromechanical beam 104 generates intermittencies in the motion of the free end 108 that lie in the frequency range of the alternating voltage. The microcontroller 130 is configured to detect the presence of the analyte by analyzing the monitored frequency response. When the monitored frequency response is less than the calibrated frequency response, the microcontroller 130 generates an alert that an analyte has been deposited on the surface of the micromechanical beam 104.

Under the set of system operating commands, the microcontroller 130 is configured to continuously sample a current at the first contact pad 112 and generate a sampled current value. For example, the microcontroller 130 samples the current at a sampling rate that is at least one order of magnitude higher than the alternating frequency. The microcontroller 130 is configured to store the sampled current values in the memory. In an example, the number of sampled current values lies in the range of 1,000 to 10,000. The microcontroller 130 is configured to average the sampled current values for the range of 1,000 to 10,000 cycles of the alternating voltage and generate an averaged current (value).

Under the set of system operating commands, the microcontroller 130 is configured to calculate a phase angle between the alternating voltage and the averaged current. The microcontroller 130 compares the calculated phase angle to a baseline phase angle on the calibration curve fetched from the memory. Based on the comparison, the microcontroller 130 generates the alert that the analyte has deposited on the surface of the micromechanical beam 104 when the phase angle is greater than zero.

Under the set of system operating commands, the microcontroller 130 is configured to measure a voltage once between the first pin and the second pin after the capacitor has charged for a time in the range of 1,000-10,000 cycles of the alternating voltage that generates intermittencies in the motion of the free end. In an example, the microcontroller 130 measures the voltage between the first pin and the second pin after 1000 cycles. The microcontroller 130 compares the measured voltage to the calibrated voltage in the frequency range. When the measured voltage is less than the calibrated voltage in the frequency range, the microcontroller 130 determines that the analyte has deposited on the surface of the micromechanical beam, and generates the alert.

In an aspect, the intermittency-based sensor 100 is configured to operate in an intermittency frequency range. In an aspect, the intermittency frequency range includes a frequency range selected from any one of four (4) types of intermittencies: a type-I intermittency, a type-II intermittency, a type-III intermittency, and a type-IV intermittency. The type-I intermittency indicates a presence of non-resonant tapping mode oscillations at a voltage magnitude of 7.78 V, where the frequency range is 56 kHz to 56.5 kHz. The type-II intermittency indicates the presence of non-resonant tapping mode oscillations at a voltage magnitude of 7.725 V, where the frequency range is 30.93 kHz to 61.8 kHz. The type-III intermittency indicates the presence of non-resonant tapping mode oscillations at a voltage magnitude of 6.8625 V, where the frequency range is 26.0 kHz to 30.93 kHz. 13. In an aspect, the type-III intermittency also indicates the presence of non-resonant tapping mode oscillations at a voltage magnitude of 7.65 V, where the frequency range is 16 kHz to 16.5 kHz. The type-IV intermittency indicates the presence of non-resonant tapping mode oscillations at a voltage magnitude of 7.725 V, where the frequency range is 56 kHz to 58 KHz.

In an operative aspect, a solution (including a polymer mixed with ethylene glycol) is deposited (applied) at one of the positions along the micromechanical beam 104 and on a circular plate attached to the free end 108. The polymer mixed with ethylene glycol has an affinity for the analyte. In an example, the analyte is ethanol vapor or poly (2,5-dimethyl aniline) (P25DMA). The solution is deposited onto a top surface of the micromechanical beam 104 using a manual manipulator. In an aspect, the polymer mixed with ethylene glycol includes a 1% solution of ethylene glycol, reducing the wettability of the solution and preventing the solution from running off the edges of the micromechanical beam 104.

In an aspect of the present disclosure, the intermittency-based sensor can be used to test an aqueous media for intermittency changes due to contamination or take-up of a gas, solid or other liquid. For example, the sensor may be equipped with a polymeric sensing material to sorb mercury acetate dissolved in water. Measurements may be made of the response in frequency domains where intermittency appears. A MEMS sensor configured for resonance testing in aqueous solution was described by Al-Ghamdi et al. in "Aqueous Media Electrostatic MEMS Sensors", published in Transducers 2019—EUROSENSORS XXXIII, Berlin, GERMANY, Jun. 23-27, 2019, incorporated herein by reference in its entirety.

Figure 2:
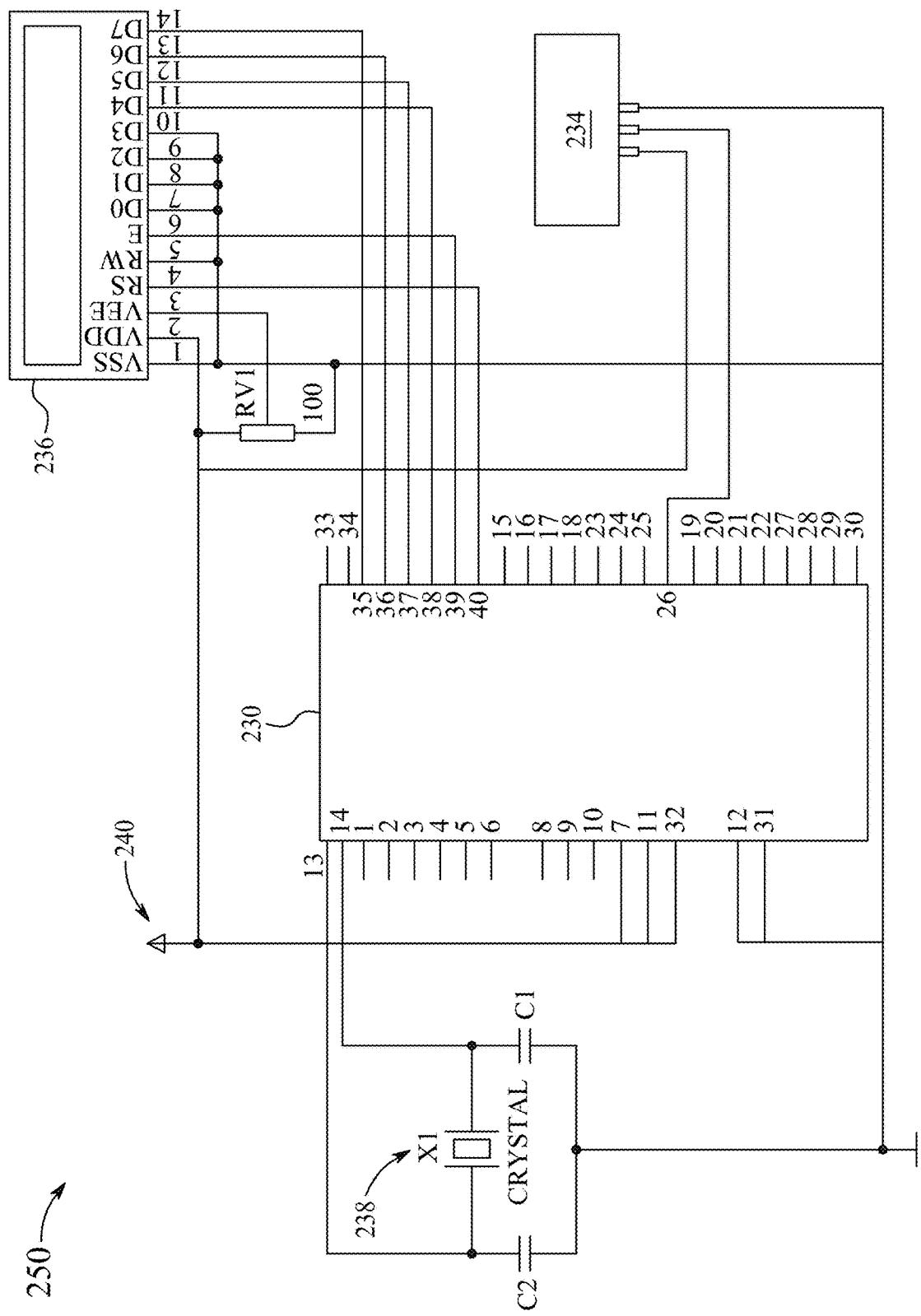
FIG. 2 is an exemplary circuit diagram of a microcontroller with a display unit and an alerting unit, according to aspects of the present disclosure.

FIG. 2 is an exemplary circuit diagram 200 of the microcontroller 230 with a display unit 236 and an alerting unit 234. Referring to FIG. 2, the microcontroller 230 is commutatively coupled with the display unit 236, and the alerting unit 234.

In an aspect, a first pin and a second pin of the microcontroller 230 are connected in parallel with the capacitor 116. A third pin and a fourth pin of the microcontroller 230 are connected in parallel with a piezoresistor. In this aspect, the microcontroller 230 is configured to measure a voltage between the first pin and the second pin over the range of 1,000 to 10,000 cycles of the alternating voltage that generates intermittencies in the motion of the free end. The capacitor charges over a plurality of cycles to a voltage value directly related to the motion of the free end in the intermittency region. For example, the capacitor is fully charged after 1,000 cycles. Once the capacitor is charged up to the maximum value, the microcontroller 130 measures the voltage once between the first pin and the second pin, in parallel with the capacitor, after 1000 cycles of the alternating voltage. In one aspect, the microcontroller 130 is configured to monitor the frequency response of the micromechanical beam 104 after a predefined number of cycles. For example, the microcontroller 130 measures a first frequency response after the $1000^{th}$ cycle, a second frequency response after the $2000^{th}$ cycle, and so on. The microcontroller 230 compares the measured voltage to the calibrated voltage in the frequency range. When the measured voltage is less than the calibrated voltage in the frequency range, the microcontroller 230 determines that the analyte has deposited on the surface of the micromechanical beam, and generates the alert. In an aspect, the alert may be an audio signal or a video signal. For example, when there is no analyte deposited surface of the micromechanical beam, then for a predefined frequency range (for example: 200 Hz to 300 Hz), a measured voltage is 5V (also considered as the calibrated voltage in the predefined frequency range, stored in the memory). Then to check whether the analyte has been deposited on the surface of the micromechanical beam or not, the voltage is measured in the frequency range using the microcontroller. If the analyte is deposited on the surface of the micromechanical beam, the measured voltage is less than the calibrated voltage in that specific frequency range.

In an aspect, the output of the microcontroller 230 may be fed into a digital-to-analog converter (DAC) that transforms the digital data signal from the microcontroller 230 to an equivalent analog signal which is used to drive the alerting unit 234. The alerting unit 234 is configured to generate alarms in different degrees (such as the volume magnitude of buzzer). In some examples, the alerting unit 234 is configured to generate a voice message or a buzzer sound.

The display unit 236 is configured to display a warning signal such as "analyte is deposited". The analyte sensor may include a display unit, such as a LED matrix, small video display, high-resolution liquid crystal display (LCD), plasma, light-emitting diode (LED), or other devices suitable for displaying the warning signal. In an aspect, the warning signal includes flashing lights, a sign, a mechanical alert such as a flag, and the like.

In an example, the analyte sensor 100 includes a rechargeable battery configured to provide power to electrical components of the analyte sensor. In an example, the rechargeable battery is selected from the group consisting of a non-aqueous lithium-ion battery, a polymer lithium-ion battery, a sodium sulfate battery, a silver-zinc (AgZn) battery, a lithium-ion battery, a nickel metal hydride battery, or other rechargeable battery.

The microcontroller 230 is connected to a power supply 240 (e.g., 5V), and a clock generator 238. The clock generator 238 is configured to generate a modulated gated clock signal to the display unit 236, and the alerting unit 234.

Figure 3A:
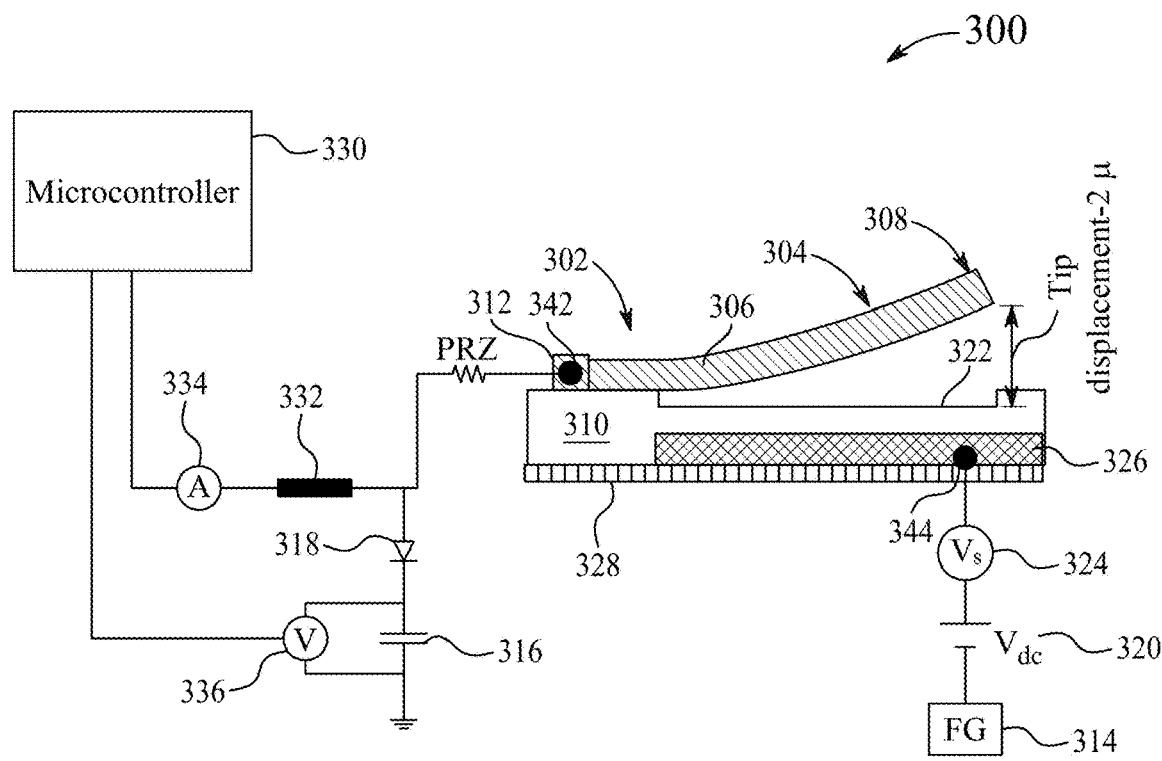
FIG. 3A is an exemplary schematic diagram of the intermittency-based analyte sensor, according to aspects of the present disclosure.
Figure 3B:
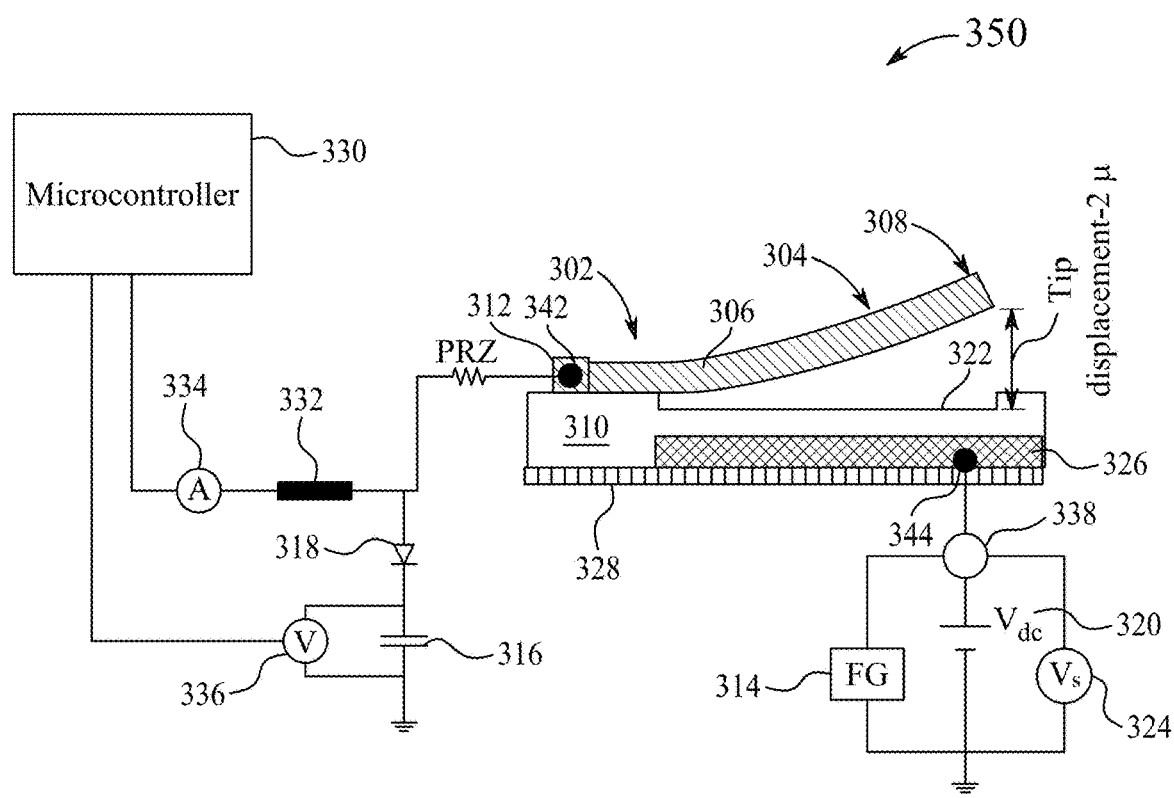
FIG. 3B is another exemplary schematic diagram of the intermittency-based analyte sensor, according to aspects of the present disclosure.

FIG. 3A and FIG. 3B illustrate an overall configuration a capacitance-based intermittency-based analyte sensor which uses the piezoresistor. FIG. 3A is an exemplary schematic diagram of the capacitance-based intermittency-based analyte sensor 300, (hereinafter interchangeably referred to as "the analyte sensor 300"), according to one or more aspects of the present disclosure. FIG. 3B is another exemplary schematic diagram of the analyte sensor 350, according to one or more aspects of the present disclosure.

Referring to FIG. 3A and FIG. 3B, the analyte sensor 300 includes a microcantilever 302, a substrate 310, a plurality of electrodes 326, a contact pad 312, a function generator 314, an alternating voltage 320, and a microcontroller 330. The microcantilever 302 includes a micromechanical beam 304. The micromechanical beam 304 has a fixed end 306 and a free end 308. In an aspect, the micromechanical beam 304 has a curved shape. The substrate 310 is shaped to have a depressed area. The depressed area forms a gap 322 below the micromechanical beam 304 between the fixed end 306 and the free end 308. An insulation layer 328 is provided beneath the substrate 310. In an example, the insulation layer 328 is made of $Si_3N_4$. The construction of analyte sensors 100 and 300 are substantially similar as described in FIG. 1A and FIG. 3A, and thus the construction is not repeated here in detail for the sake of brevity.

In an aspect, the plurality of electrodes 326 is connected to a function generator 314 and a biased source of alternating voltage through a gold pad 342. In an example, the biased source of alternating voltage includes an alternating voltage source 324 which is connected in series with a DC bias voltage source 320. Also, using the biased source of alternating voltage, a bias voltage is applied to the plurality of electrodes 326. The function generator 314 is configured to apply an alternating voltage to the plurality of electrodes 326.

Referring to FIG. 3B, the biased source of alternating voltage includes the alternating voltage source 324, which is connected in parallel with the DC bias voltage source 320. The biased source of alternating voltage is also parallelly connected with the function generator 314. As shown in FIG. 3B, in a parallel configuration, an adder 338 is employed that is configured to add the input voltages (the function generator 314, the alternating voltage source 324, and DC bias voltage source 320) before applying the alternating voltage to the plurality of electrodes 326.

Referring to FIG. 3A and FIG. 3B, the analyte sensor 300 includes a piezoresistor PRZ, a diode 318, a capacitor 316, an ammeter 334 and a voltmeter 336. A first end of the piezoresistor PRZ is connected to the contact pad 312. In an aspect, the first end of the piezoresistor PRZ is connected to the gold pad 342. The diode 318 is connected to a second end of the piezoresistor PRZ. The piezoresistor PRZ consists of resistors made from a piezoresistive material and is used for measuring mechanical stress. The resistance of the piezoresistor PRZ changes when a strain is experienced by the piezoresistor PRZ due to motion of the micromechanical beam 304. The piezoresistor PRZ outputs a current corresponding to a change in its resistance value. In an example, the micromechanical beam 304 may include a coating of piezoresistive materials, such as doped silicon. In an aspect, the piezoresistor PRZ can be integrated into the microcantilever 302. For example, the microcantilever 302 can be formed of silicon, and a dopant may be implanted into the silicon at the base of the microcantilever 302, acting as the piezoresistor PRZ. When the piezoresistive material is strained, the resistance of the material changes, and current changes with the vibrations. The ammeter 334 is used to measure the current in the analyte sensor 300. The ammeter 334 is connected in series with the piezoresistor PRZ in which the current is to be measured. In an example, the ammeter 334 is configured to generate a digital value. In an aspect, the ammeter 334 is connected to the piezoresistor PRZ via a resistor 332. In an example, the resistor 332 is a high value resistor.

In an aspect, the microcontroller 330 is configured to continuously sample a voltage across at the piezoresistor PRZ. In an example, the sampling rate is at least one order of magnitude higher than the alternating frequency. The diode 318 is connected to the piezoresistor PRZ at the fixed end 306. The diode 318 is configured to eliminate the negative cycles from the alternating voltage taken as a sampled voltage. The capacitor 316 is connected to the diode 318. The capacitor 316 is configured to be charged. Once the capacitor 316 is charged up to a reference value, the alternating voltage does not change with dynamic cycles, thereby providing a stable alternating voltage. The voltmeter 336 measures an electric potential difference across the capacitor 316 i.e., replicating the voltage across the piezoresistor PRZ. In an example, the voltmeter 336 is configured to generate a digital value.

In a connecting aspect, the microcontroller 330 measures a voltage between a first pin and a second pin over the range of 1,000-10,000 cycles of the alternating voltage which is configured to generate intermittencies in the motion of the free end 308. The capacitor 316 charges over a plurality of cycles to a voltage value directly related to the motion of the free end in the intermittency region. For example, the capacitor is fully charged after 1,000 cycles. Once the capacitor 316 is charged up to the maximum value, the microcontroller 330 measure the voltage once between the first pin and the second pin, in parallel with the capacitor 316, after 1000 cycles of the alternating voltage. In one aspect, the microcontroller 330 is configured to monitor the frequency response of the micromechanical beam 304 after a predefined number of cycles. For example, the microcontroller 330 measures a first frequency response after the $1000^{th}$ cycle, a second frequency after the $2000^{th}$ cycle, and so on.

The microcontroller 330 is configured to compare the measured voltage to a calibrated voltage in the frequency range, fetched from the memory. When the measured voltage is less than the calibrated voltage in the frequency range, the microcontroller 330 is configured to determine that the analyte has deposited on the surface of the micromechanical beam 304 and generate the alert.

In an operative aspect, the microcontroller 330 is configured to continuously sample the current at the piezoresistor PRZ connected at the contact pad 312 and generate the sampled current value. In one aspect, the microcontroller 330 is configured to sample the current at the piezoresistor PRZ after the predefined number of cycles. In an example, the predefined number of cycles is 1,000 cycles. The microcontroller 330 is configured to store the sampled current value in the memory. In an example, the number of sampled current values lies in the range of 1,000-10,000. The microcontroller 330 is configured to average the sampled current values for the range of 1,000 10,000 cycles of the alternating voltage and generate an averaged current (value).

The present disclosure is configured to disclose two types of analyte sensor 100, 300 based on shape and structure of the micromechanical beam 104. In an aspect, the analyte sensor 100, 300 is configured to have two (2) types of structural aspects according to the present disclosure. In one aspect, the analyte sensor 100, 300 has no structure attached to the free end of the micromechanical beam 104 (hereinafter interchangeably referred to as "the first analyte sensor 100") and in another aspect, the analyte sensor 100, 300 has a circular plate attached to the free end of the micromechanical beam 104 (hereinafter interchangeably referred to as "the second analyte sensor 100"). In an aspect, in both types of analyte sensor, the substrate having plurality of electrodes is configured to provide electrostatic actuation.

In one configuration, the analyte sensor 300 includes a housing and all of the components, including the microcantilever 302, the substrate 310, the plurality of electrodes 326, the contact pad 312, the microcontroller 330, the function generator 314, the capacitor 316, the alternating voltage source 324, and the piezoresistor PRZ are placed within the housing.

Figure 4A:
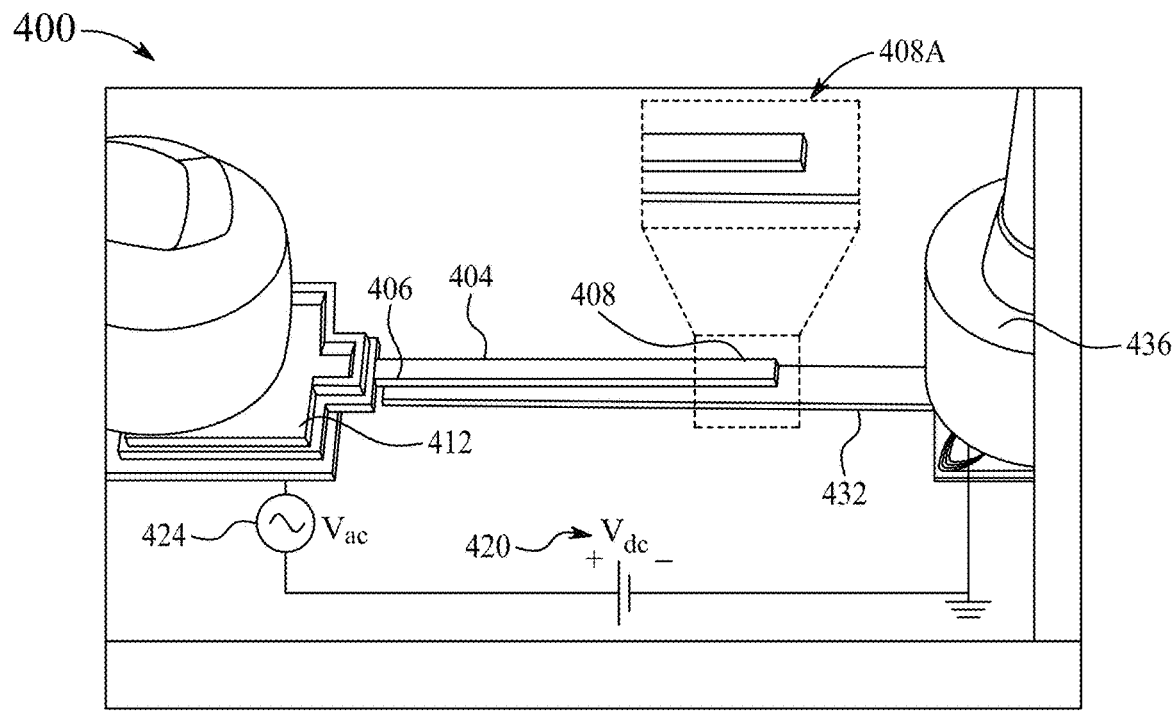
FIG. 4A illustrates a scanning electron microscope (SEM) image of a first analyte sensor, according to aspects of the present disclosure.

FIG. 4A illustrates a scanning electron microscope (SEM) image 400 of the first analyte sensor 100. Referring to FIG. 4A, the SEM image 400 shows a microcantilever beam 404 (also referred to as micromechanical beam 404), a first contact pad 412, a second contact pad 436, a substrate 432 attached to the second contact pad 436, and a DC bias voltage source 420. The micromechanical beam 404 has a fixed end and a free end 408. Block 408A represents an enlarged view of the free end 408 of the micromechanical beam 404.

The first contact pad 412 is connected to the fixed end 406. In an aspect, the first contact pad 412 is configured to provide an electrical path with the micromechanical beam 404. The substrate 432 is connected to the fixed end 406 of the micromechanical beam 404. The plurality of electrodes is arranged in the substrate 432 below the micromechanical beam 404. In some examples, the function generator (not shown) and voltage biasing circuit is connected to the plurality of electrodes, which is configured to apply an alternating voltage to the plurality of electrodes located in the substrate 432. The plurality of electrodes is configured to connect to a biased source of alternating voltage. In an aspect, the biased source of alternating voltage includes an alternating voltage source 424 connected in series with the DC bias voltage source 420. The frequency of the alternating voltage lies in a frequency range that is configured to generate intermittencies in a motion of the free end 408.

Figure 4B:
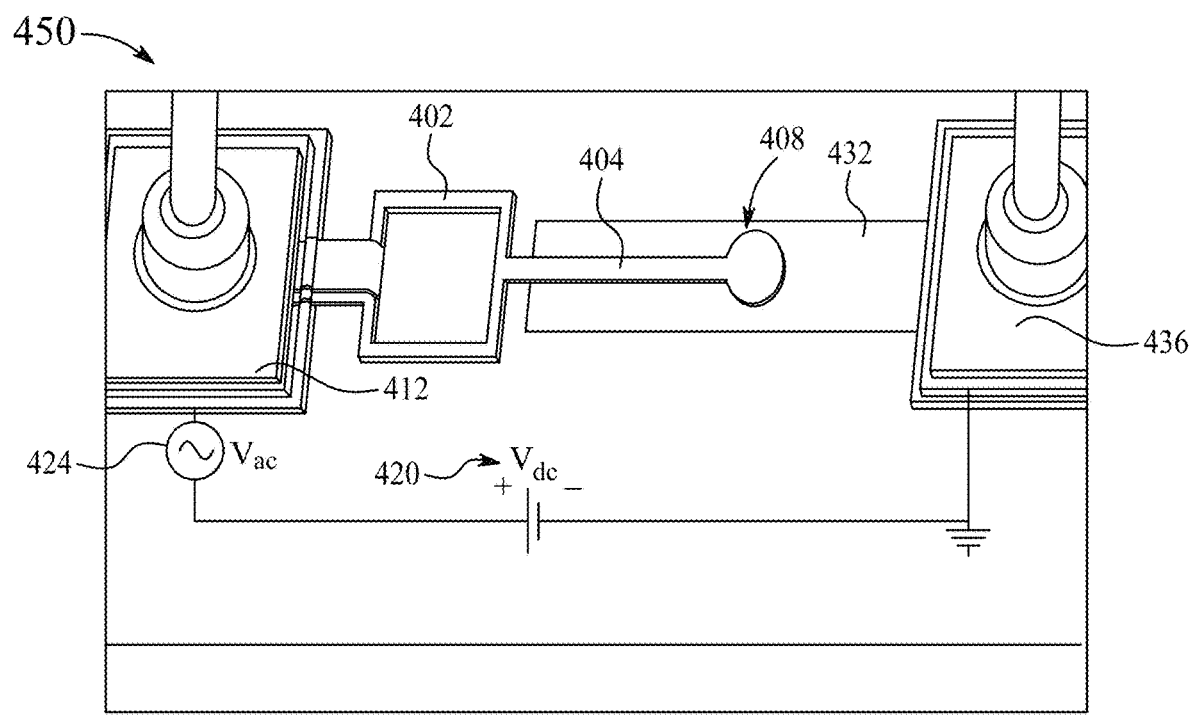
FIG. 4B illustrates an SEM image of a second analyte sensor, according to aspects of the present disclosure.

FIG. 4B illustrates the SEM image 450 of the second analyte sensor 100. Referring to FIG. 4B, the free end 408 of the micromechanical beam 404 has a circular plate. In an aspect, the solution (polymer mixed with ethylene glycol) is deposited on the circular plate. For example, the polymer mixed with ethylene glycol has an affinity to ethanol vapor, and the analyte is ethanol vapor.

In an operative aspect, in order to calibrate the analyte sensor 100 using the function generator, a first alternating voltage having a first amplitude is applied to the plurality of electrodes located below a micromechanical beam 404. In an aspect, the first frequency of the first alternating voltage is swept over a first frequency range from five kHz to 90 kHz. Using a vibrometer, a first displacement of the tip of the micromechanical beam 404 in response to the first alternating voltage is measured. In an aspect, a charge-coupled device (CCD) video camera is configured to monitor changes in the first frequency response of the free end due to the first alternating voltage. An oscilloscope records a first velocity of the free end. Similarly, a second frequency range is detected in which intermittencies in the first frequency response are found.

The analyte sensor 100 records a baseline calibration curve of the first amplitude and a baseline phase of a second frequency response in the second frequency range in which the intermittencies are found in the memory. The analyte sensor 100 is configured to be exposed to a source of the analyte. Using the voltage generator, a biased alternating voltage is generated that has an increased amplitude in comparison to the amplitude of the first alternating voltage. The function generator sweeps the biased alternating voltage over a third frequency range from 10 KHz below the second frequency range in which the intermittencies were found to be 10 KHz above the second frequency range in which the intermittencies were found. The vibrometer measures a second displacement of a tip of the micromechanical beam in response to the biased alternating voltage. The CCD video camera monitors changes in the second displacement of the free end due to the biased alternating current. The oscilloscope records a second velocity of the free end and detects a third frequency range in which intermittencies in the second frequency response are found. Also, the oscilloscope determines a phase of the third frequency range.

The microcontroller is connected to the memory, the function generator, the source of biased voltage, the vibrometer, the CCD camera, and the oscilloscope. The microcontroller compares the phase of the third frequency range to the phase of the second frequency range and generates an analyte calibration curve of the biased amplitude and the phase of the third frequency range. The microcontroller provides the third frequency range and the biased amplitude to intermittency-based analyte sensor as operating parameters. These measurements provide the calibration curves which are stored in the memory of the microcontroller.

Figure 5A:
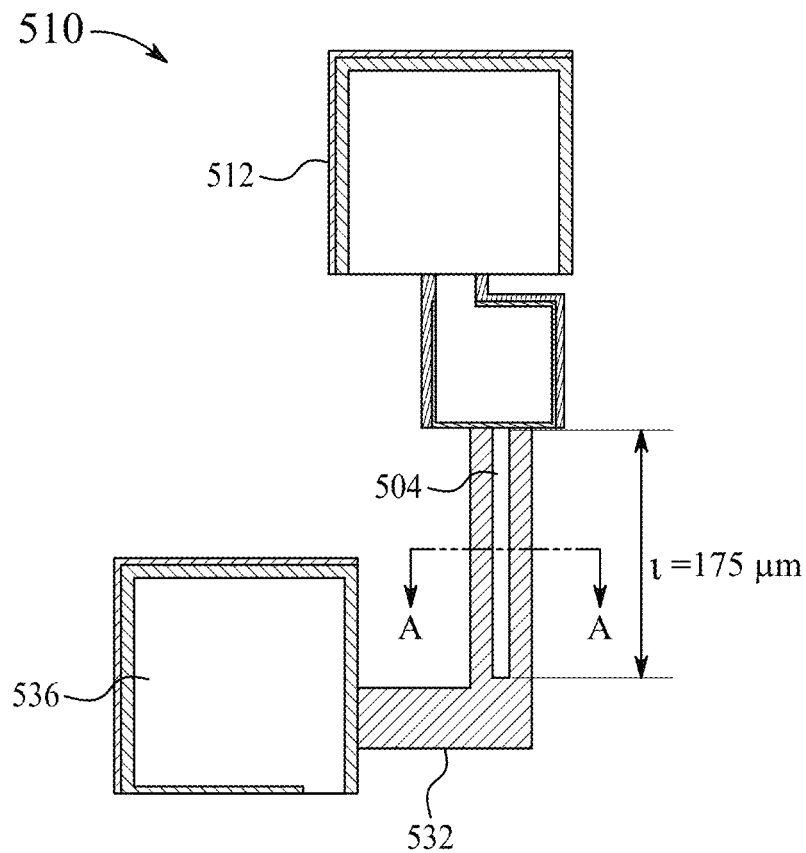
FIG. 5A illustrates a top view of a fabrication layout of the first analyte sensor, according to aspects of the present disclosure.

FIG. 5A-FIG. 5D illustrate various fabrication layouts of the first analyte sensor and the second analyte sensor. In an aspect, the first analyte sensor and the second analyte sensor are fabricated using a PolyMUMPs fabrication process. As known, Multi-User MEMS Processes, or MUMPsR (manufactured by MEMSCAP Inc, Research Triangle Park, Durham, NC 27709, United States of America), is a commercial program that provides cost-effective, proof-of concept MEMS fabrication to industry, universities, and government worldwide. MEMSCAP Inc, offers three standard processes as part of the MUMPsR program: PolyMUMPS™, a three-layer polysilicon surface micromachining process: MetalMUMPs™, an electroplated nickel process; and SOI-MUMPs™, a silicon-on insulator micromachining process. The PolyMUMPs fabrication process is a three-layer polysilicon surface micromachining process. In an aspect, the material properties of the structural polysilicon are ρ=2300 kg/m³, E=160 GPa and v=0.22. FIG. 5A illustrates a top view 510 of a fabrication layout of the SEM image 400 of the first analyte sensor. As shown in FIG. 5A, the microcantilever 502 has a micromechanical beam 504. The micromechanical beam 504 has a fixed end and a free end. The first contact pad 512 is connected to the fixed end. In an aspect, the micromechanical beam 504 has a length of 175 μm. The substrate 532 is connected to the second contact pad 536. The substrate 532 is connected to the fixed end of the micromechanical beam 504. The substrate 532 is shaped to have a depressed area which forms a gap below the micromechanical beam between the fixed end and the free end. The substrate 532 has a plurality of electrodes arranged below the micromechanical beam 504.

Figure 5B:
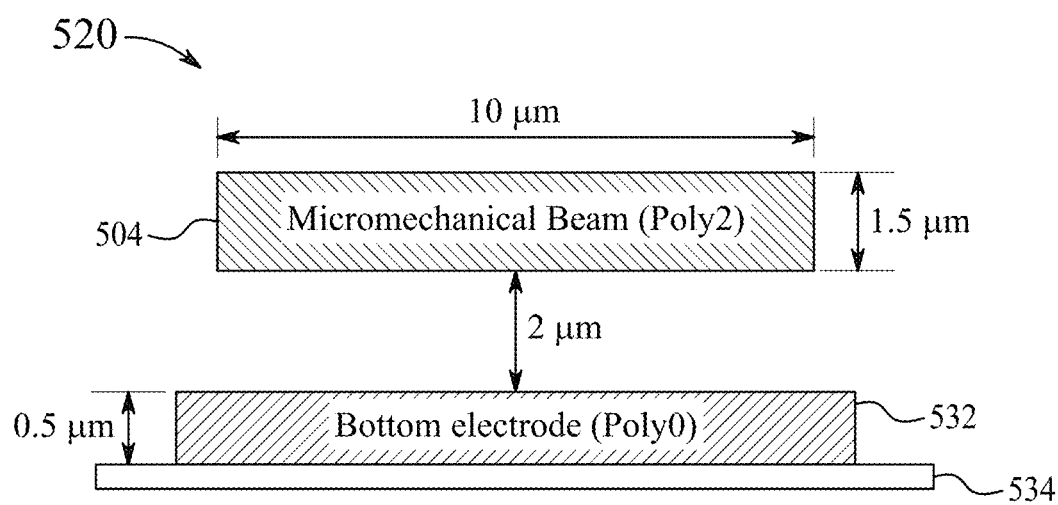
FIG. 5B illustrates a front view of the fabrication layout of the first analyte sensor, according to aspects of the present disclosure.

FIG. 5B illustrates a front view 520 of the fabrication layout of the SEM image 400 of the first analyte sensor. For example, in the first analyte sensor, the micromechanical beam 504 is fabricated in a Poly 2 structural layer with dimensions of (175×10×2 μm³). In an aspect, the micromechanical beam 504 has a width of 10 μm and a height of 1.5 μm. As shown in FIG. 5B, the gap between the micromechanical beam 504 and the substrate 532 is 2 μm. In an aspect, the substrate 532 has a height of 0.5 μm. An insulation layer 534 beneath the substrate 532 is also shown in the FIG. 5B. For example, the insulation layer 534 is made of $Si_3N_4$.

Figure 5C:
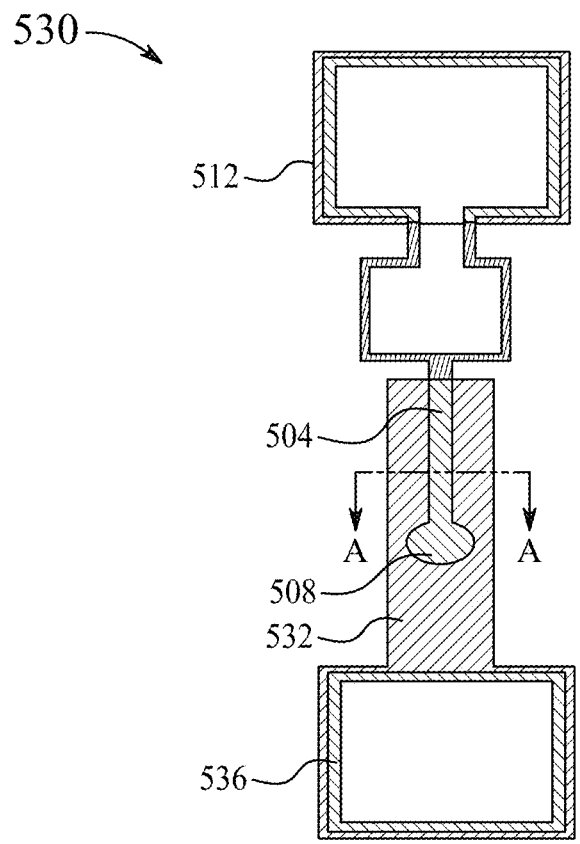
FIG. 5C illustrates a top view of a fabrication layout of the second analyte sensor, according to aspects of the present disclosure.

FIG. 5C illustrates a top view 530 of a fabrication layout of the SEM image 450 of the second analyte sensor. In an aspect, the plurality of electrodes is located in the substrate 532 in a Poly 0 structural layer under the entire length of the micromechanical beam 504. The gap underneath the micromechanical beam 504 is etched in a second oxide layer resulting in the gap distance of d=2 μm.

Figure 5D:
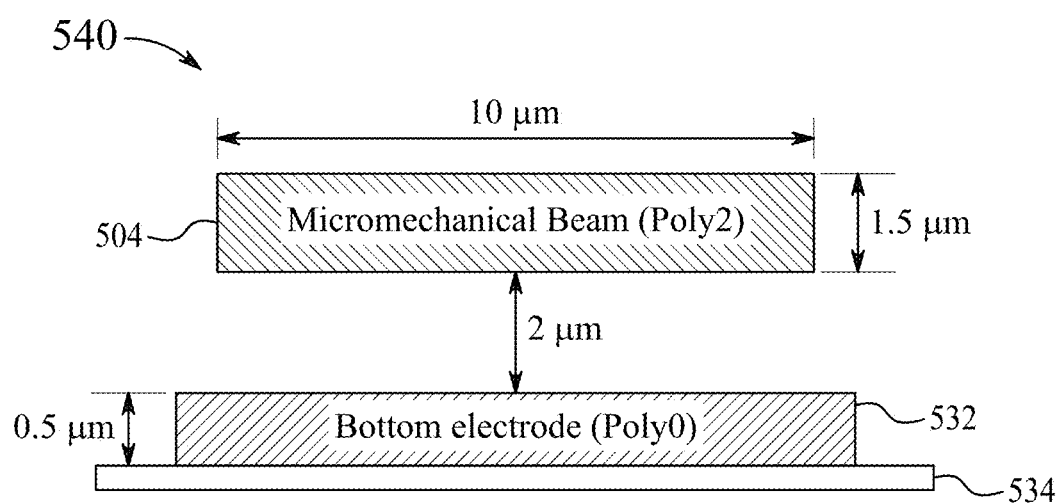
FIG. 5D illustrates a front view of the fabrication layout of the second analyte sensor, according to aspects of the present disclosure.

FIG. 5D illustrates a front view 540 of the fabrication layout of the SEM image 450 of the second analyte sensor. For example, in the second analyte sensor, the micromechanical beam 504 is fabricated in the Poly 2 structural layer with dimensions of (115×10×2 μm³). In aspect, the micromechanical beam 504 has a width of 10 μm and a height of 1.5 μm. As shown in FIG. 5D, the gap between the micromechanical beam 504 and the substrate 532 is 2 μm. In an aspect, the substrate 532 has a height of 0.5 μm. An insulation layer 534 beneath the substrate 532 is also shown in the FIG. 5D. For example, the insulation layer 534 is made of $Si_3N_4$.

In an aspect, two gold pads (function as contact pads) are fabricated at the root of the micromechanical beam 504 and end of the bottom electrode. The gold pads are used to excite the sensor electrostatically with the harmonic waveform:

$$V(t) = V_a + V_a \cos(2\pi f t) \qquad (1)$$

where the modulation index has been set to m=1 in order to maximize the sensor oscillations.

Electrostatic actuation results in multi-frequency excitation. This can be seen by observing the relationship among electrostatic force, voltage, and displacement w(x,t) as $$F_e = \frac{\alpha V(t)^2}{(d-w)^2} \qquad (2)$$

Substituting with the voltage waveform described in Eq. (1) results in:

$$F_e = \frac{\alpha}{(d-w)^2}\left(\frac{3}{2}V_a^2 + 2V_a^2\sin(2\pi f t) - \frac{1}{2}V_a^2\cos(4\pi f t)\right) = \qquad (3)$$
$$\frac{\alpha}{(d-w)^2}(F_{dc} + F_1\sin(2\pi f t) - F_2\cos(4\pi f t))$$

It can be noted that the electrostatic force is composed of three voltage and displacement proportional components. The first part of the equation results in a static $F_{dc}$, a first harmonic $F_1$, and a second harmonic $F_2$ force components. The second part of the equation represents a hard nonlinearity that approaches a singularity as displacement increases. Therefore, the response of the analyte sensor at any given frequency contains components corresponding to the excitation frequency f and its second harmonic 2f. Setting the modulation index to unity guarantees that the dominant forcing term is the first harmonic $F_1$ except in the frequency ranges where the second harmonic $F_2$ is resonant while the first harmonic $F_1$ is not.

Figure 6A:
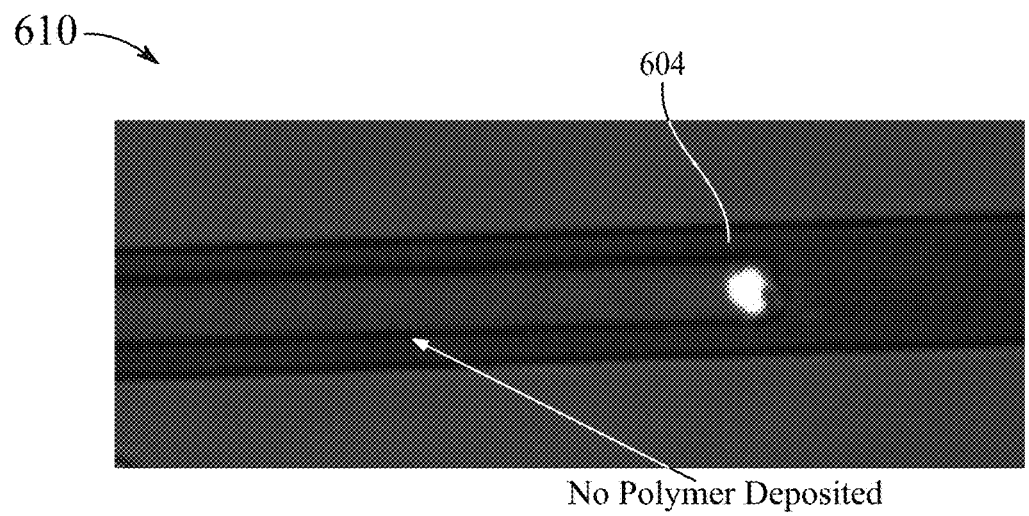
FIG. 6A illustrates a top view of the first analyte sensor before deposition of a poly (2,5-dimethyl aniline) P25DMA and glycol evaporation, according to aspects of the present disclosure.

FIG. 6A illustrates a top view 610 of the first analyte sensor before deposition of the solution (a polymer mixed with ethylene glycol) on the micromechanical beam 604. In an aspect, the polymer is poly (2,5-dimethyl aniline) (P25DMA). The P25DMA is a sensing material for ethanol that detects transdermal ethanol emissions.

Figure 6B:
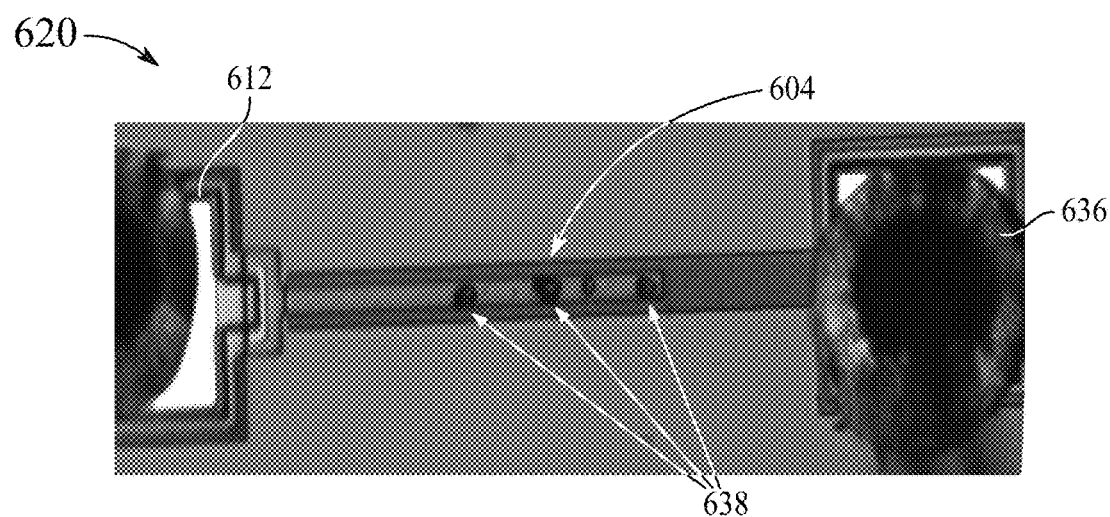
FIG. 6B illustrates a top view of the first analyte sensor during deposition of the P25DMA and glycol evaporation, according to aspects of the present disclosure.

FIG. 6B illustrates a top view 620 of the first analyte sensor during deposition of the solution on the micromechanical beam 604. As shown in FIG. 6B, a first contact pad 612 was connected with the micromechanical beam 604 and a second contact pad 636 is connected to the substrate. For example, three (3) drops (shown by 638) of the solution was applied on the micromechanical beam 604, as visible in the FIG. 6B.

Figure 6C:
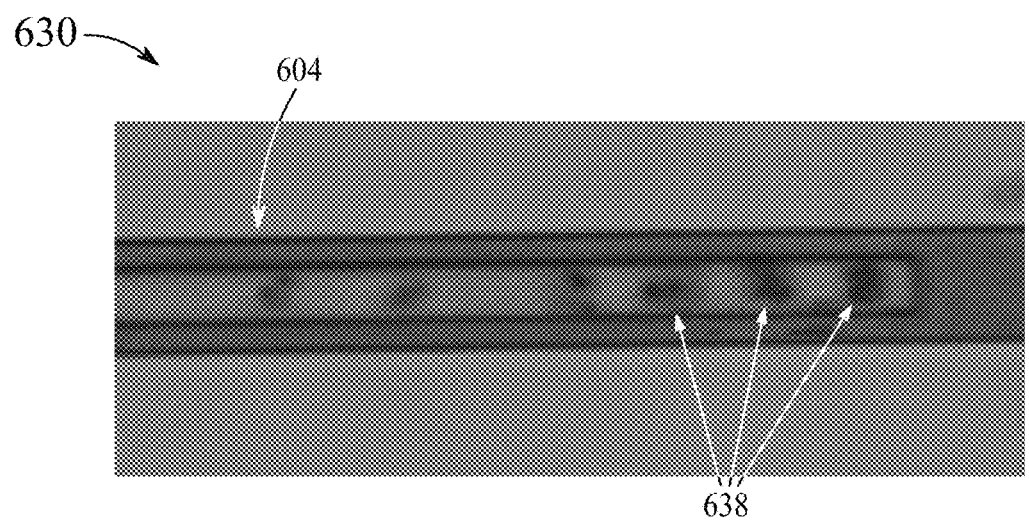
FIG. 6C illustrates a top view of the first analyte sensor after deposition of the P25DMA and glycol evaporation, according to aspects of the present disclosure.

FIG. 6C illustrates a top view 630 of the first analyte sensor after deposition of the solution on the micromechanical beam 604. In an example, the polymer was dispersed in a 1% solution of ethylene glycol, thereof reducing wettability of the solution and preventing the solution from running off the edges of the micromechanical beam 604. During an experiment, six drops of the solution were deposited along the outer half of the micromechanical beam length in stages to avoid solution overflow. The ethylene glycol was allowed to evaporate in air, leaving polymer residue (shown by 638) atop the micromechanical beam 604.

Figure 7A:
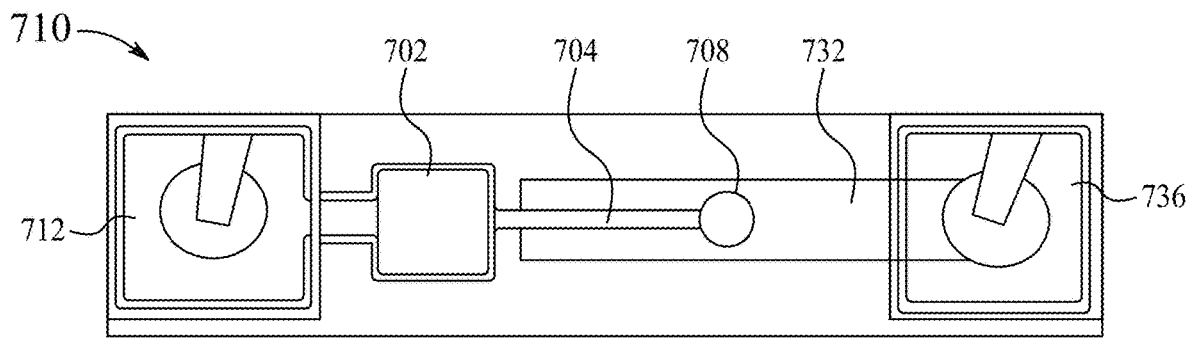
FIG. 7A illustrates a top view of the second analyte sensor before deposition of P25DMA and glycol evaporation, according to aspects of the present disclosure.

FIG. 7A illustrates a top view 710 of the second analyte sensor before deposition of the solution on the micromechanical beam 704. The second analyte sensor has a microcantilever 702. The microcantilever 702 has the micromechanical beam 704 having a fixed end and a free end 708. The free end 708 has the circular plate. As shown in FIG. 7A, the contact pad 712 is connected with the micromechanical beam 704. A second contact pad 736 is connected to the substrate 732.

Figure 7B:
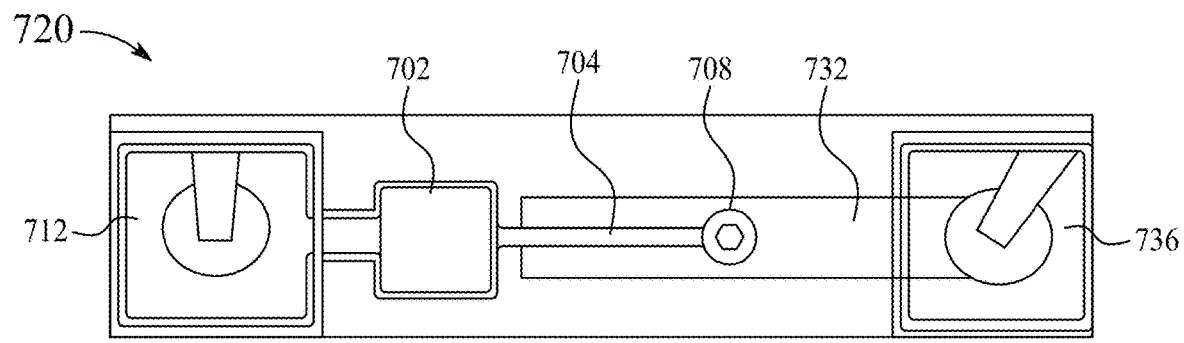
FIG. 7B illustrates a top view of the second analyte sensor during deposition of the P25DMA and glycol evaporation, according to aspects of the present disclosure.

FIG. 7B illustrates a top view 720 of the second analyte sensor during deposition of the solution on the micromechanical beam 704. For example, the polymer mixed with ethylene glycol was deposited on the circular plate. For example, eight (8) drops of the solution were deposited in the middle of the circular plate to avoid solution overflow.

Figure 7C:
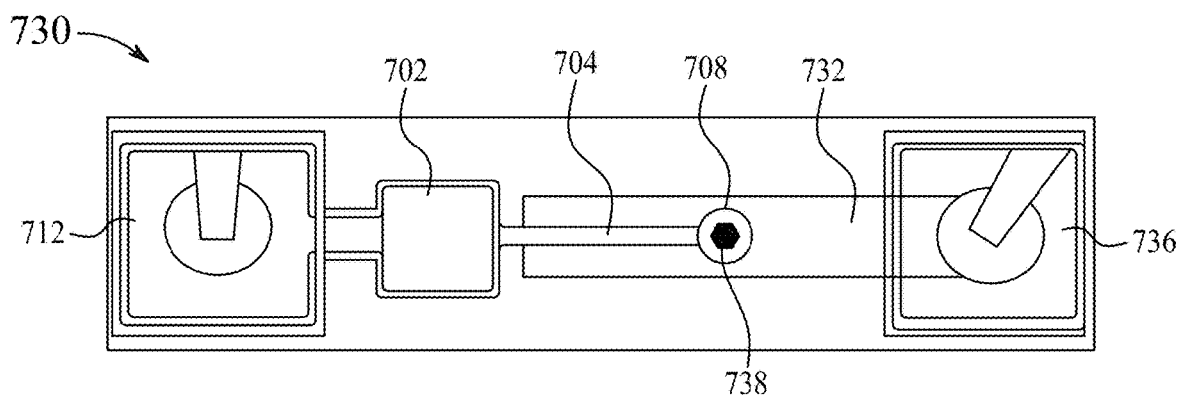
FIG. 7C illustrates a top view of the second analyte sensor after deposition of the P25DMA and glycol evaporation, according to aspects of the present disclosure.

FIG. 7C illustrates a top view 730 of the second analyte sensor after deposition of the solution on the micromechanical beam 704. During an experiment, eight drops of the solution were deposited in the middle of the circular plate. The ethylene glycol was allowed to evaporate in air, leaving polymer residue atop the circular plate (as shown by 738).

In an aspect, the first analyte sensor and the second analyte sensor are configured to be actuated by a biased voltage waveform. The present disclosure is configured to utilize the quantitative change before and after added mass depositing.

Figure 8A:
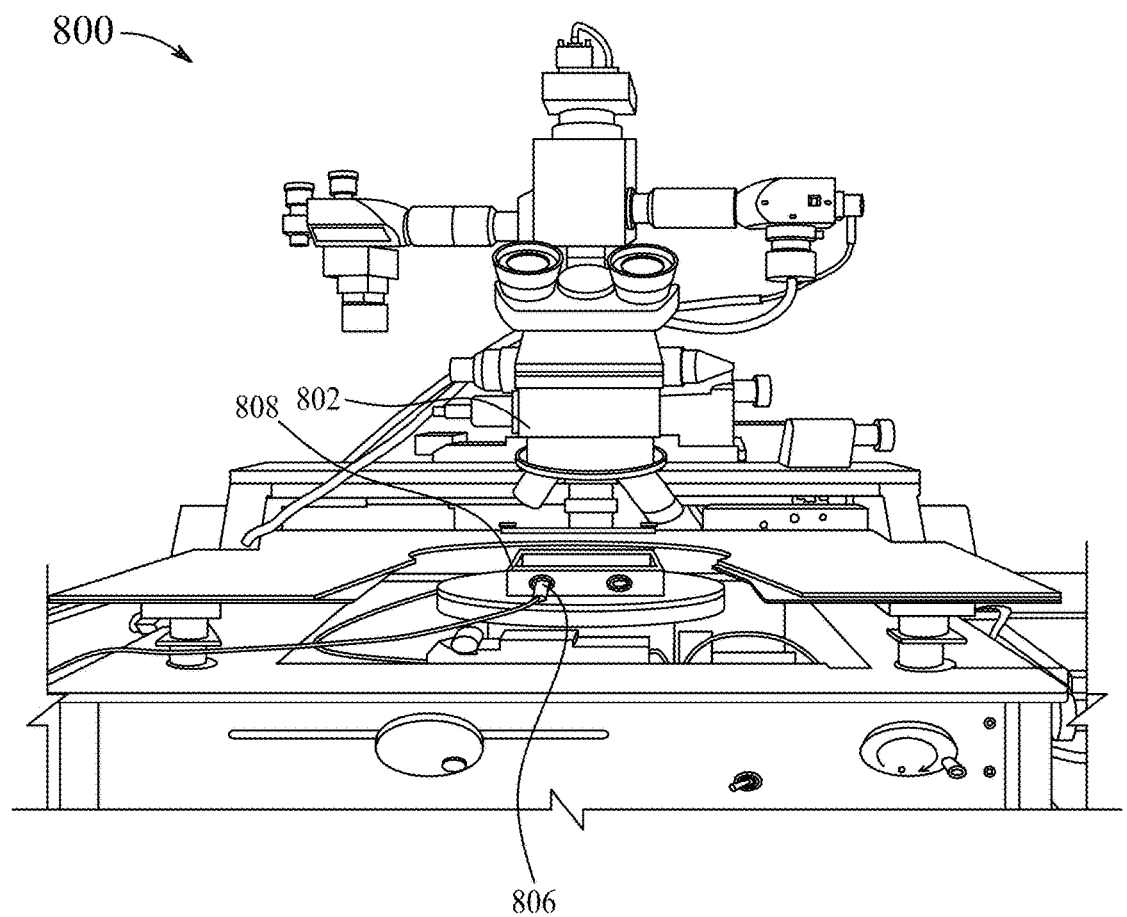
FIG. 8A illustrates an experimental setup for measuring a response of the intermittency-based analyte sensor, according to aspects of the present disclosure.

FIG. 8A illustrates an experimental setup 800 for measuring a response of the analyte sensor 100 to determine the frequencies which cause the intermittency response, according to aspects of the present disclosure. The frequencies determined are then used to design the analyte sensor. During the experiment, the analyte sensor 100 was placed in a metallic test enclosure 808 to protect against stray magnetic fields. A laser-Doppler vibrometer (LDV) 802 was used to measure the response of the analyte sensor 100 optically. During the experiment, the response of the analyte sensor 100 was observed to be a first out-of-plane bending mode. In an aspect, the out-of-plane bending is defined as a process in which if a load/moment is applied to perpendicular to a middle plane of the micromechanical beam, the micromechanical beam will curve and "bend out of" its original plane.

During the experiment, the function generator (not shown in FIG. 8A) was employed for applying the desired waveform. An oscilloscope (not shown in FIG. 8A) was employed for collecting optical measurements of the motions of the micromechanical beam. In an aspect, the function generator and the oscilloscope were electrically coupled to the experimental setup 800 using electrical BNC ("Bayonet Neill-Concelman") cables 806. The electrical BNC cables 806 are configured to connect/disconnect a radio frequency connector used for coaxial cable.

Figure 8B:
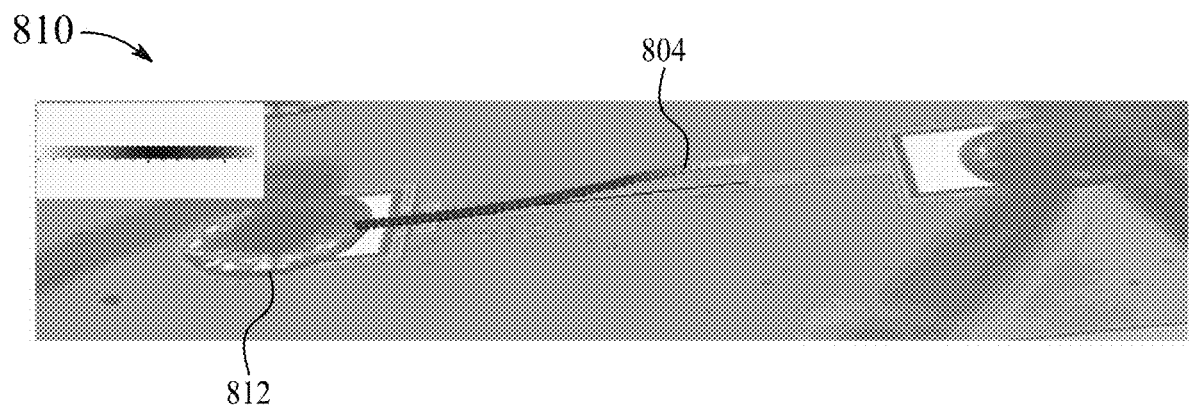
FIG. 8B illustrates a multi-point scan of the first analyte sensor, according to aspects of the present disclosure.

FIG. 8B illustrates a multi-point scan 810 of the first analyte sensor, according to aspects of the present disclosure. As shown in FIG. 8B, the multi-point scan 810 was performed to investigate an out-of plane mode shape of the first analyte sensor. The multi-point scan 810 demonstrates the movement of the micromechanical beam 804. The contact pad 812 is connected with the fixed end of the micromechanical beam 804. In an aspect, the multi-point scan 810 includes sixty measurement points along the micromechanical beam 804. The multi-point scan 810 was conducted under the excitation of the pulse train to identify the fundamental mode shape.

Figure 8C:
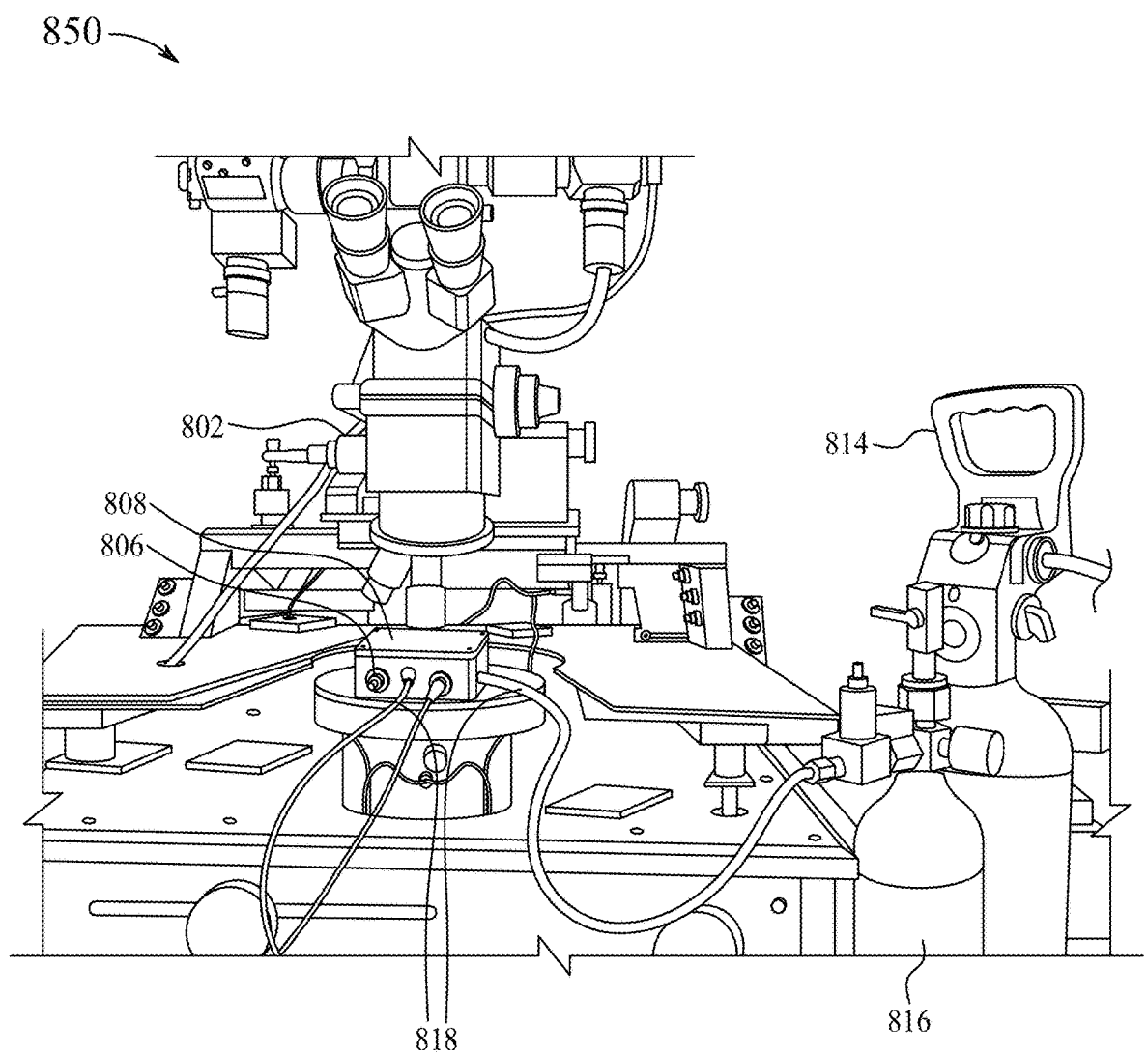
FIG. 8C illustrates another experimental setup for measuring a response of the intermittency-based analyte sensor, according to aspects of the present disclosure.

FIG. 8C illustrates another experimental setup 850 for measuring a response of the analyte sensor, according to aspects of the present disclosure. The experimental setup 850 includes the LDV 802, the analyte sensor, the test enclosure 808, two electrical BNC cables 806, the function generator, a high voltage amplifier, the oscilloscope, a nitrogen gas canister 814, an ethanol gas canister 816 having a pre-calibrated ethanol vapor charge containing and two gas inlets 818. During the experiment, the analyte sensor was placed in the metallic test enclosure 808 to protect against stray magnetic fields.

The function generator (not shown) was employed for applying the desired waveform. The oscilloscope (not shown) was employed for collecting optical measurements of the motions of the micromechanical beam. In an aspect, the function generator and the oscilloscope were electrically coupled to the experimental setup 800 using the electrical BNC cables 806. The test enclosure 808 is equipped with two BNC ports and a quartz glass window to allow for optical detection. The gas pressure in both gas canisters 814, 816 is set to P=20 psi to reduce variation between the analyte sensor performance in air and inside the test chamber, thereby ensuring any response is not due to the pressure effect.

During the experiment, the function generator applies the desired voltage waveform and frequency, $f_o$, to the analyte sensor. Then, valve of the nitrogen gas canister 814 is opened, subjecting the polymeric sensing material, allowing a flow of Grade IV nitrogen for 15 minutes in order to release ethanol and other absorbed molecules, thereby resetting the environment. Next, the valve of the pre-calibrated ethanol canister 816 is opened to allow pre-calibrated ethanol flow into the test enclosure 808. The sensor response is measured using the LDV 802 and monitored using the CCD video camera to detect the jump corresponding to a cyclic-fold bifurcation. The oscilloscope records the beam tip velocity and displacement measured by the LDV 802. The operating point of the analyte sensor is set at a frequency $f_o$ below the lower cyclic-fold bifurcation $f_{pl}$. A manual forward sweep starting from $f_{pl}$ 10 Hz was carried out with a frequency step of f=1 Hz to obtain a better estimate of the bifurcation point $f_{pl}$. In an aspect, an operational set-off frequency may be defined as: $\delta f = f_{pl} - f_o$. During the experiment, a stability study was conducted to determine the closest operating point under ambient external disturbances by increasing the set-off frequency δf in steps of 1 Hz. A set-off frequency was declared stable if it was sustainable for longer than 15 minutes. In an aspect, a minimum set-off frequency was determined during the experimental setup. For example, the minimum set-off frequency was δf=5 Hz.

The following examples are provided to illustrate further and to facilitate the understanding of the present disclosure.
First Experiment: Determining the Static Response The first experiment was conducted for determining the static response of the analyte sensor 100, when a triangular voltage waveform was applied to the analyte sensor 100, using the function generator. In a non-limiting example, the function generator is a AFG3000C function generator (manufactured by Tektronix, Inc. located at 14150 Southwest Karl Braun Drive, PO Box 500 Beaverton, OR 97077).

Figure 9:
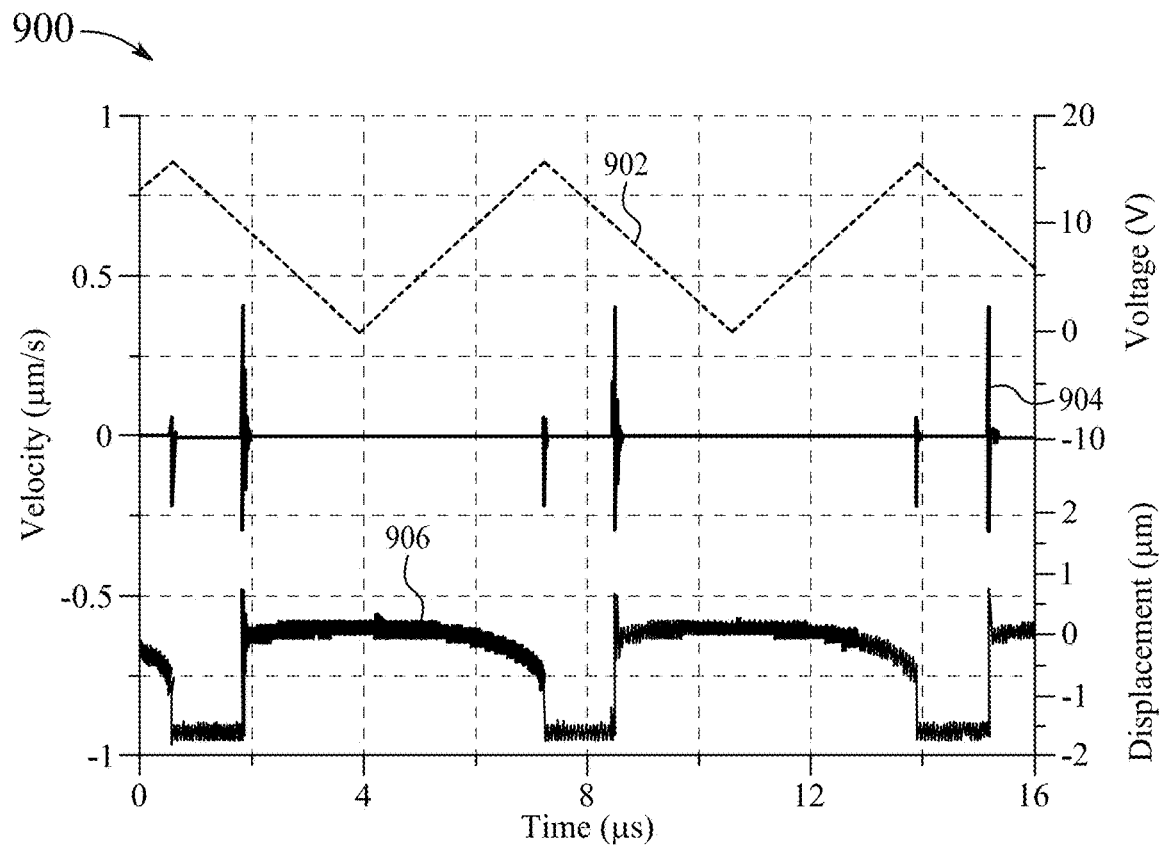
FIG. 9 is an exemplary graph illustrating an excitation voltage signal, measured tip velocity and displacement of the first analyte sensor, according to aspects of the present disclosure.

FIG. 9 is an exemplary graph 900 illustrating an excitation voltage signal and the measured tip velocity and displacement of the first analyte sensor. Curve 902 indicates an excitation voltage signal and curve 904 indicates a measured tip velocity of the micromechanical beam. Curve 906 indicates a measured displacement during a pull-in and pull-off test of the first analyte sensor. During experiments, the signal frequency was set to f=150 Hz to ensure a quasi-static response. The tip velocity and displacement of the micromechanical beam were measured using the LDV. The oscilloscope was used to record the excitation signal and the measured tip velocity and displacement, as shown in FIG. 9. In an example, the oscilloscope is a MSO2024B oscilloscope manufactured by Tektronix, Inc. located at 14150 Southwest Karl Braun Drive, PO Box 500 Beaverton, OR 97077.

As the voltage was increased linearly along a positive-slope ramp, the micromechanical beam deflected continuously towards the substrate. The peak voltage of the waveform was increased manually in steps of 15 mV until pull-in occurred. The static pull-in voltage ($V_{pi}$=15.60 V) was detected as a sudden change in beam deflection, as shown in FIG. 9. As the voltage dropped along the negative ramp, the micromechanical beam stayed in contact with the substrate until pull-off occurred at a lower voltage. Pull-in and pull-off voltages can also be detected as the voltages corresponding to the small and large peaks, respectively, observed in the time-history of the micromechanical beam tip velocity. The measured capacitive gap (d=1.86 μm) was calculated as the displacement of the micromechanical beam tip from its neutral position at 0V to the pull-in position where the micromechanical beam came into contact with the substrate. Using the gap distance and the measured planar dimensions of the micromechanical beam, the thickness is calculated, i.e., h=1.8 μm by matching the measured static pull-in voltage to that predicted by a reduced-order model, known in the art.

Figure 10:
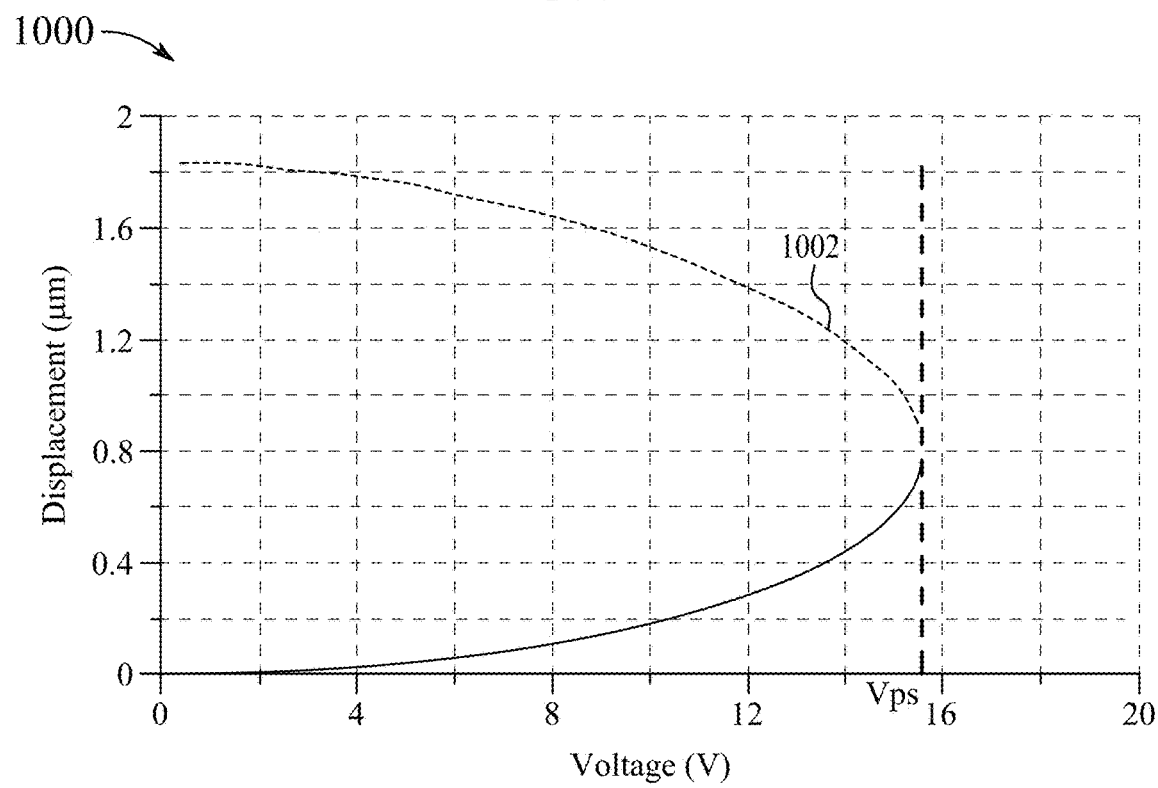
FIG. 10 is an exemplary graph illustrating a static response of the first analyte sensor under direct current (DC) voltage, according to aspects of the present disclosure.

FIG. 10 is an exemplary graph 1000 illustrating a static response of the first analyte sensor under DC voltage, according to aspects of the present disclosure. Curve 1002 indicates stable and unstable equilibria of the first analyte sensor and its pull-in voltage. As shown in FIG. 10, the stable and unstable equilibria were calculated using the reduced-order model. In an aspect, significant inter-chip, intra-chip, and among fabrication cause variability in the micromechanical beam thickness and capacitor gap.

Figure 11A:
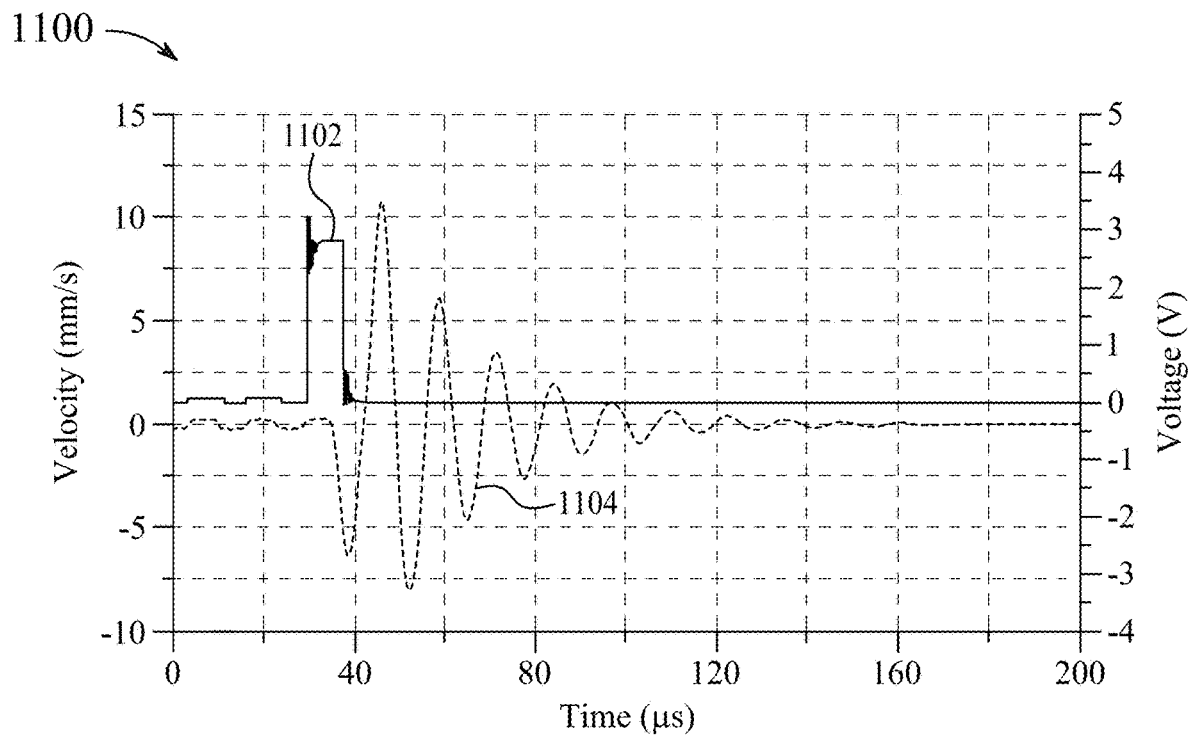
FIG. 11A is an exemplary graph illustrating an averaged time-history of tip velocity of the first analyte sensor under a pulse train with f=1 kHz and an amplitude of 3 V, according to aspects of the present disclosure.

FIG. 11A is an exemplary graph 1100 illustrating an averaged time-history of the tip velocity of the first analyte sensor under a pulse train with f=1 kHz and an amplitude of 3 V. Curve 1102 indicates a voltage signal and curve 1104 indicates a velocity signal. The square pulse train shown by curve 1102 has an amplitude 3V, frequency f=1 kHz, and duty cycle of 0.8%, was applied to the first analyte sensor to determine fundamental natural frequency of the first analyte sensor in ambient air (atmospheric pressure). The time-history of the first analyte sensor beam tip velocity was measured optically and averaged over 512 samples using the oscilloscope, as shown by 1104 in FIG. 11A.

Figure 11B:
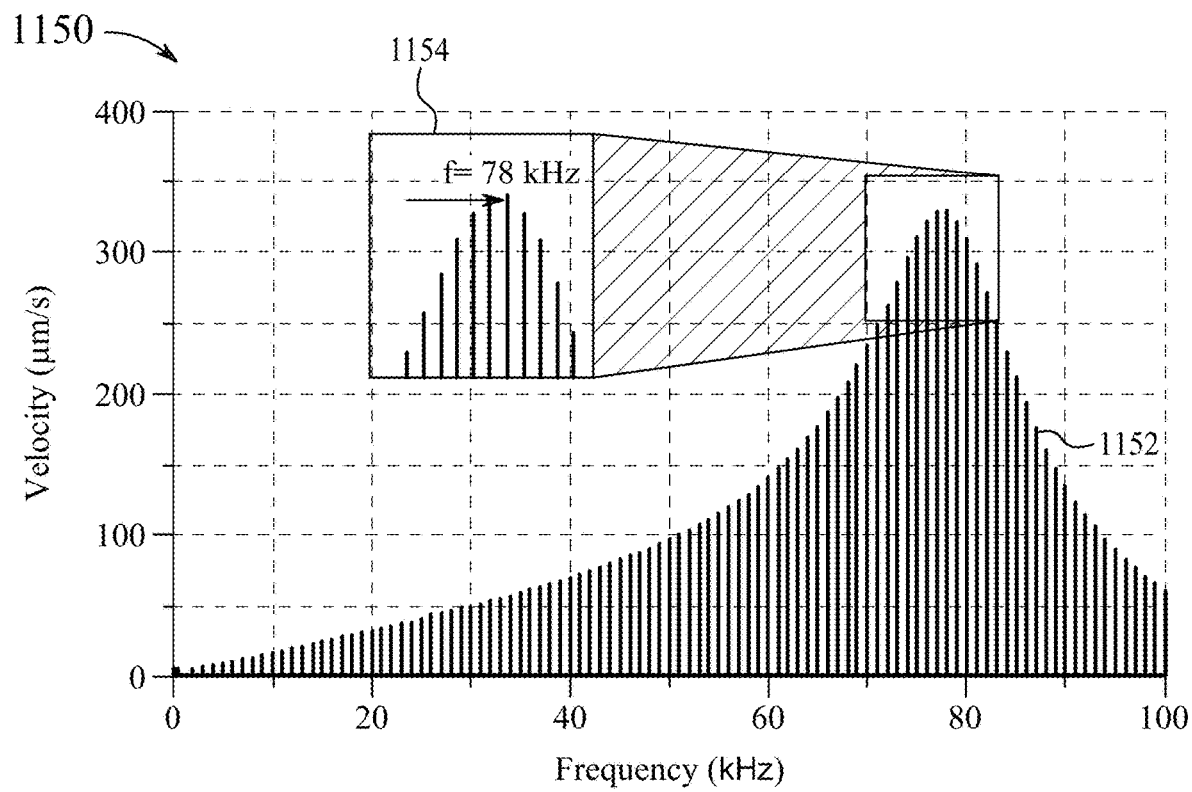
FIG. 11B is an exemplary graph illustrating a velocity Fast Fourier Transform (FFT) of the first analyte sensor, according to aspects of the present disclosure.

FIG. 11B is an exemplary graph 1150 illustrating a velocity FFT of the first analyte sensor of FIG. 1, according to aspects of the present disclosure. Curve 1152 indicates the velocity FFT of the first analyte sensor and block 1154 shows an enlarged view of a dominant peak at $f_n$=78 kHz. During experiments, the FFT of the beam tip velocity was measured using the vibrometer. The dominant peak in FIG. 11B was identified as the damped natural frequency at $f_n$=78 kHz of the unactuated analyte sensor. The damped natural frequency and quality factor were also obtained from the time-history as $f_n$=78 kHz and Q=6.24. The settling time was estimated as $t_s$=160 μs. As shown in FIG. 8B. The multi-points scan includes sixty measurement points along the beam axis, was carried out under the excitation of the pulse train to identify the fundamental mode shape. It was found to be the first out-of-plane bending mode. It can be observed that the natural frequency of the resonator will vary as a function of the RMS of the excitation voltage waveform.

Figure 12A:
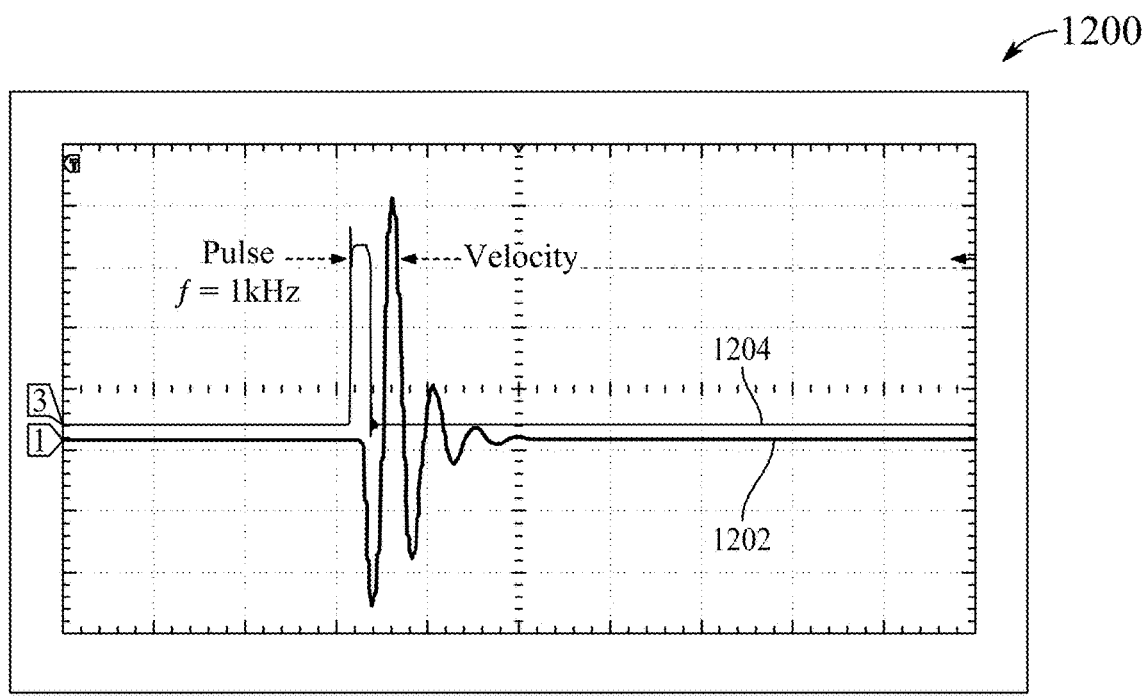
FIG. 12A is an exemplary graph illustrating an averaged time-history of tip velocity of the second analyte sensor under a pulse train with f=1 kHz and an amplitude of 3 V, according to aspects of the present disclosure.

FIG. 12A is an exemplary graph 1200 illustrating an averaged time-history of tip velocity of the second analyte sensor, according to aspects of the present disclosure. Curve 1202 indicates a pulse train with f=1 kHz and an amplitude of 3 V, and curve 1204 indicates a velocity signal. In similar to FIG. 11A and FIG. 11B, same experimental procedure was conducted in the second analyte sensor. The damped natural frequency and quality factor were obtained from the time-history as $f_d$=54 kHz and Q=2.1. The settling time was measured as $t_s$=61.70 μs.

Figure 12B:
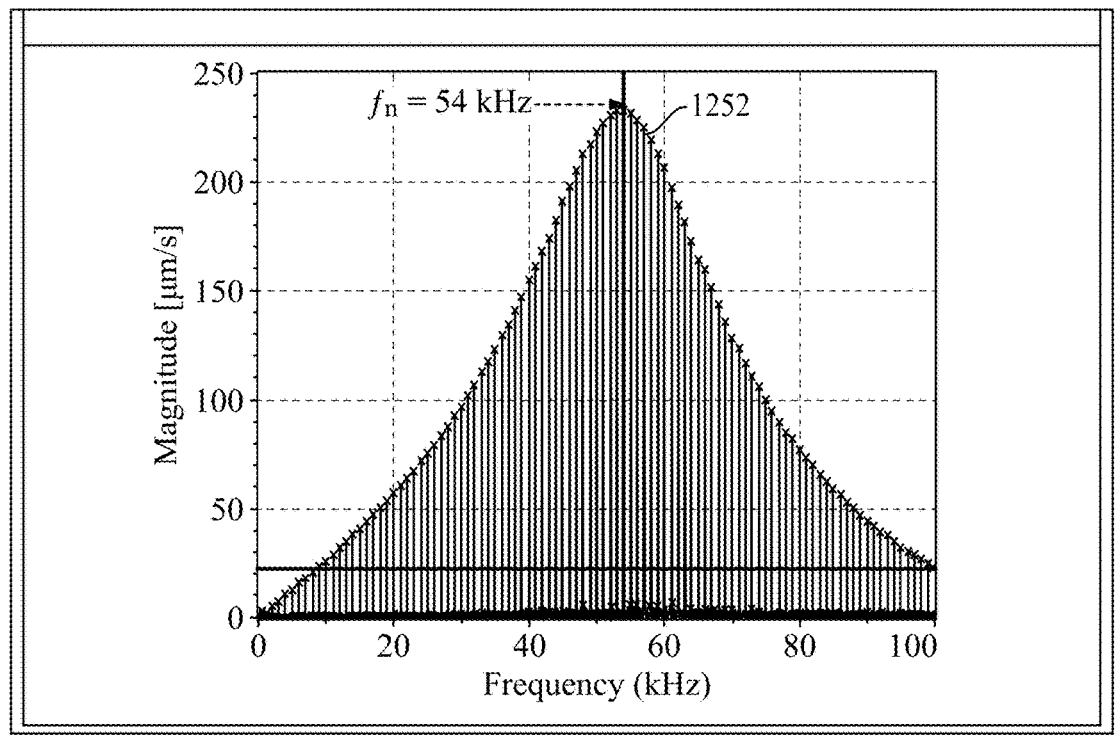
FIG. 12B is an exemplary graph illustrating a velocity FFT of the second analyte sensor, according to aspects of the present disclosure.

FIG. 12B is an exemplary graph 1250 illustrating velocity FFT 1252 of the second analyte sensor. The velocity FFTs response was also recorded from the LDV 802. The LDV 802 shows the highest peak velocity response at the sensor's natural frequency, $f_d$=54 kHz as shown in FIG. 12B.

Figure 13:
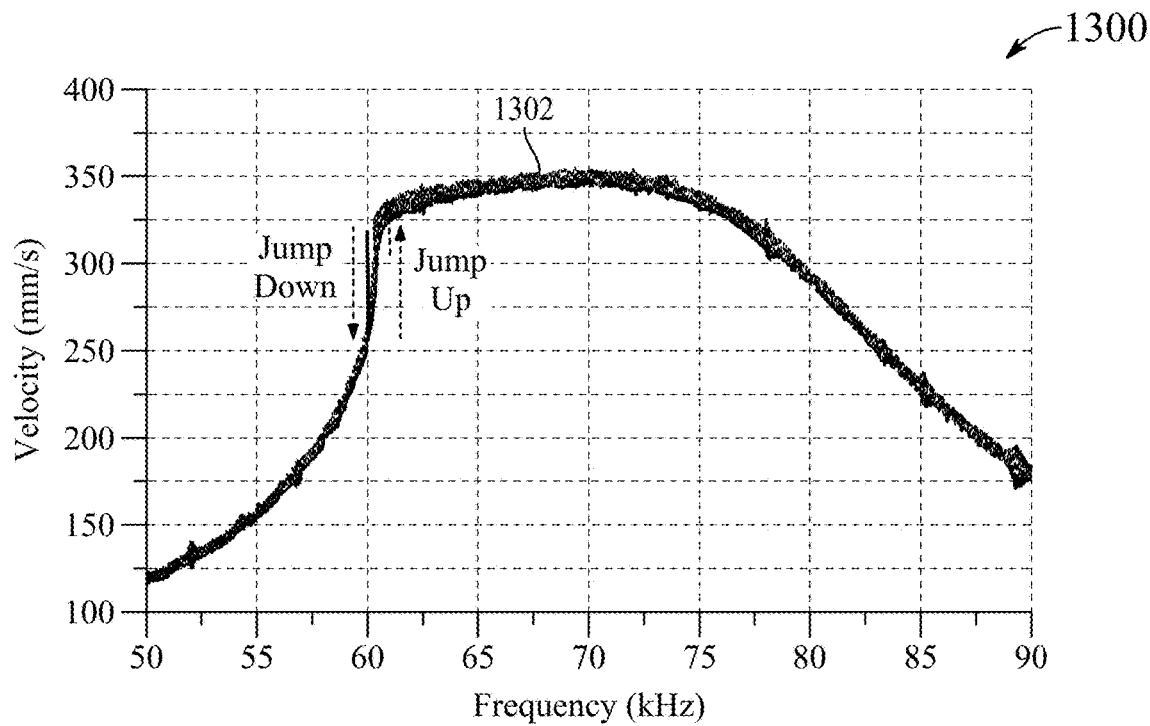
FIG. 13 is an exemplary graph illustrating a measured frequency-response of the first analyte sensor at $V_a$=7.350 V, according to aspects of the present disclosure.

FIG. 13 is an exemplary graph 1300 illustrating a measured frequency-response of the first analyte sensor at $V_a$=7.350 V, according to aspects of the present disclosure. Curve 1302 illustrates a backward sweep. In an aspect, the backward sweep is equal to a forward sweep. A sensor is characterized by conducting forward and backward frequency sweeps of the actuation waveform over a wide frequency range. For example, a slew rate was set to 2.5 kHz/s to minimize transient effects. Time-domain data was collected using the oscilloscope in time windows of 0.4 s at a sampling rate of $f_s$=313 kHz. The frequency response was obtained by evaluating the RMS of the measured signal over a time window of twenty excitation periods (20T) and assigning the result to the frequency value at the window mid-point. The frequency-response curve (shown by 1302) of the first analyte sensor tip velocity over the frequency range f=[50-90] kHz is shown in FIG. 13 for the excitation amplitude of $V_a$=7.350V.

The effective nonlinearity of the first analyte sensor is softening due to the dominance of electrostatic forcing over mechanical hardening. As a result, the dominant peak in the frequency-response curve (nonlinear resonance) is skewed to the left. The curve 1302 is composed of an upper branch of larger orbits and a lower branch of smaller orbits. The two branches terminate in cyclic-fold bifurcations (also known as cyclic bifurcations and symmetry breaking bifurcations). The response jumps up and down between the two branches at those bifurcation points without going through pull-in. The jump up occurs during the forward sweep, while the jump-down occurs during the backward sweep. The forcing over is slightly beyond the measurement limits, as a result both bifurcations and the jumps are located at the same frequency f=60.313 kHz. The flatness of the upper branch separates the increasing importance of the nonlinear squeeze-film damping mechanism for larger orbits that approach the substrate. Discrete peaks appear in the frequency-response curve at f=60 kHz in the forward sweep and f=61 kHz in the backward sweep. At these locations, the analyte sensor response diverges from smaller, lower branch, orbits to larger orbits and vice versa.

Figure 14:
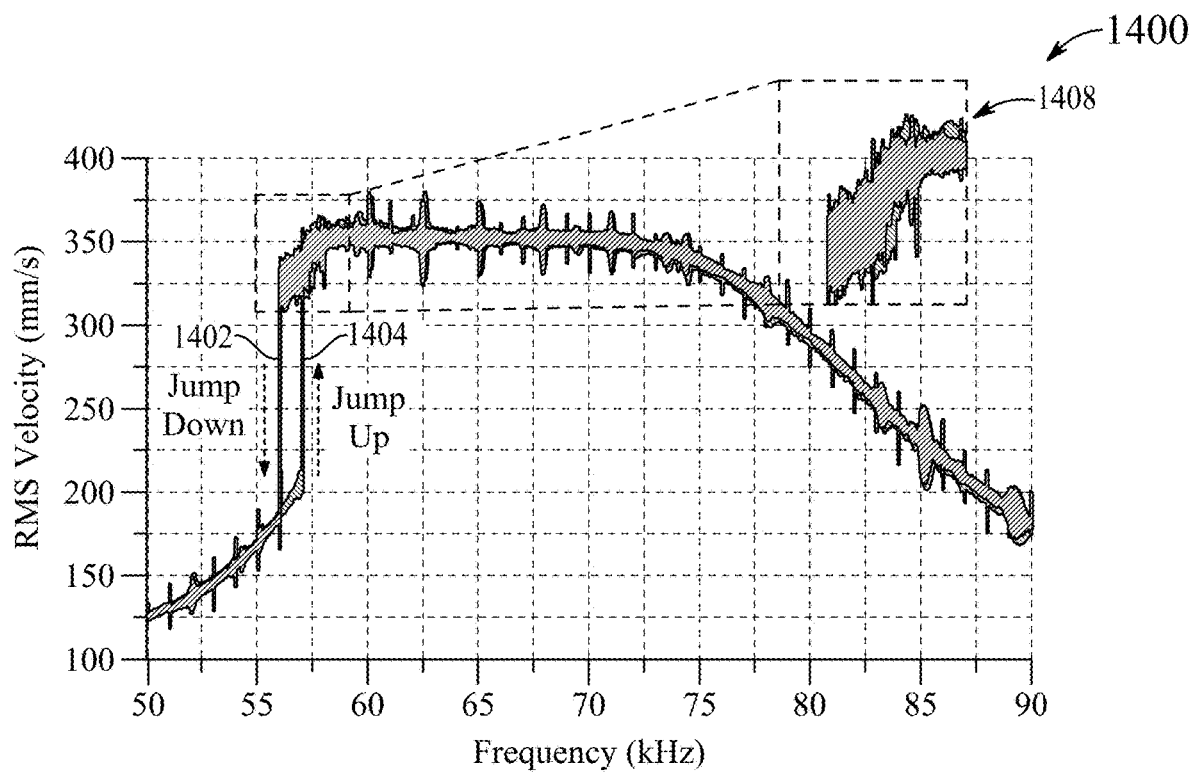
FIG. 14 is an exemplary graph illustrating a measured frequency-response of the first analyte sensor at $V_a$=7.446 V, according to aspects of the present disclosure.

FIG. 14 is an exemplary graph 1400 illustrating the measured frequency-response of the first analyte sensor at $V_a$=7.446 V. Curve 1402 indicates the forward sweep and curve 1404 indicates the backward sweep. The frequency-response of the first analyte sensor and the tip velocity for a larger excitation amplitude of $V_a$=7.446V is shown in FIG.

14. The flat region in the upper branch extends over a larger frequency range as more orbits become larger and approach the substrate. A middle branch can be observed between the upper and lower branches, which does not appear at the lower forcing level curve, FIG. 13. In an aspect, tapping mode oscillations occur along this branch during which the sensor tip comes into line-contact with the substrate. Block 1408 represents an enlarged view of the tapping mode oscillations. As known, in the tapping mode the cantilever oscillates at or slightly below its resonant frequency. The branch is characterized by a positive slope due to the substrate limiting the amplitude of sensor displacement to the capacitive gap. As a result, the measured velocity varies almost linearly with the excitation frequency along the middle branch.

Figure 15A:
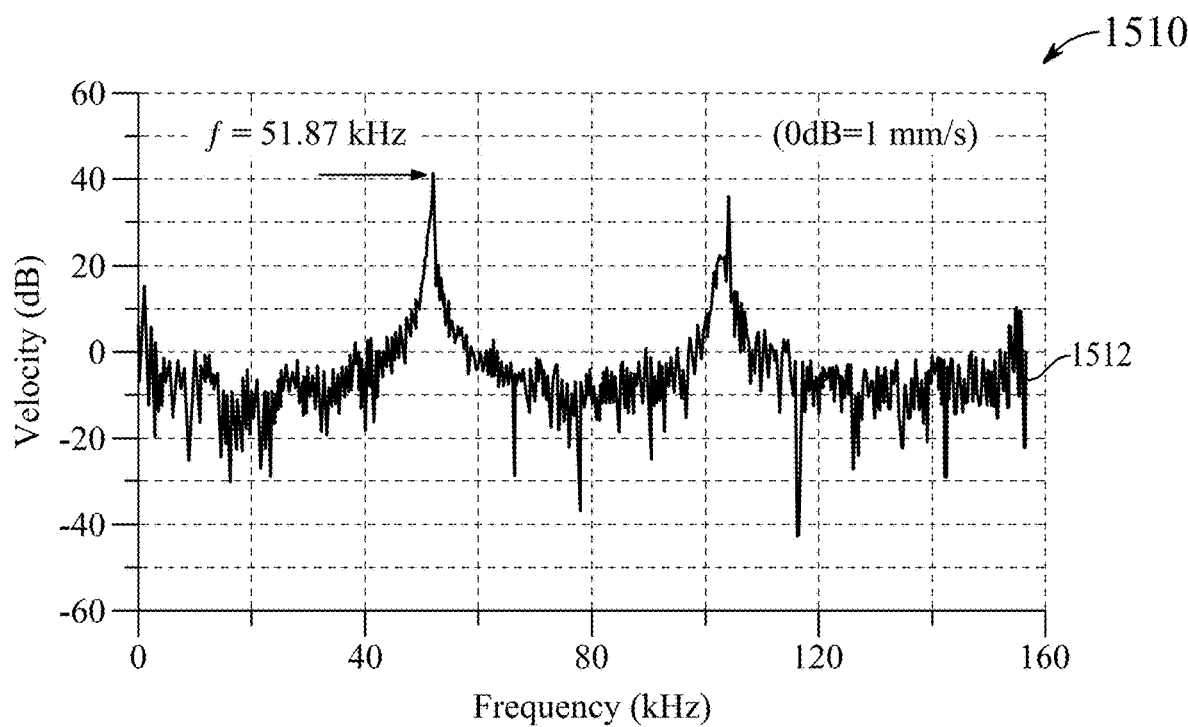
FIG. 15A is an exemplary graph illustrating an FFT of the tip velocity of the first analyte sensor along a lower branch, according to aspects of the present disclosure.

FIG. 15A is an exemplary graph 1510 of the FFT of the tip velocity of the first analyte sensor along a lower branch, according to aspects of the present disclosure. The sensor response is compared at points along the branches as shown in FIG. 14. The FIG. 15A shows the FFT of the tip velocity in dB-scale. Along the lower branch, the forced response is observed at the excitation frequency f=51.87 kHz, as shown in FIG. 15A. In an aspect, the forced response also generates higher harmonics. Curve 1512 indicates the FFT of the tip velocity at the lower branch.

Figure 15B:
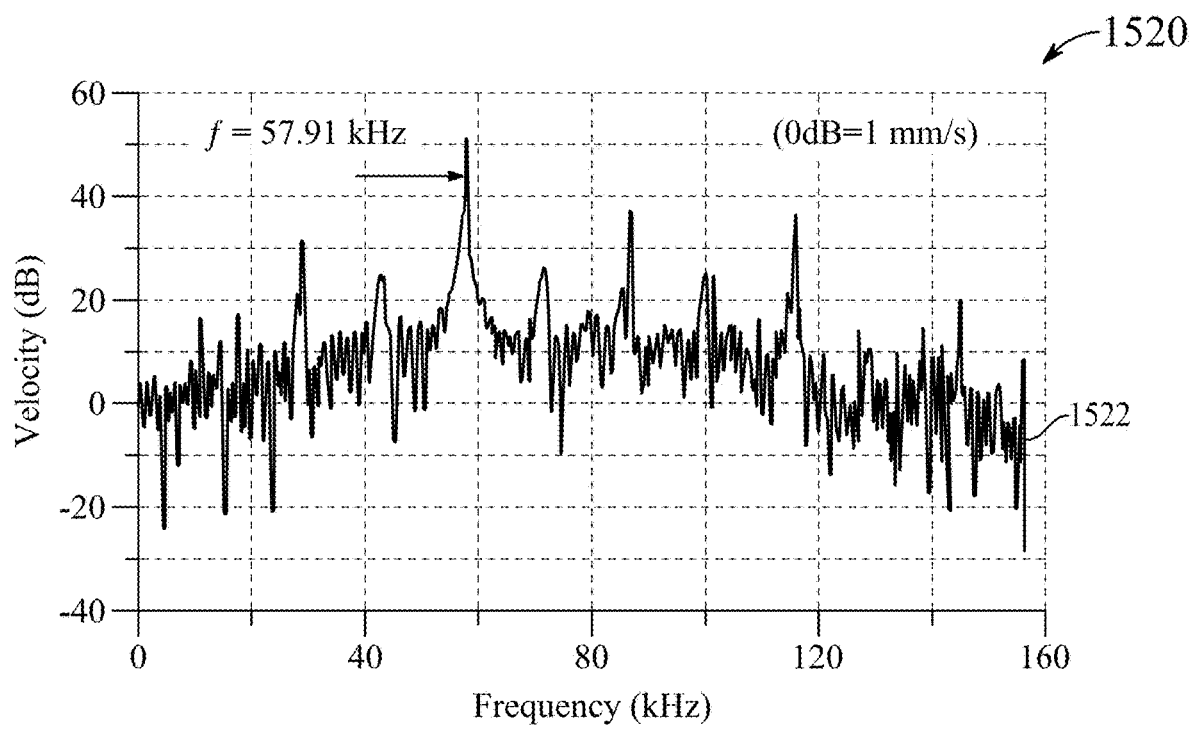
FIG. 15B is an exemplary graph illustrating the FFT of the tip velocity of the first analyte sensor along a middle branch, according to aspects of the present disclosure.

FIG. 15B is an exemplary graph 1520 of the FFT of the tip velocity of the first analyte sensor along a middle branch, according to aspects of the present disclosure. Along the middle branch at f=57.91 kHz, tapping mode oscillations elevate the noise floor by ~18 dB and introduce other harmonics in the response spectrum, as shown in FIG. 15B. Curve 1522 indicates the FFT of the tip velocity at the middle branch.

Figure 15C:
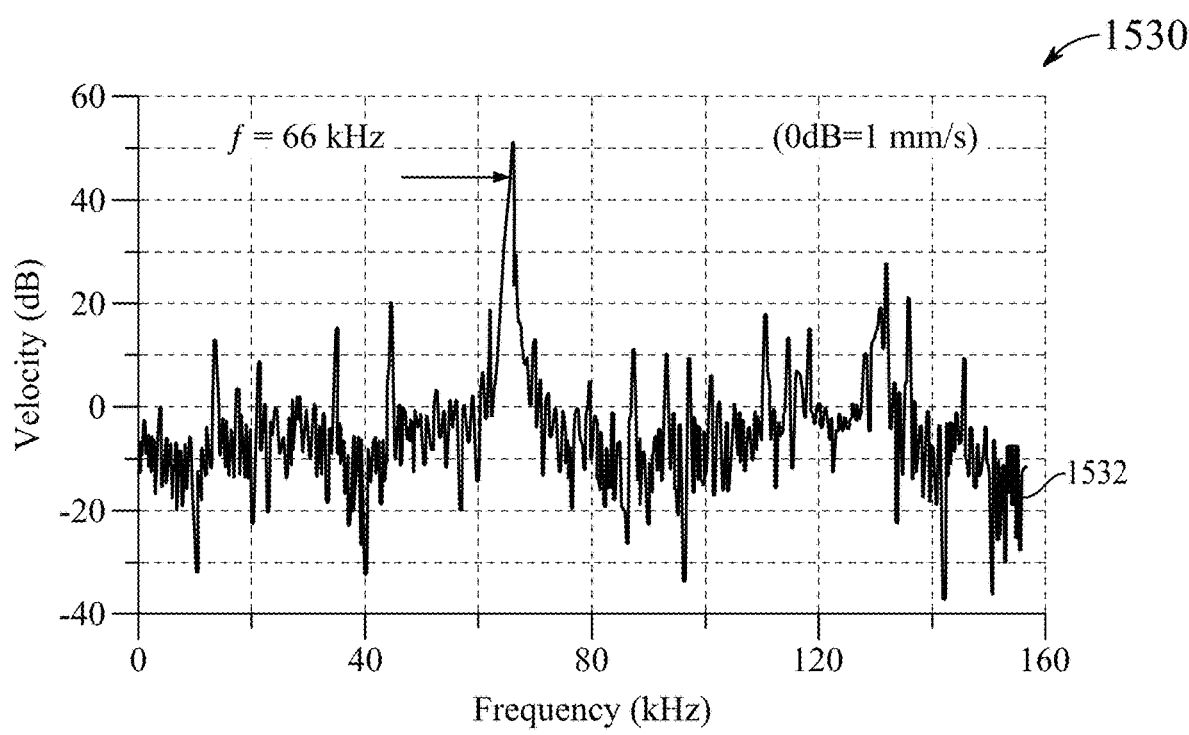
FIG. 15C is an exemplary graph illustrating the FFT of the tip velocity of the first analyte sensor along an upper branch, according to aspects of the present disclosure.

FIG. 15C is an exemplary graph 1530 of the FFT of the tip velocity of the first analyte sensor along an upper branch, according to aspects of the present disclosure. Along the upper branch, the stronger nonlinearity is present in the larger orbit at f=66 kHz. The stronger nonlinearity produces harmonics besides the frequency f and its multiples, but does not elevate the noise floor, as shown in FIG. 15C. Curve 1532 indicates the FFT of the tip velocity at the upper branch. A homoclinic entanglement between the stable and unstable manifolds occurs at the end of the upper branches and at the beginning of the middle branch (f=58 kHz). It interrupts the safe basin of oscillations and precludes the appearance of larger orbits beyond this point. Instead, orbits along the middle branch come into contact with the substrate giving rise to tapping mode oscillations. In backward sweeps, the tapping mode oscillations persist along the mid-branch until the response passes out of resonance and falls down to the lower branch at f=55.986 kHz. During forward sweeps, the response jumps up from the lower branch to the mid-branch at the lower cyclic fold bifurcation point f=56.810 kHz. A hysteric region appears between these jumps.

Figure 16:
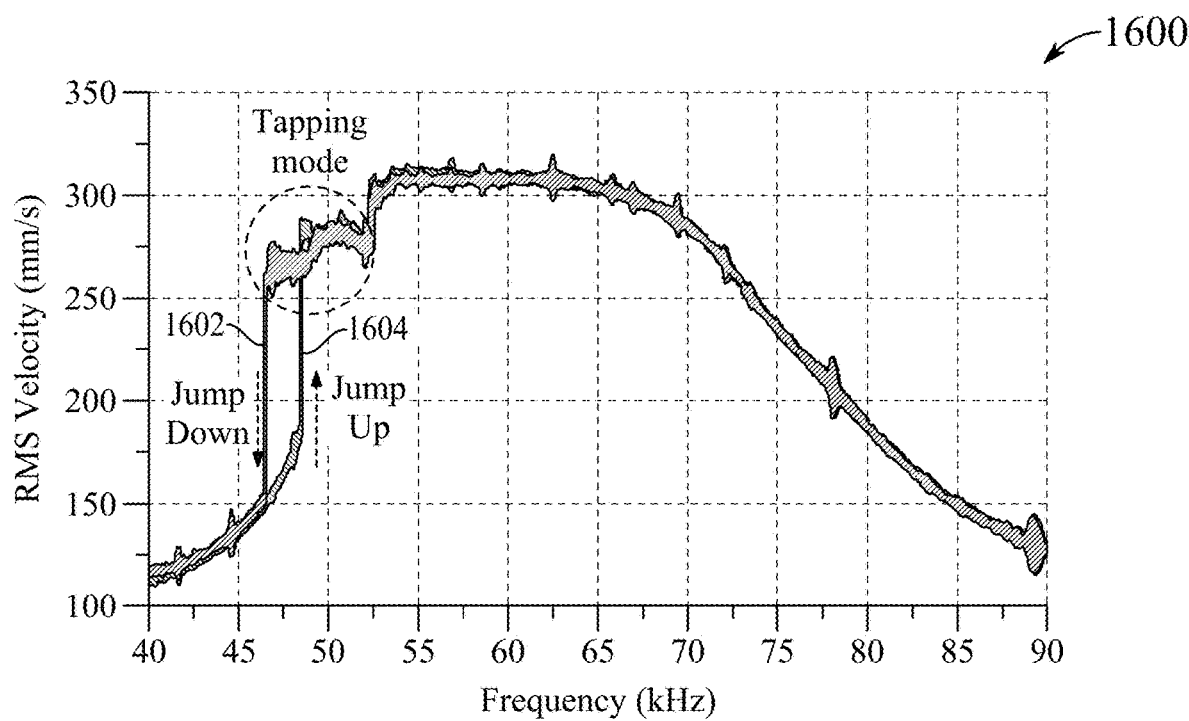
FIG. 16 is an exemplary graph illustrating a measured frequency-response of the first analyte sensor at $V_a$=6.86 V, according to aspects of the present disclosure.

FIG. 16 is an exemplary graph 1600 illustrating measured frequency-response of the first analyte sensor at $V_a$=6.86 V, according to aspects of the present disclosure. Curve 1602 illustrates the backward sweep. Curve 1604 illustrates the forward sweep. The waveform is set to $V_a$=6.86V and the response is evaluated over the frequency range f=40 kHz to 90 kHz. The middle branch appearing between the upper and lower branches in this curve was not observed at lower forcing levels $V_a$=(6.86V). The jump-up during the forward sweep at $f_{pl}$=48.50 kHz corresponds to the lower cyclic fold bifurcation. The jump-down during the backward sweep at $f_{pu}$=46.50 kHz corresponds to the upper cyclic-fold bifurcation. Both jumps occur between the lower branch and the middle branch populated by tapping mode oscillations. Block 1608 represents an enlarged view of the tapping mode oscillations. The differences in the locations of the jumps and the size of the hysteretic region are due to inter-chip fabrication variability.

Figure 17:
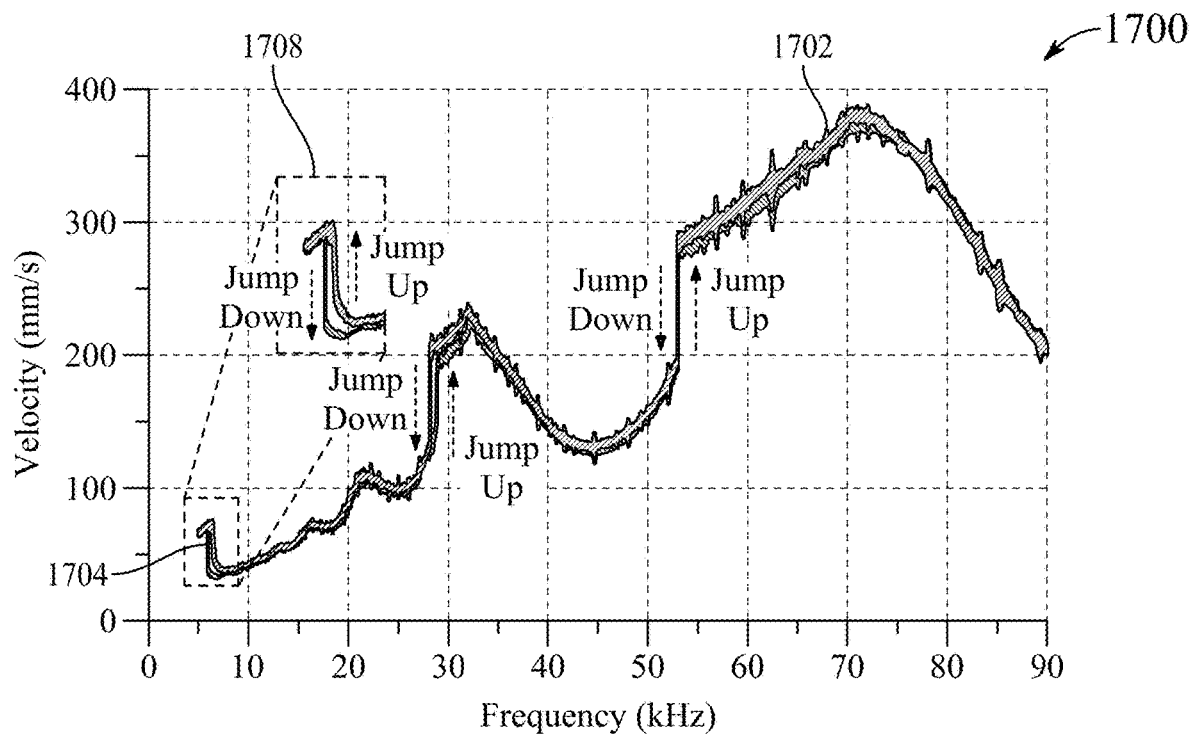
FIG. 17 is an exemplary graph illustrating a measured frequency-response of the first analyte sensor at $V_a$=7.725 V, according to aspects of the present disclosure.

FIG. 17 is an exemplary graph 1700 illustrating a measured frequency-response of the first analyte sensor at $V_a$=7.725 V, according to aspects of the present disclosure. Curve 1702 indicates the backward sweep and curve 1704 shows the forward sweep. Block 1708 shows an enlarged view of the tapping mode oscillations. During the experiments, the measured frequency-response curve of the first analyte sensor is excited by a voltage amplitude of $V_a$=7.725V. Increasing the excitation amplitude to $V_a$=7.725V, the frequency response is obtained over a wider frequency range of f=5.0-90 kHz, as shown by FIG. 17. For excitation frequencies below 5 kHz, no periodic motions were observed with the sensor going into and remaining in contact with the substrate throughout the excitation cycle. The frequency-response curve shows peaks in the vicinity of the super harmonic resonances of order two and three as well as primary resonance. Tapping mode (middle branch) orbits, characterized by a positive slope in the response curve, were observed in a low-frequency non-resonant region f=5.0 6.490 kHz and in the vicinity of the super harmonic resonance of order-two f=28.385 32.892 kHz as well as primary resonance f=53.0 70.0 kHz.

During the experiments, jumps were also observed at the super harmonic resonance of order-two where a hysteretic region developed with a jump-up occurring during forward sweeps at f=28.822 kHz and a jump-down occurring during backward sweeps at f=28.385 kHz. At primary resonance, there was no hysteresis with the jump-up during forward sweeps and jump-down during backward sweeps occurring at the same frequency f=53 kHz. The mechanisms underlying the jumps at super harmonic resonance are the same as those discussed above. The reason for the disappearance of hysteresis in the vicinity of primary resonance is that the homoclinic entanglement has further eroded the basin of safe motions as the excitation level increased to the point of precluding lower branch orbits at frequencies beyond f=53 kHz and upper branch orbits at frequencies below f=71.097 kHz. Throughout this range, the only possible motions are tapping mode oscillations.

In the non-resonant region, a jump-down occurs during forward frequency sweeps from the tapping branch to the lower branch, whereas the jump-up from the lower branch to the tapping branch occurs during the backward sweeps. A hysteretic region exists between these two jumps. It is evident that this behavior is the reverse of that observed in the hysteric regions located in the vicinity of primary resonance for $V_a$=7.446V and super harmonic resonance for $V_a$=7.725V, where the jump-up occurs during forward sweeps and the jump-down during backward sweeps. Further, it was noticed that the size of the tapping mode orbits observed at low frequency was large even though they occur in a non-resonant region f=$f_1$<<1. The existence of the non-resonant branch of tapping mode oscillations was a result of the appearance Shilnikov orbits in this frequency range. In an aspect, the Shilnikov or Shilnikov bifurcation stands for the homoclinic bifurcation of a saddle-focus equilibrium state that elicits the onset of complex dynamics in a system. The reversal in the locations of the jump-up and jump-down are due to the termination of this branch with a Shilnikov bifurcation.

Figure 18:
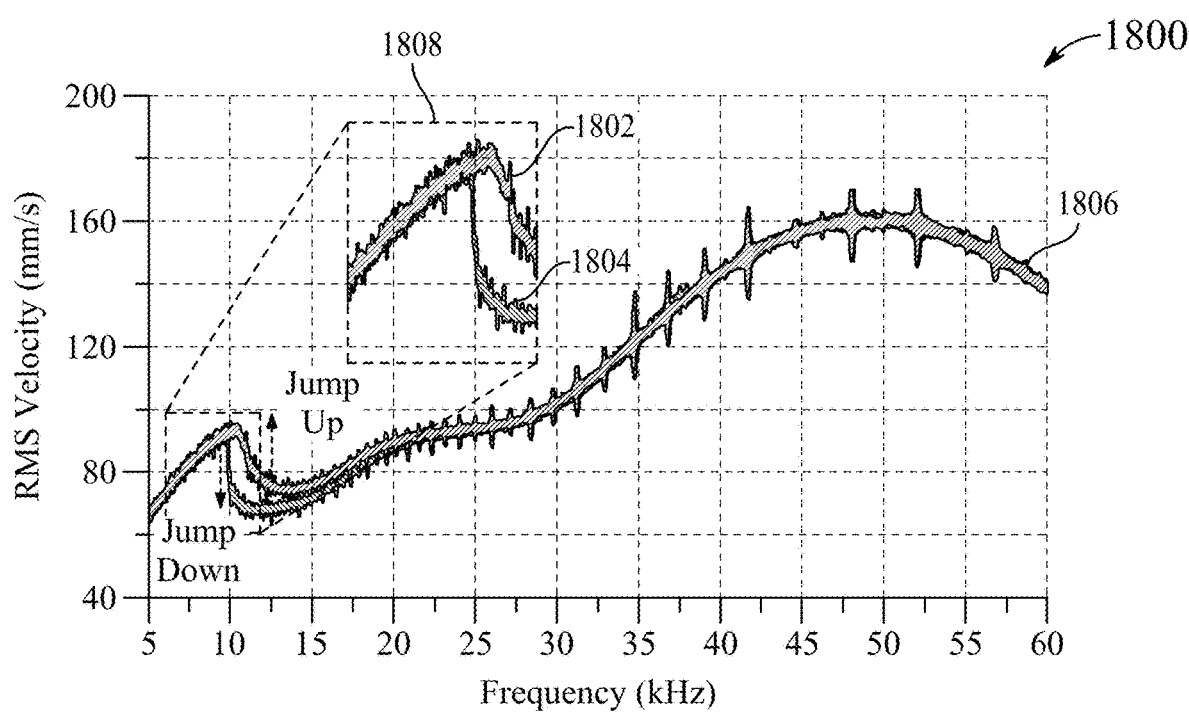
FIG. 18 is an exemplary graph illustrating a measured frequency-response of the second analyte sensor at $V_a$=7.125 V, according to aspects of the present disclosure.

FIG. 18 is an exemplary graph 1800 illustrating the measured frequency-response of the second analyte sensor at $V_a$=7.125 V, according to aspects of the present disclosure. Curve 1802 indicates the backward sweep and curve 1804 shows the forward sweep. Block 1808 shows an enlarged view of the tapping mode oscillations. During the experiments, the frequency response of the tip velocity was obtained to characterize its response over a wide frequency range. The curve 1806 is composed of the forward and the backward frequency sweep, as shown in FIG. 18.

The voltage amplitude and frequency range were set to $V_a$=7.125V and f=5-60 kHz and the slew rate was set to 2.5 kHz/s. The curve 1806 was constructed using the procedure performed during the FIG. 17. The measured frequency-response curve of the second analyte sensor excited by the voltage amplitude $V_a$=7.125V. Forward and backward frequency-sweeps are colored in blue and red, respectively. The positive slope lines appear only in the non-resonant frequency range of f=5.0 10.627 kHz, as shown in FIG. 18, are evidence of tapping mode oscillations where the sensor tip comes into regular contact with the substrate. In this range, the tip displacement is limited to the gap distance (d=2 μm) by the substrate. A jump-down occurs during the forward sweep from the branch of tapping orbits to a branch of freely oscillating orbits at f=9.876 kHz, whereas a jump up from that branch to the tapping branch occurs during backward sweeps at f=10.627 kHz. A hysteretic region exists between the two jumps, as shown in FIG. 18.

Figure 19A:
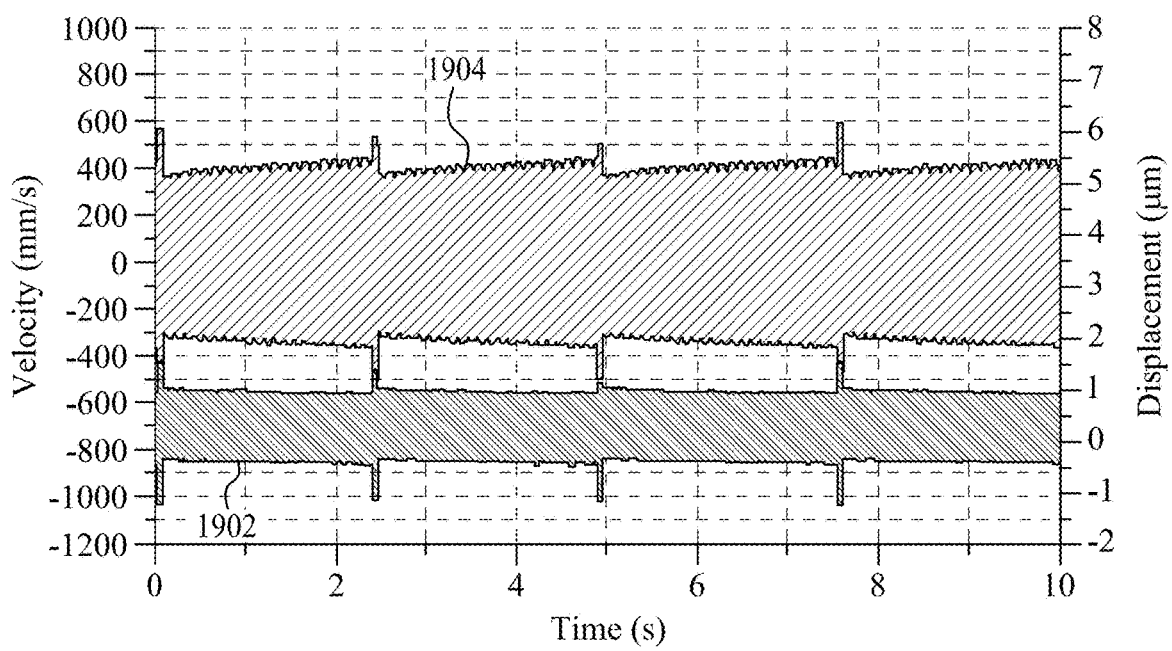
FIG. 19A is an exemplary graph illustrating tip velocity and displacement time-histories of the first analyte sensor excited by $V_a$=7.780 V at f=56.50 kHz, according to aspects of the present disclosure.

FIG. 19A is an exemplary graph 1900 illustrating tip velocity and displacement time-histories of the first analyte sensor excited by $V_a$=7.780 V at f=56.50 kHz. Curve 1902 indicates the displacement and curve 1904 shows the velocity. In an aspect, the first analyte sensor operates using the intermittency type-I. The intermittency type-I is a known route to chaos subsequent to a cyclic-fold bifurcation. It was observed experimentally in the response of the first analyte sensor when excited with a voltage amplitude of $V_a$=7.780V as the signal frequency was dropped along the mid-branch to f=56.50 kHz. At this level, an entanglement of the stable and unstable manifolds extends to interrupt the basins of attraction of orbits along the upper and lower branches as described above. Laminar flow episodes of free almost periodic oscillations, exist in the vicinity of a ghost orbit interrupted by the entanglement. The oscillations grow over time before bursting into irregular tapping mode oscillations and being re-injected back to small freely oscillating motions around the ghost orbit. The size of the ghost orbit, minimum oscillations during the laminar phase, reveals that it belongs to the lower branch.

Figure 19B:
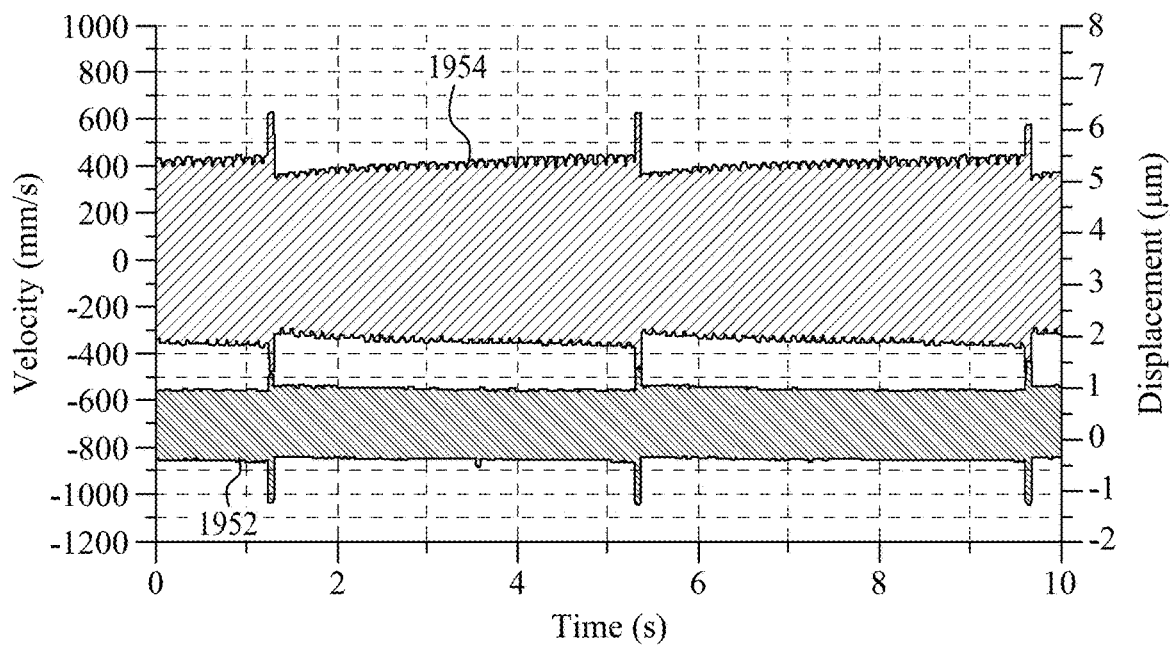
FIG. 19B is an exemplary graph illustrating tip velocity and displacement time-histories of the first analyte sensor excited by $V_a$=7.780 V at f=56 kHz, according to aspects of the present disclosure.

FIG. 19B is an exemplary graph 1950 illustrating the tip velocity and displacement time-histories of the first analyte sensor excited by $V_a$=7.780 V at f=56 kHz. Curve 1952 indicates the displacement and curve 1954 shows the velocity. Decreasing the signal frequency to f=56 kHz increases the length of the laminar episodes, as shown in FIG. 19B. This indicates intermittency type-I which is characterized by a laminar flow time-envelope of the order $O(1/\sqrt{\epsilon})$ where $\epsilon$ is a measure of the 'distance' between the current value of the control parameter (signal frequency) and its value at the cyclic-fold. It indicates that the control parameter is moving along the intermittent route toward the cyclic-fold and away from the chaotic attractor.

Figure 20A:
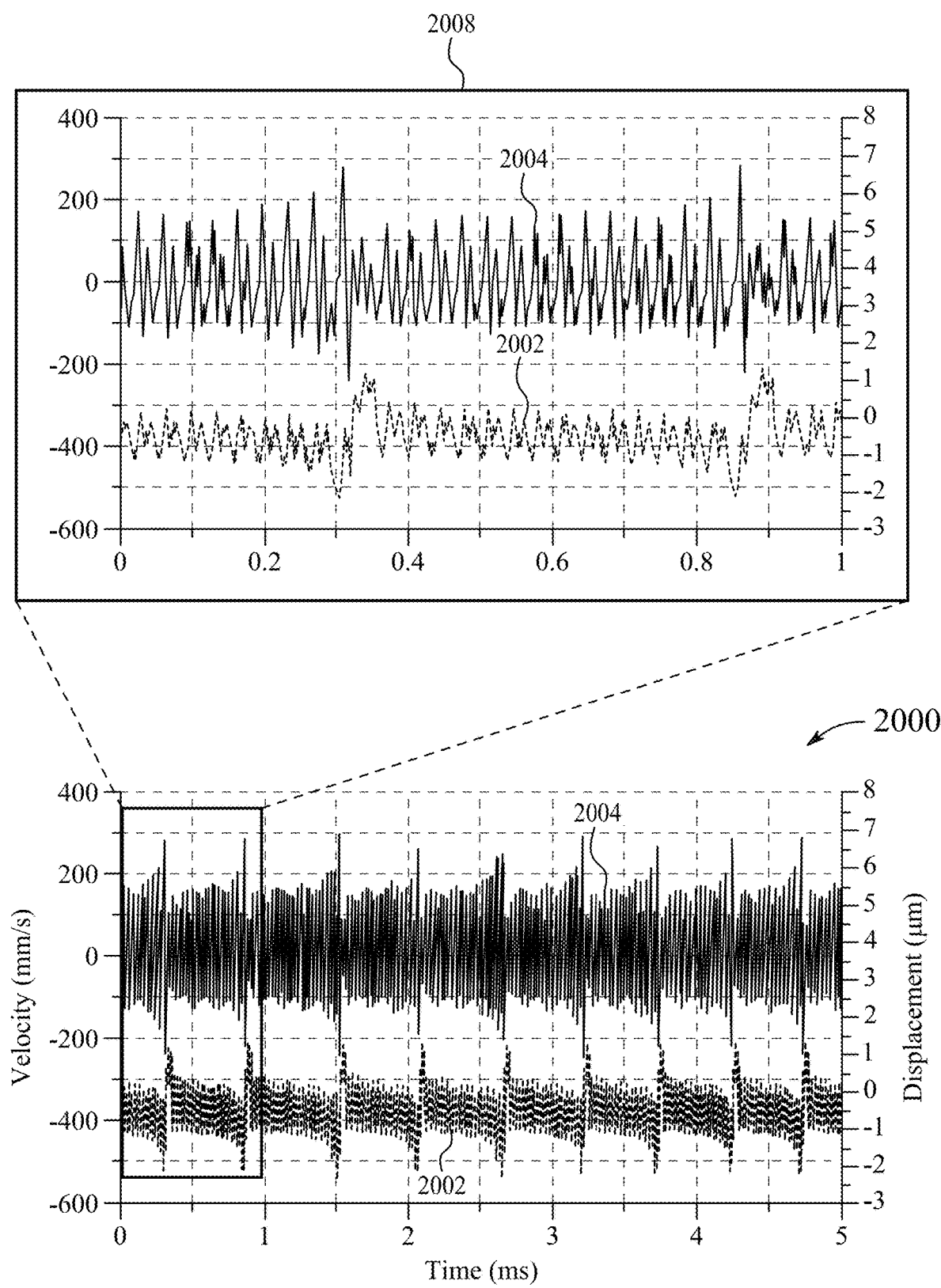
FIG. 20A is an exemplary graph illustrating tip velocity and displacement time-histories of the first analyte sensor excited by $V_a$=7.725 V at f=31.05 kHz, according to aspects of the present disclosure.
Figure 20B:
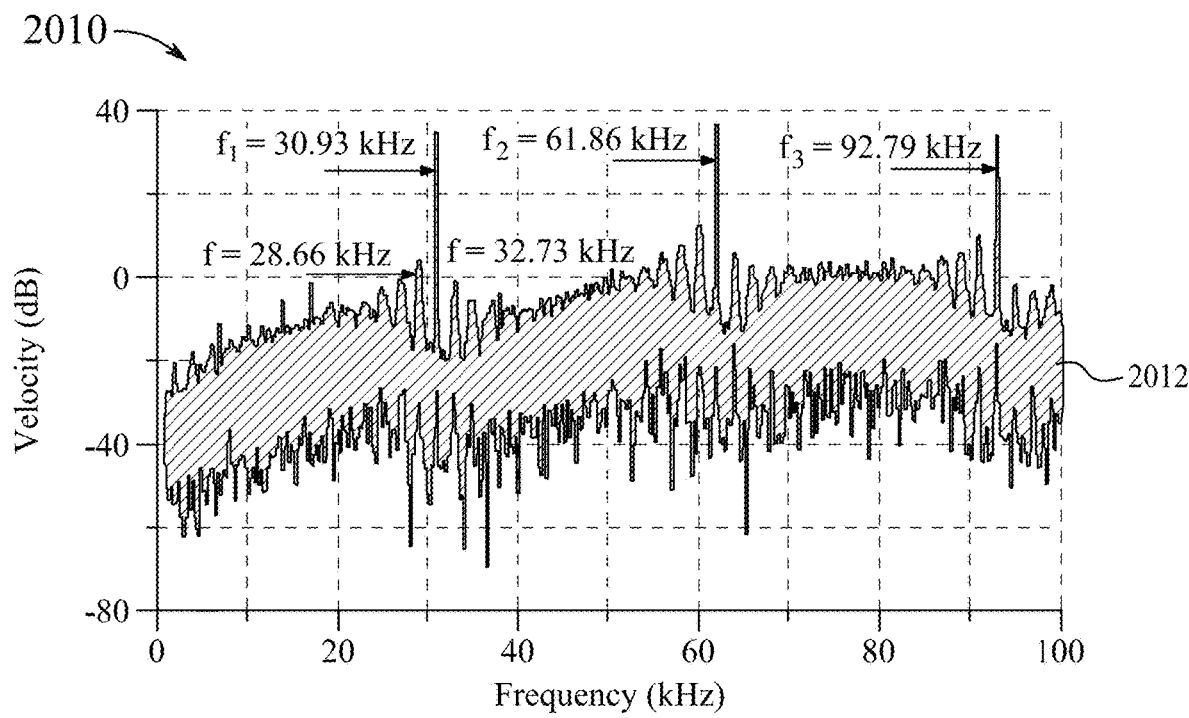
FIG. 20B is an exemplary graph illustrating a velocity FFT of the first analyte sensor excited by $V_a$=7.725 V at f=31.05 kHz, according to aspects of the present disclosure.
Figure 20C:
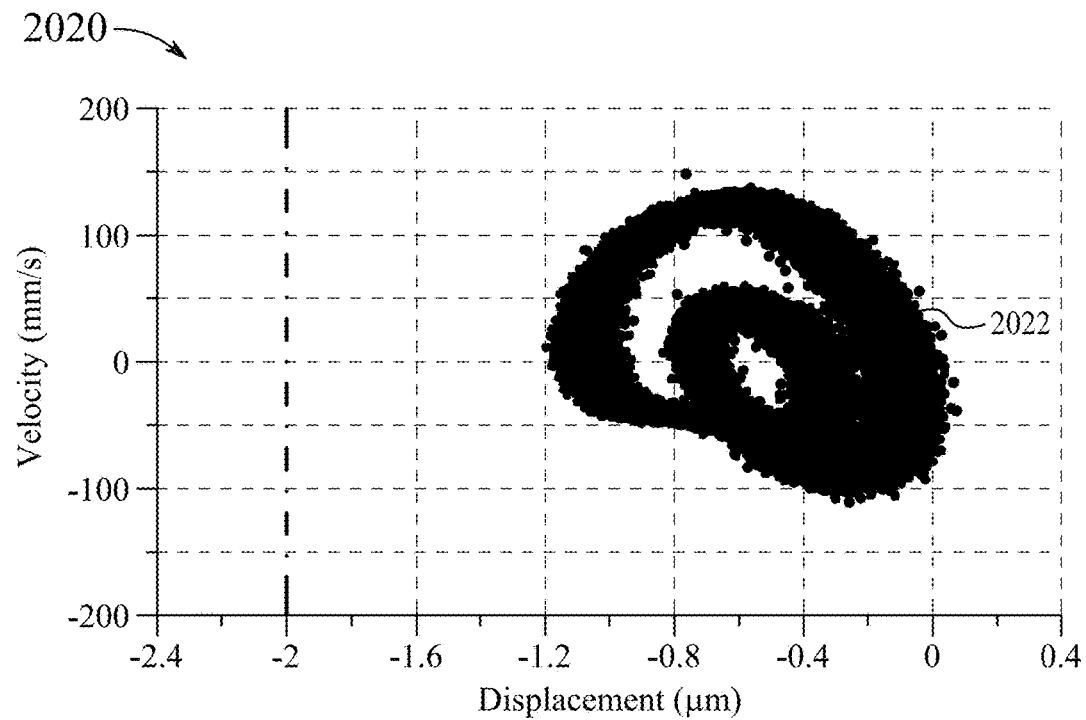
FIG. 20C is an exemplary graph illustrating a phase portrait of the first analyte sensor excited by $V_a$=7.725 V at f=31.05 kHz, according to aspects of the present disclosure.

FIG. 20A is an exemplary graph 2000 illustrating a tip velocity and displacement time-histories of the first analyte sensor excited by a voltage amplitude of $V_a$=7.725 V at f=31.05 kHz. Curve 2002 indicates the displacement and curve 2004 shows the velocity. Block 2008 shows an enlarged view of the tapping mode oscillations. In an aspect, the first analyte sensor operates using the frequencies which produce the intermittency type-II. The intermittency type-II is another route to chaos subsequent to a subcritical Hopf bifurcation. It was observed experimentally in the response of the first analyte sensor when excited with a voltage amplitude of $V_a$=7.725V, as shown in FIG. 17, in the vicinity of the super harmonic resonance of order two as the signal frequency dropped to f=30.93 kHz, as shown in FIG. 20A-FIG. 20C. Similarly, the homoclinic bifurcation results in an entanglement of the stable and unstable manifolds. However at this forcing level the entanglement interrupted the basin of attraction of the upper branch, but it did not interfere with the basin of attraction of the lower branch as indicated by the appearance of jump-up at the cyclic-fold at f=28.82 kHz distinct from the jump-down at the end of the tapping mode (middle) branch. The laminar (almost periodic) flow observed in this case as well (FIG. 20A) grew over time before bursting into irregular tapping mode oscillations and being re-injected back to freely oscillating motions around a ghost orbit. The velocity and displacement time histories were recorded over 0.116 million excitation periods.

FIG. 20B is an exemplary graph 2010 illustrating a velocity FFT of the first analyte sensor excited by a voltage amplitude of $V_a$=7.725 V at f=31.05 kHz. Curve 2012 indicates the velocity FFT of the first analyte sensor. The modulated envelope of the laminar episodes in the intermittency type-II indicated the appearance of a secondary frequency due to a secondary Hopf. The FFT of the tip velocity shows trains of side peaks around the forced response peak at f=30.93 kHz, the resonant peak at 2f and their combination. FIG. 20A-FIG. 20C show the tip velocity and displacement time-histories, the velocity FFT in db scale (0 dB=1 mm/s), and phase portrait of the first analyte sensor under excitation by the voltage waveform $V_a$=7.725V and f=31.05 kHz at 3f. The modulating (secondary) frequency separating those peaks from the train of side peaks is approximately $f2 \approx 2$ kHz.

FIG. 20C is an exemplary graph 2020 illustrating a phase portrait of the first analyte sensor excited by a voltage amplitude of $V_a$=7.725 V at f=31.05 kHz. Curve 2022 indicates the phase portrait of the first analyte sensor. The dense phase portrait in FIG. 20C shows a torus-type orbit around the ghost orbit drifting towards impact with the substrate (the burst).

Figure 21A:
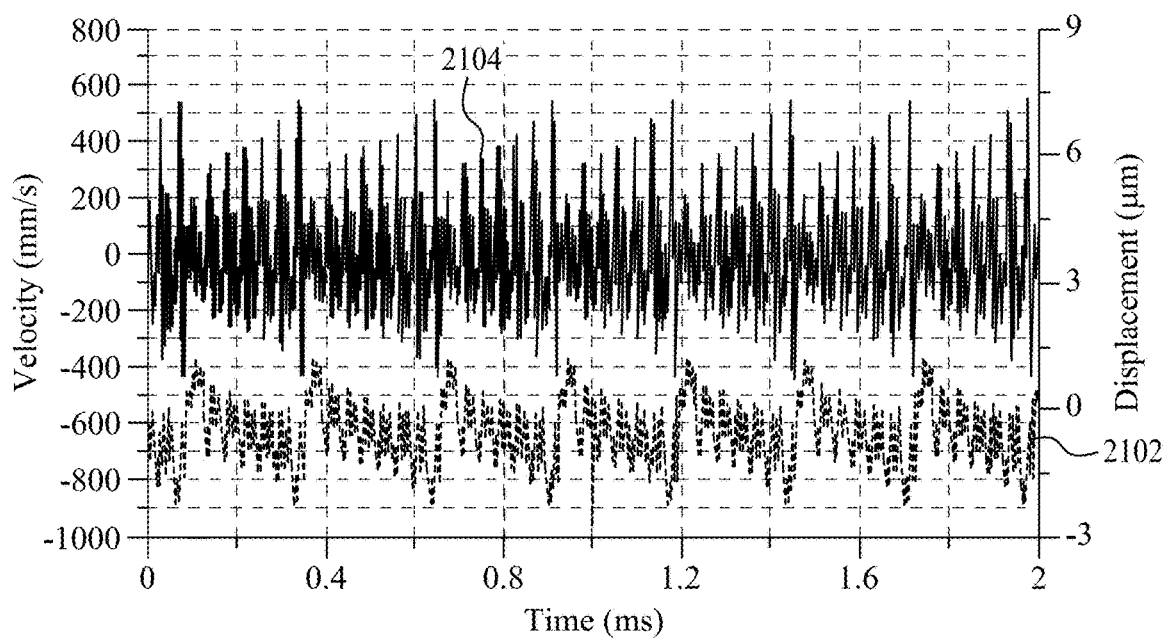
FIG. 21A is an exemplary graph illustrating tip velocity and displacement time-histories of the first analyte sensor excited by $V_a$=6.8625 V at f=26.26 kHz, according to aspects of the present disclosure.

FIG. 21A is an exemplary graph 2100 illustrating a tip velocity and displacement time-histories of the first analyte sensor excited by $V_a$=6.8625 V at f=26.26 kHz, according to aspects of the present disclosure. Curve 2102 indicates the displacement, and curve 2104 shows the velocity. Intermittency type-II was also observed in another specimen of the first analyte sensor at a voltage amplitude of $V_a$=6.8625V as the signal frequency was dropped to f=26.26 kHz.

Figure 21B:
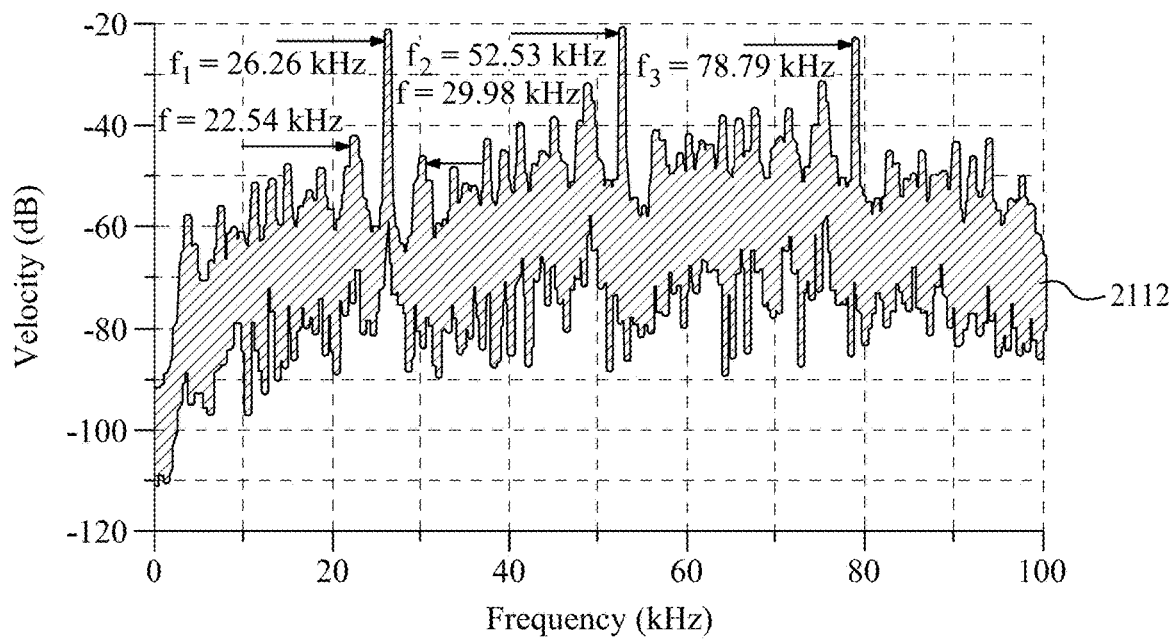
FIG. 21B is an exemplary graph illustrating a velocity FFT of the first analyte sensor excited by $V_a$=6.8625 V at f=26.26 kHz, according to aspects of the present disclosure.

FIG. 21B is an exemplary graph 2110 illustrating a velocity FFT of the first analyte sensor excited by $V_a$=6.8625 V at f=26.26 kHz. Curve 2112 indicates the velocity FFT of the first analyte sensor. The FFT of the tip velocity, as shown in FIG. 21B, shows trains of side peaks around the forced response peak at f=26.26 kHz, the resonant peak at 2f and their combination at 3f. The modulating (secondary) frequency separating those peaks from the train of side peaks is $f2 \approx 3.72$ kHz.

Figure 21C:
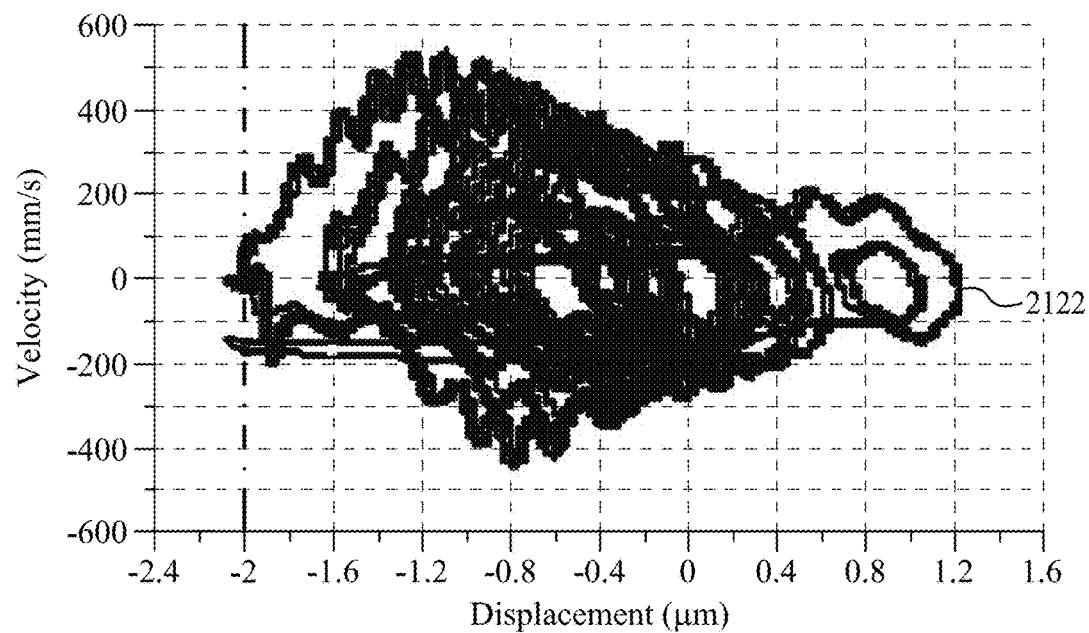
FIG. 21C is an exemplary graph illustrating a phase portrait of the first analyte sensor excited by $V_a$=6.8625 V at f=26.26 kHz, according to aspects of the present disclosure.

FIG. 21C is an exemplary graph 2120 illustrating a phase portrait of the first analyte sensor excited by $V_a$=6.8625 V at f=26.26 kHz. Curve 2122 indicates the phase portrait of the first analyte sensor. The phase portrait in FIG. 21C shows a torus-type orbit drifting away from the ghost orbit to burst upon contact with the substrate.

Figure 22A:
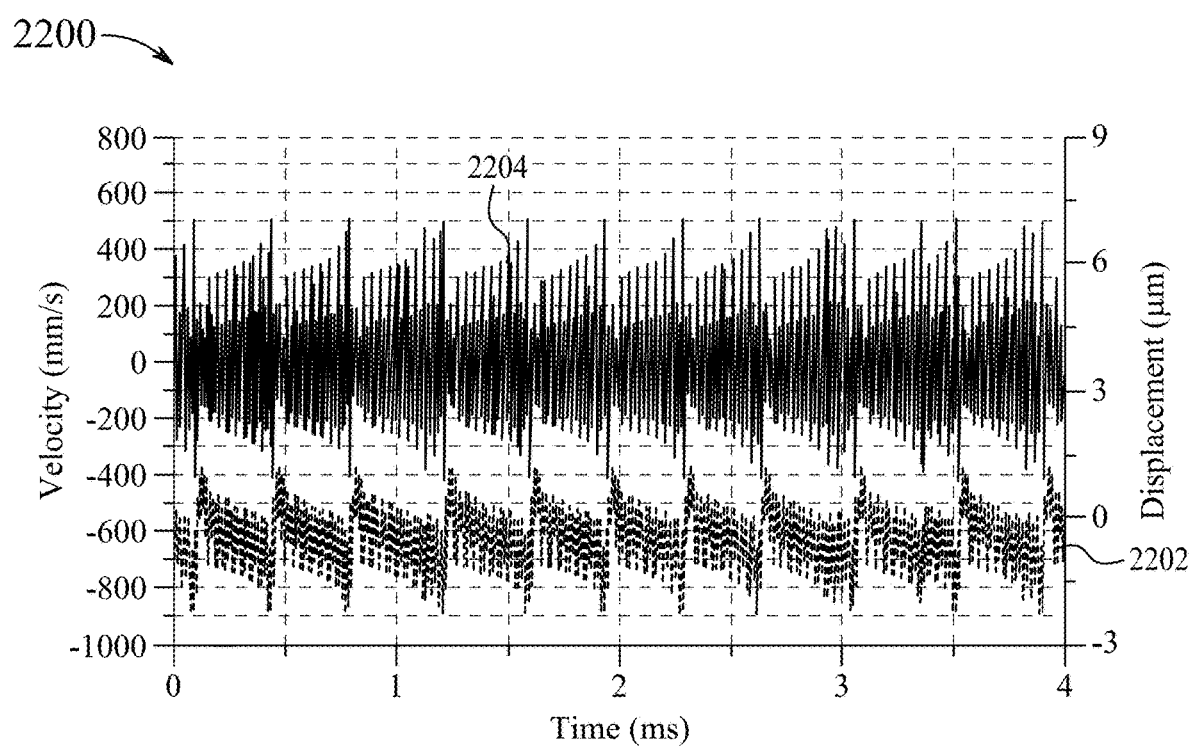
FIG. 22A is an exemplary graph illustrating tip velocity and displacement time-histories of the first analyte sensor excited by $V_a$=6.8625 V at f=26 kHz, according to aspects of the present disclosure.
Figure 22B:
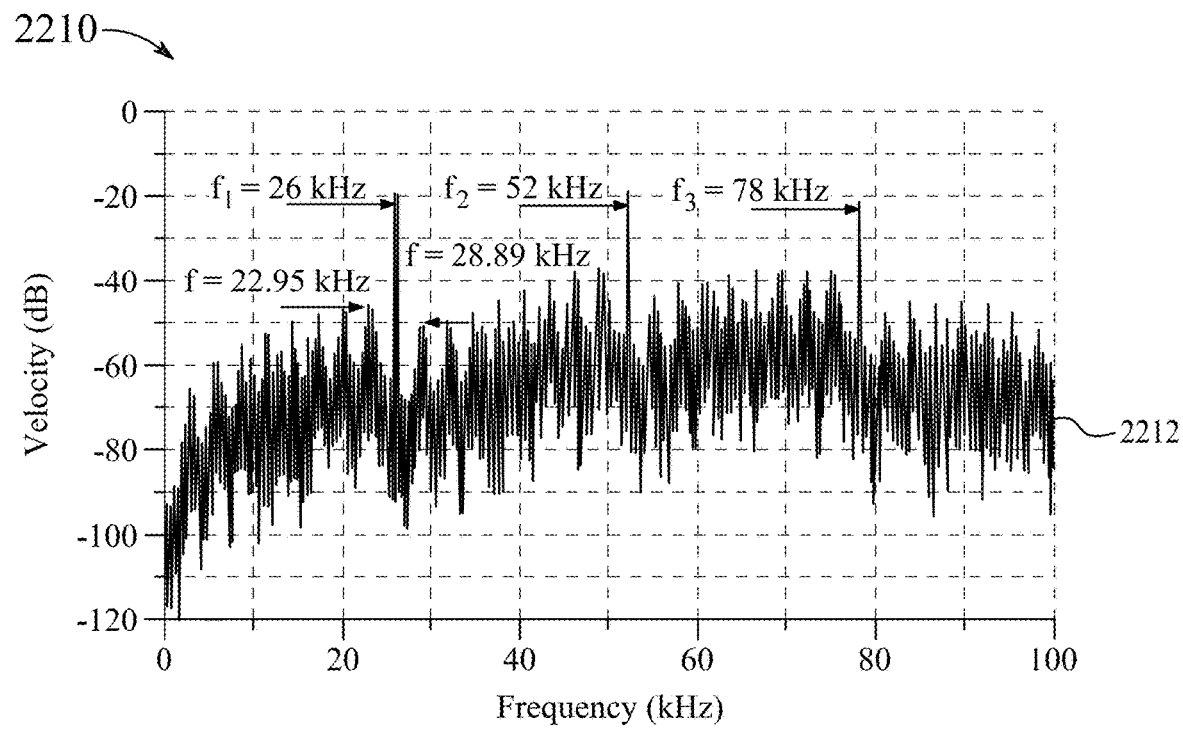
FIG. 22B is an exemplary graph illustrating a velocity FFT of the first analyte sensor excited by $V_a$=6.8625 V at f=26 kHz, according to aspects of the present disclosure.
Figure 22C:
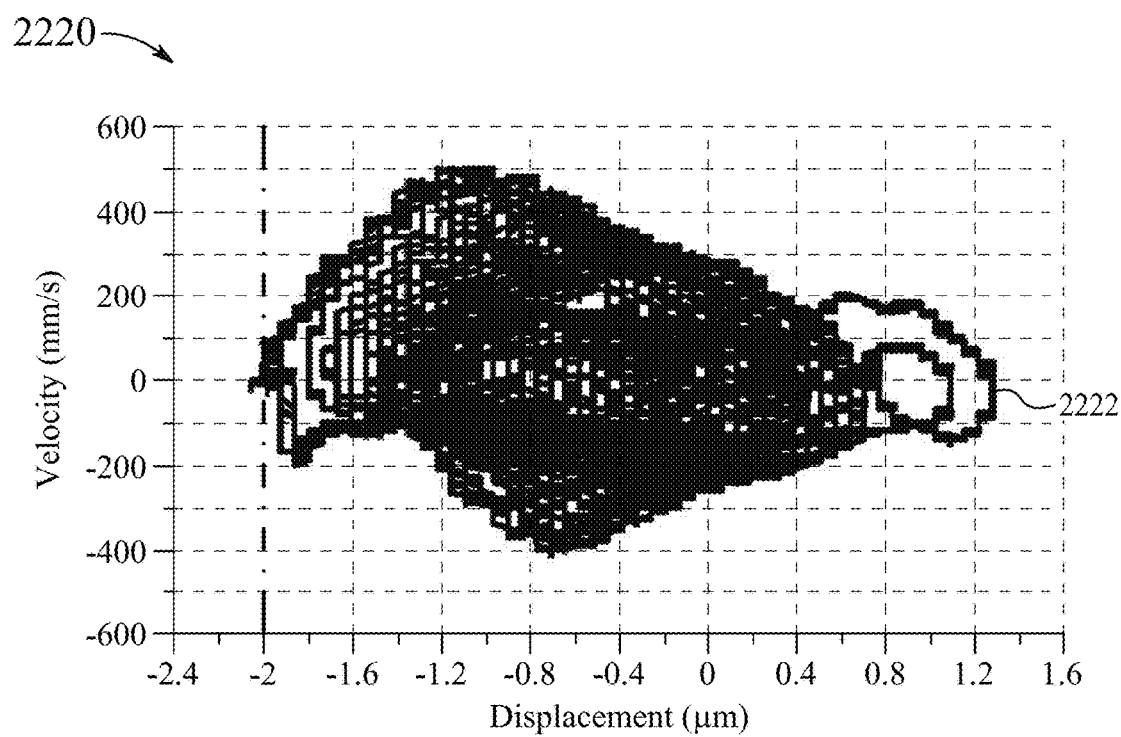
FIG. 22C is an exemplary graph illustrating a phase portrait of the first analyte sensor excited by $V_a$=6.8625 V at f=26 kHz, according to aspects of the present disclosure.

FIG. 22A is an exemplary graph 2200 illustrating tip velocity and displacement time-histories of the first analyte sensor excited by a voltage amplitude of $V_a$=6.8625 V at f=26 kHz. Curve 2202 indicates the displacement and curve 2204 shows the velocity. The intermittency persisted as the signal frequency dropped further to f=26.00 kHz, as shown in FIG. 22A-FIG. 22C with the average period of laminar flow increasing. While twelve bursts were observed over a time span of 2 ms at f=26.26 kHz, only eight bursts were observed over time span of 4 ms at f=26 kHz.

FIG. 22B is an exemplary graph 2210 illustrating velocity FFT of the first analyte sensor excited by the voltage amplitude of $V_a$=6.8625 V at f=26 kHz. Curve 2212 indicates the velocity FFT of the first analyte sensor. The FFT of the tip velocity, FIG. 22B, shows trains of side peaks around the forced response peak at f=26 kHz and its multiples 2f and 3f. The modulating (secondary) frequency separating those peaks from the train of side peaks is f2≈3 kHz indicating that the sensor approaches the subcritical Hopf bifurcation as frequency is swept down.

FIG. 22C is an exemplary graph 2220 illustrating phase portrait of the first analyte sensor excited by the voltage amplitude of $V_a$=6.8625 V at f=26 kHz. Curve 2222 indicates the phase portrait of the first analyte sensor. The phase portrait in FIG. 22C also shows dense torus-type orbits drifting away for the ghost orbit towards impact with the substrate. The flatness at the left-side of the phase portrait distinguishes the tip interaction with the substrate as the balance of mechanical repulsive and electrostatic attractive forces shifts to the advantage of the former, allowing the sensor rebound.

Figure 23A:
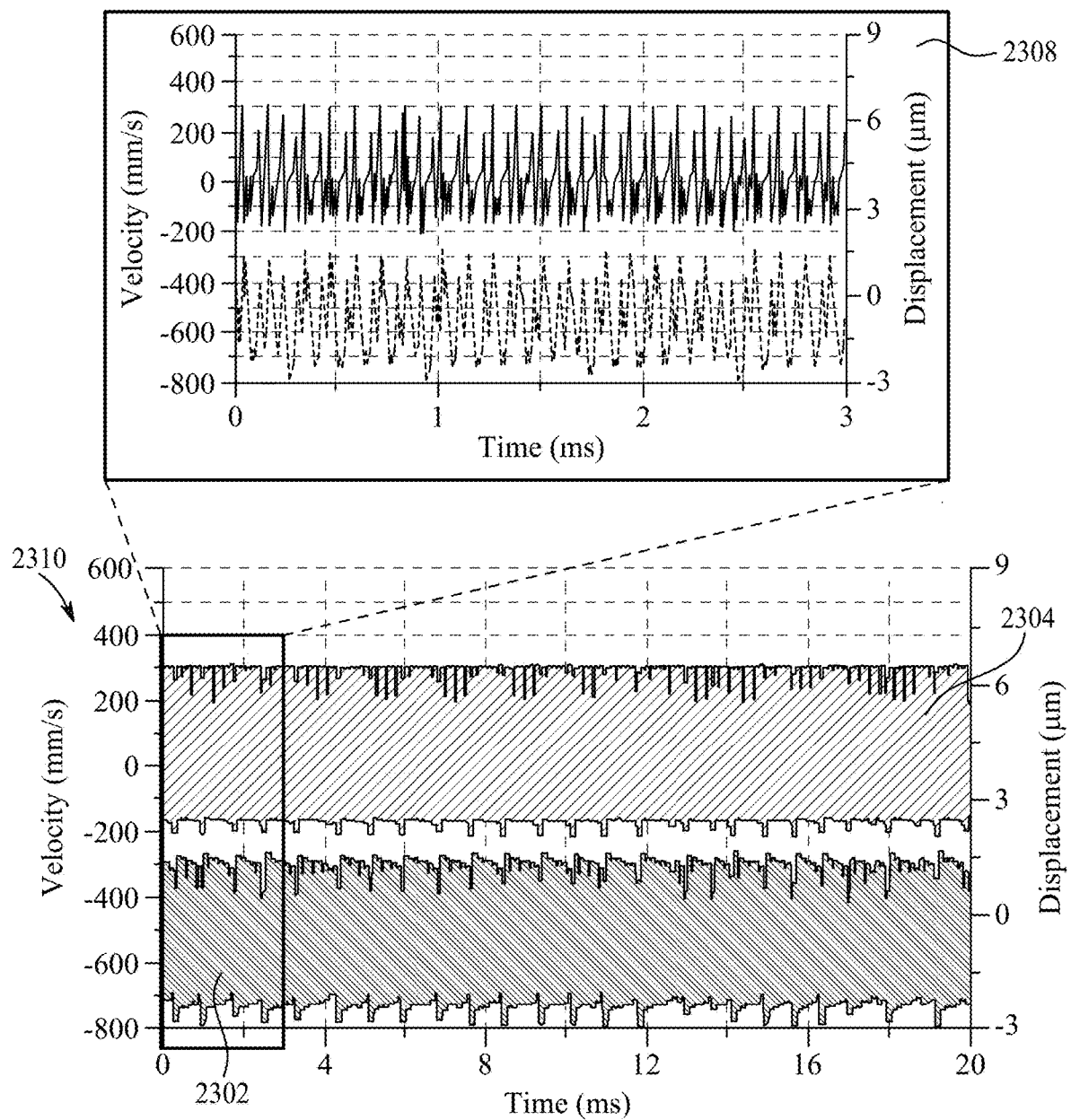
FIG. 23A is an exemplary graph illustrating tip velocity and displacement time-histories of the second analyte sensor excited by $V_a$=7.650 V at f=16.319 kHz, according to aspects of the present disclosure.

FIG. 23A is an exemplary graph 2310 illustrating tip velocity and displacement time-histories of the second analyte sensor excited by $V_a$=7.650 V at f=16.319 kHz. Curve 2202 indicates the displacement, and curve 2204 shows the velocity. Curve 2302 indicates the displacement, and curve 2304 shows the velocity. Block 2308 shows an enlarged view of the tapping mode oscillations. In an aspect, the second analyte sensor operates in the intermittency type-III. The intermittency type-III is a route to chaos subsequent to a subcritical period-doubling bifurcation. It was found experimentally in the response of the second analyte sensor under the voltage waveform of $V_a$=7.650V as the signal frequency was increased to f=16.319 kHz. Under these conditions, a laminar flow is observed that grows over time to be interrupted by bursts of tapping mode oscillations at irregular intervals in block 2308.

Figure 23B:
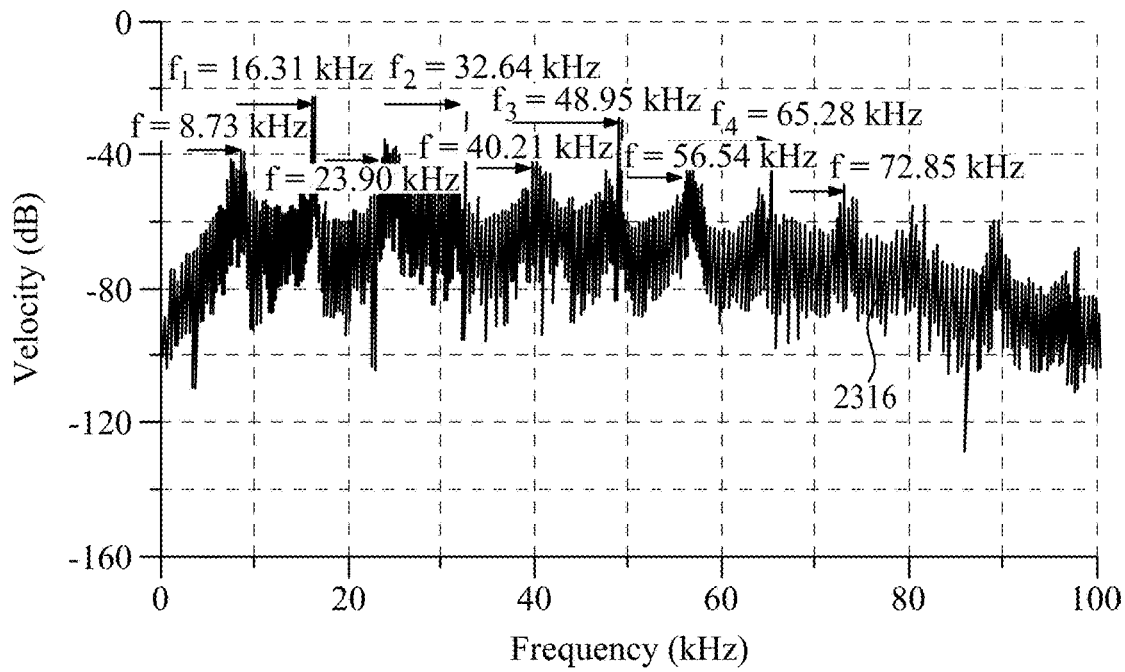
FIG. 23B is an exemplary graph illustrating a velocity FFT of the second analyte sensor excited by $V_a$=7.650 V at f=16.319 kHz, according to aspects of the present disclosure.

FIG. 23B is an exemplary graph 2315 illustrating a velocity FFT of the second analyte sensor excited by $V_a$=7.650 V at f=16.319 kHz. Curve 2316 indicates the velocity FFT of the second analyte sensor. Subsequent impact of the second analyte sensor on the substrate and the losses associated with it results in re-injection in the vicinity of a P–2 ghost orbit and resumption of laminar flow. The velocity FFT shows an elevated noise floor due to the interaction with the substrate, in block and peaks at the excitation frequency f, half of the excitation frequency f=2, and their multiples which indicate that ghost orbit is a result of a subcritical period-doubling bifurcation.

Figure 23C:
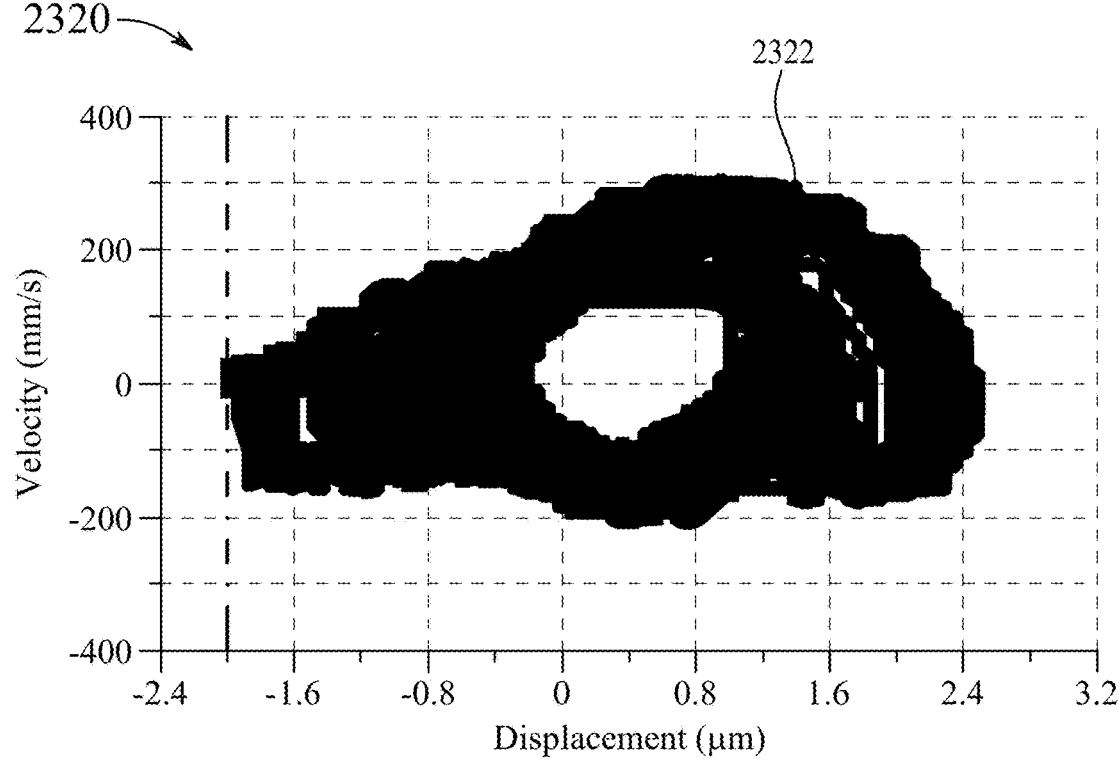
FIG. 23C is an exemplary graph illustrating a phase portrait of the second analyte sensor excited by $V_a$=7.650 V at f=16.319 kHz, according to aspects of the present disclosure.

FIG. 23C is an exemplary graph 2320 illustrating a phase portrait of the second analyte sensor excited by $V_a$=7.650 V at f=16.319 kHz. Curve 2322 indicates the phase portrait of the second analyte sensor. The corresponding phase portrait shows the orbit drifting in phase space away from the ghost orbit location to burst upon impact on the substrate.

Figure 23D:
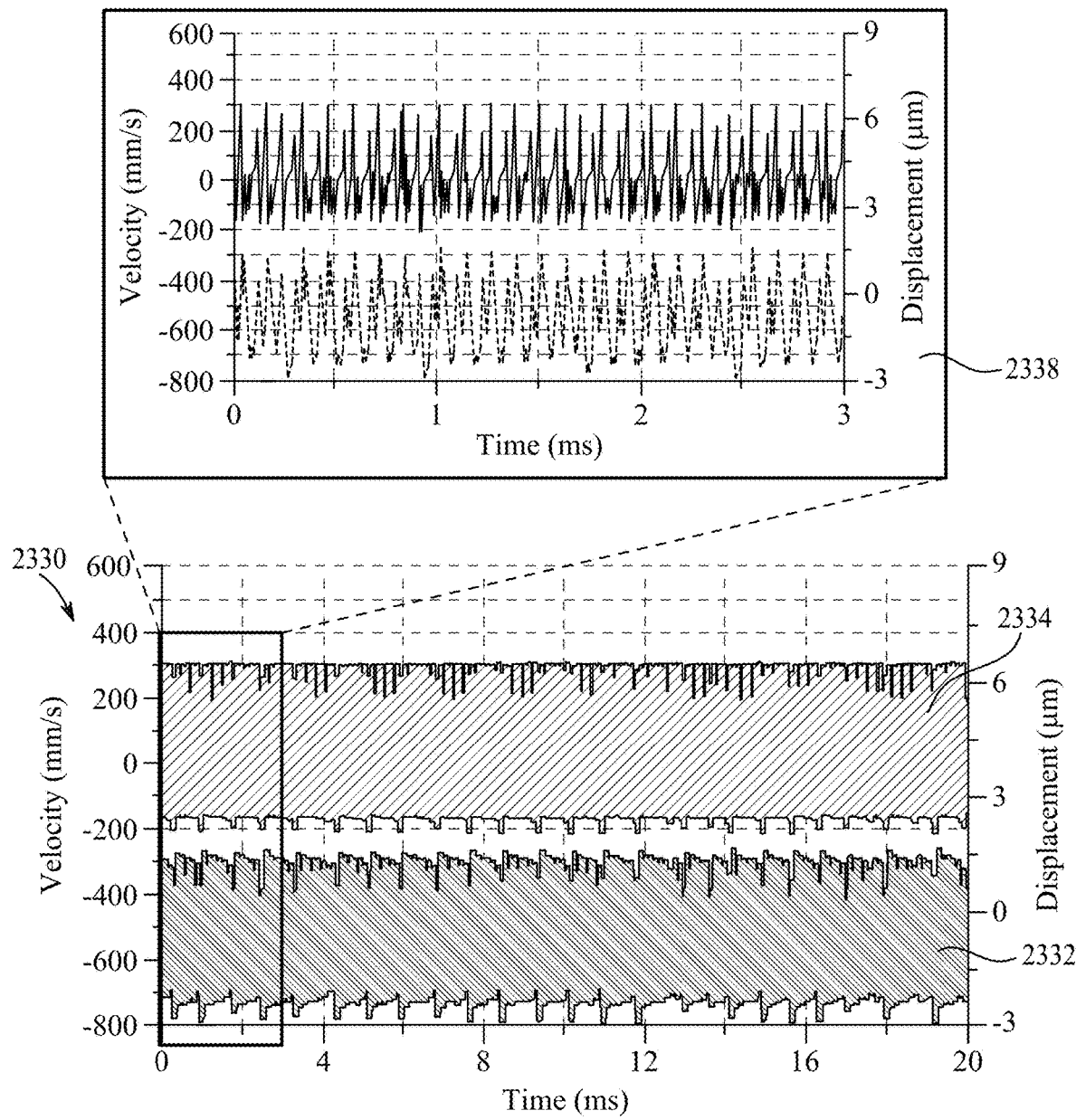
FIG. 23D is an exemplary graph illustrating tip velocity and displacement time-histories of the second analyte sensor excited by $V_a$=7.650 V at f=16.320 kHz, according to aspects of the present disclosure.

FIG. 23D is an exemplary graph 2330 illustrating tip velocity and displacement time-histories of the second analyte sensor excited by $V_a$=7.650 V at f=16.320 kHz. Curve 2332 indicates the displacement, and curve 2334 shows the velocity. Block 2338 shows an enlarged view of the tapping mode oscillations.

Figure 23E:
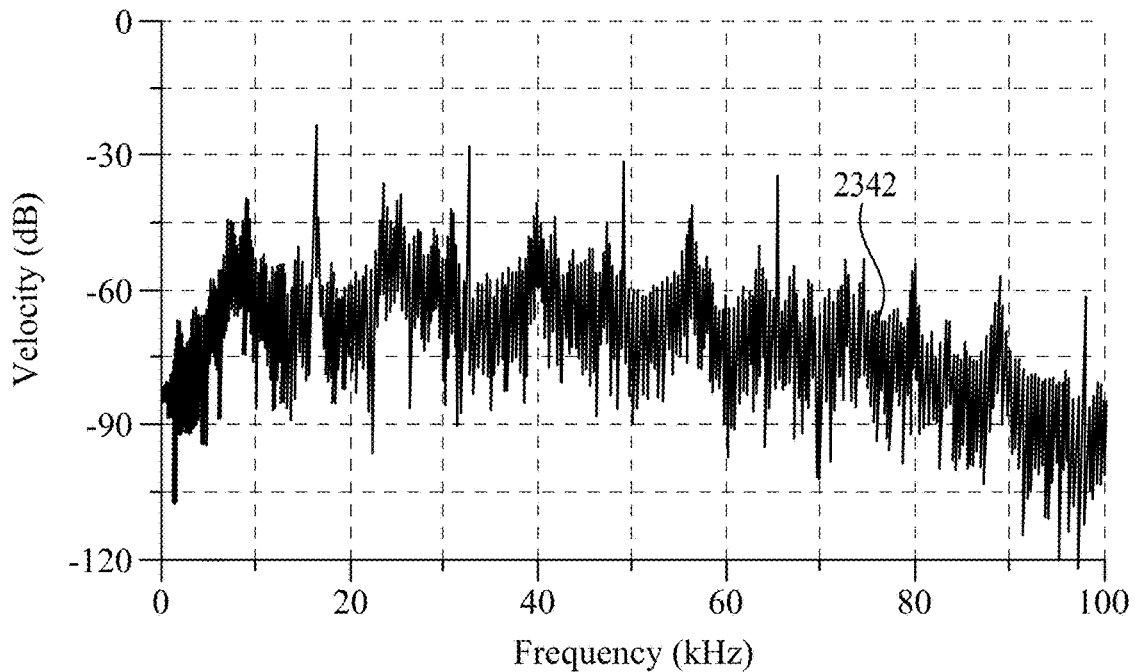
FIG. 23E is an exemplary graph illustrating a velocity FFT of the second analyte sensor excited by $V_a$=7.650V at f=16.320 kHz, according to aspects of the present disclosure.

FIG. 23E is an exemplary graph 2340 illustrating a velocity FFT of the second analyte sensor excited by $V_a$=7.650V at f=16.320 kHz. Curve 2342 indicates the velocity FFT of the second analyte sensor.

Figure 23F:
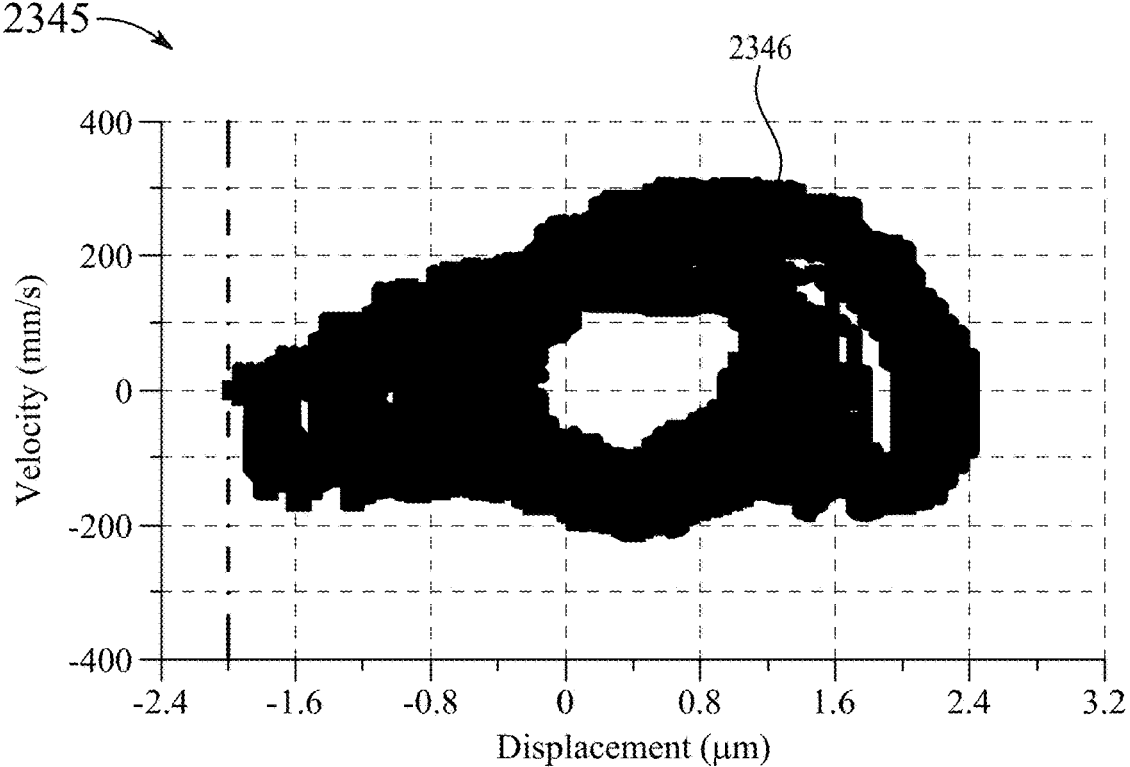
FIG. 23F is an exemplary graph illustrating a phase portrait of the second analyte sensor excited by $V_a$=7.650 V at f=16.320 kHz, according to aspects of the present disclosure.

FIG. 23F is an exemplary graph 2345 illustrating a phase portrait of the second analyte sensor excited by $V_a$=7.650 V at f=16.320 KHz. Curve 2346 indicates the phase portrait of the second analyte sensor.

Figure 23G:
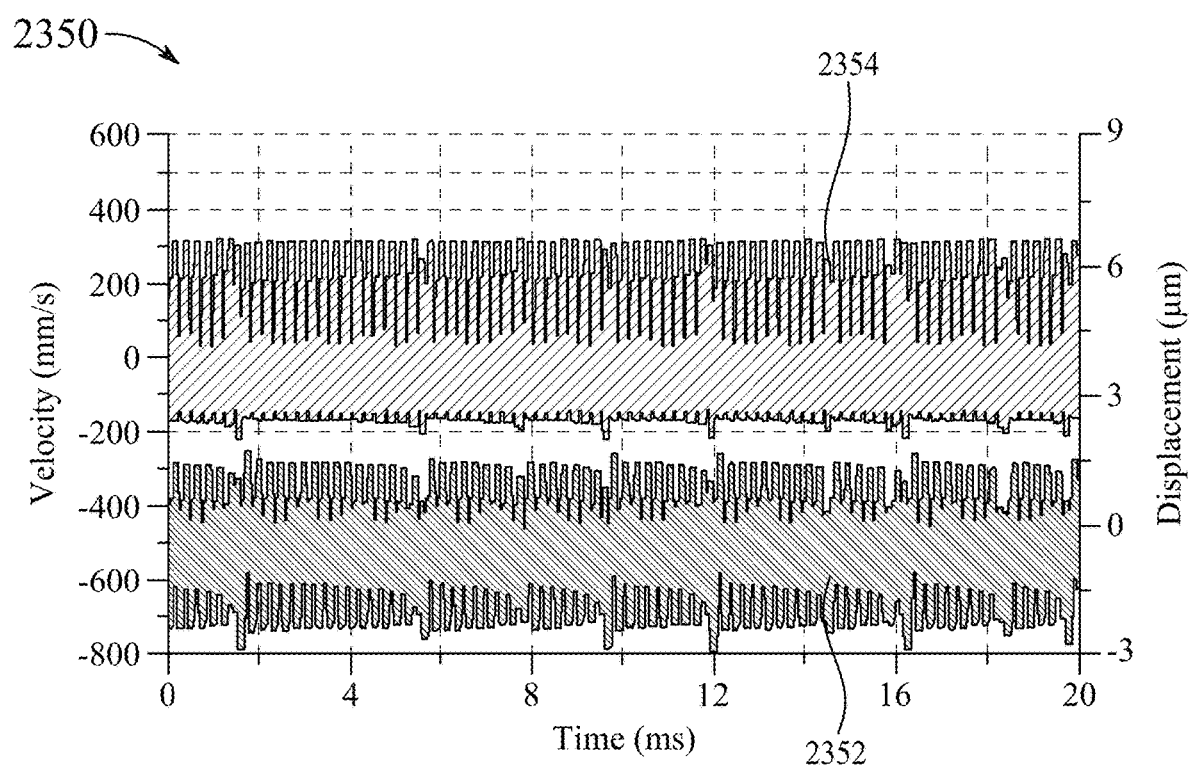
FIG. 23G is an exemplary graph illustrating tip velocity and displacement time-histories of the second analyte sensor excited by $V_a$=7.650 V at f=16.40 kHz, according to aspects of the present disclosure.

FIG. 23G is an exemplary graph 2350 illustrating tip velocity and displacement time-histories of the second analyte sensor excited by $V_a$=7.650 V at f=16.40 kHz. Curve 2352 indicates the displacement, and curve 2354 shows the velocity.

Figure 23H:
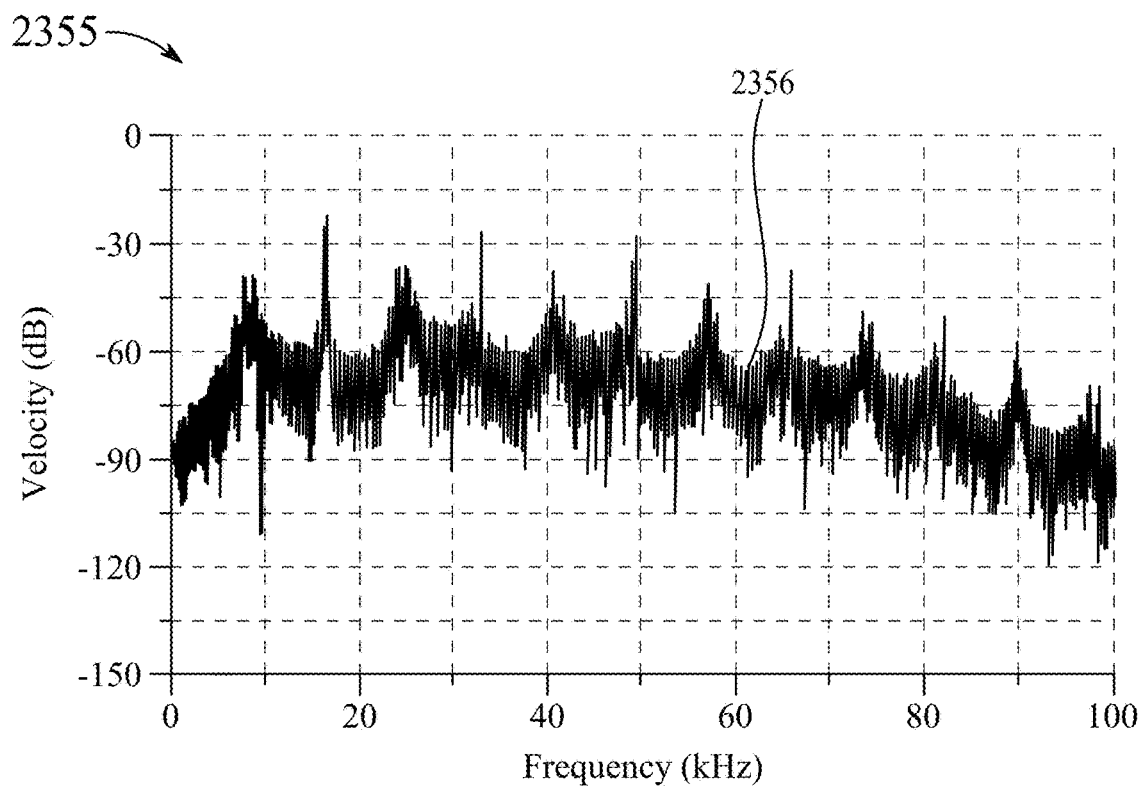
FIG. 23H is an exemplary graph illustrating a velocity FFT of the second analyte sensor excited by $V_a$=7.650V at f=16.40 kHz, according to aspects of the present disclosure.
Figure 23I:
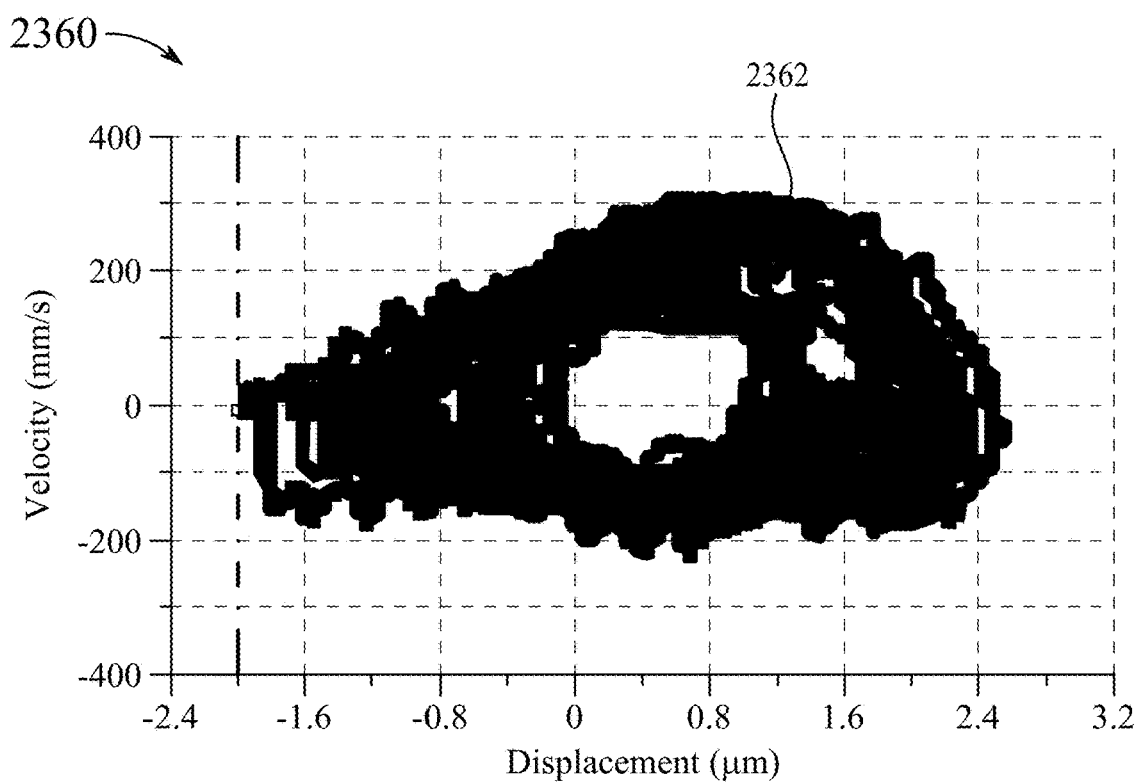
FIG. 23I is an exemplary graph illustrating a phase portrait of the second analyte sensor excited by $V_a$=7.650 V at f=16.40 kHz, according to aspects of the present disclosure.
Figure 23J:
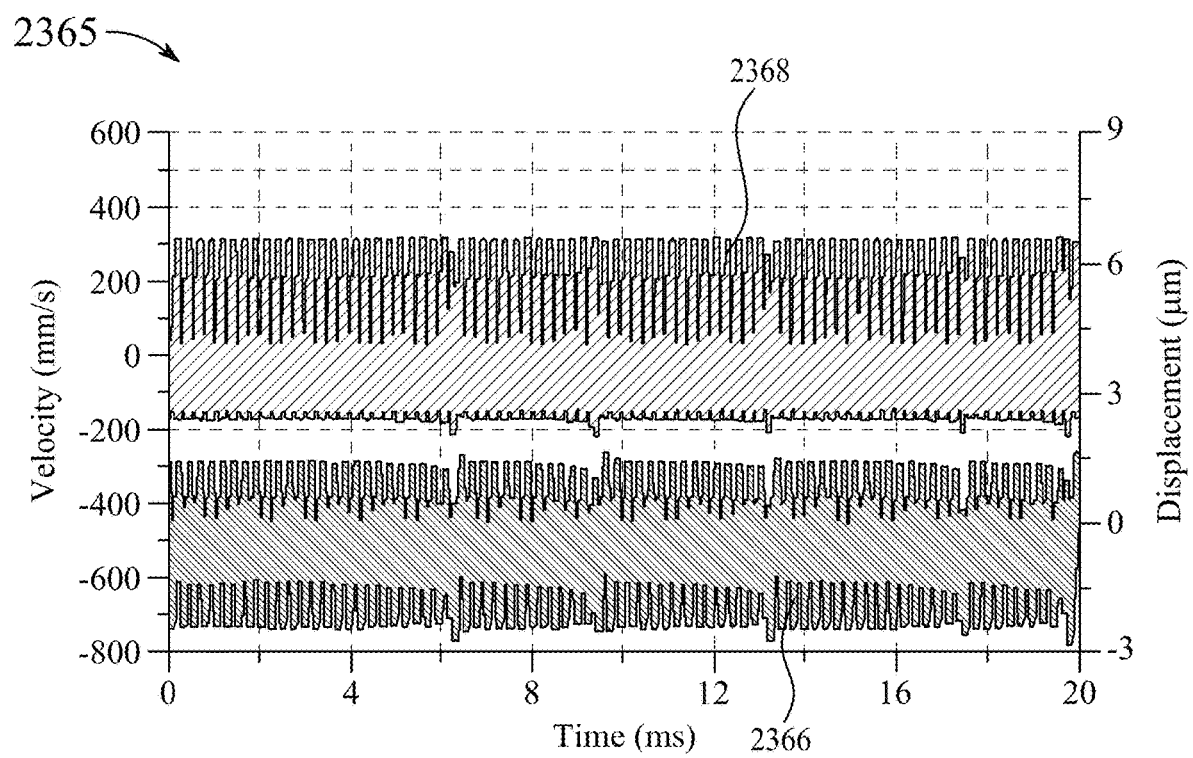
FIG. 23J is an exemplary graph illustrating tip velocity and displacement time-histories of the second analyte sensor excited by $V_a$=7.650 V at f=16.430 kHz, according to aspects of the present disclosure.

FIG. 23H is an exemplary graph 2355 illustrating a velocity FFT of the first analyte sensor excited by $V_a$=7.650V at f=16.40 kHz. Curve 2356 indicates the velocity FFT of the first analyte sensor. FIG. 23I is an exemplary graph 2360 illustrating a phase portrait of the second analyte sensor excited by $V_a$=7.650 V at f=16.40 kHz. Curve 2362 indicates the phase portrait of the second analyte sensor. FIG. 23J is an exemplary graph 2365 illustrating tip velocity and displacement time-histories of the second analyte sensor excited by $V_a$=7.650 V at f=16.430 kHz. Curve 2366 indicates the displacement, and curve 2368 shows the velocity.

Figure 23K:
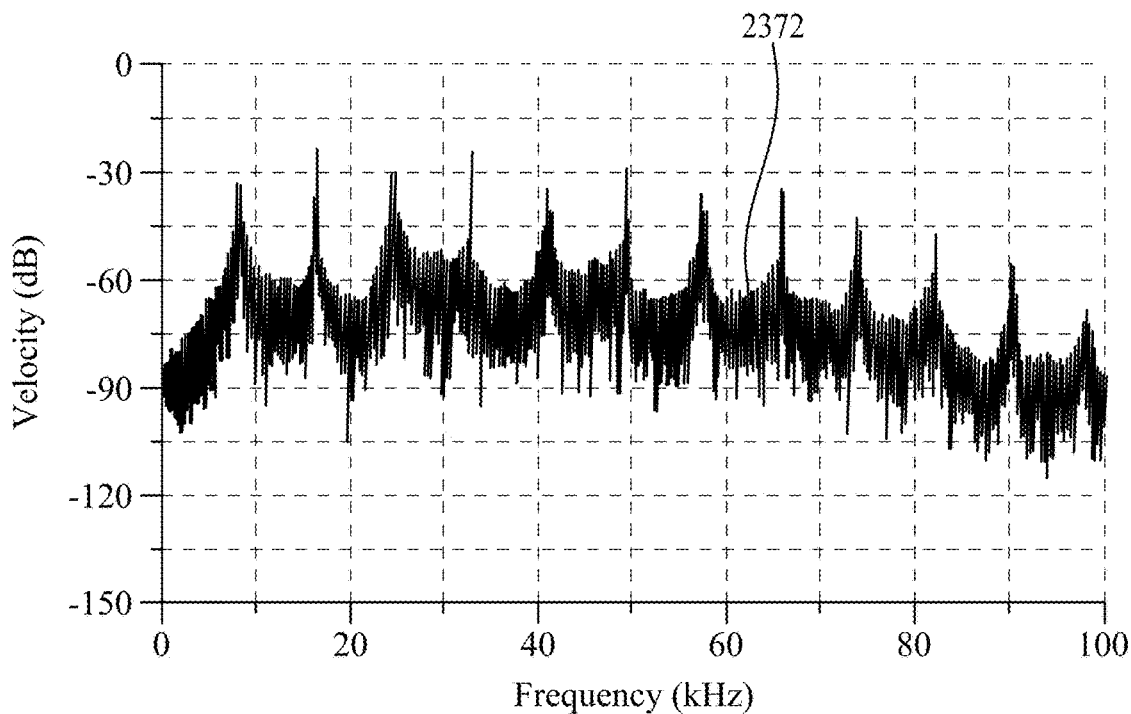
FIG. 23K is an exemplary graph illustrating a velocity FFT of the second analyte sensor excited by $V_a$=7.650V at f=16.430 kHz, according to aspects of the present disclosure.
Figure 23L:
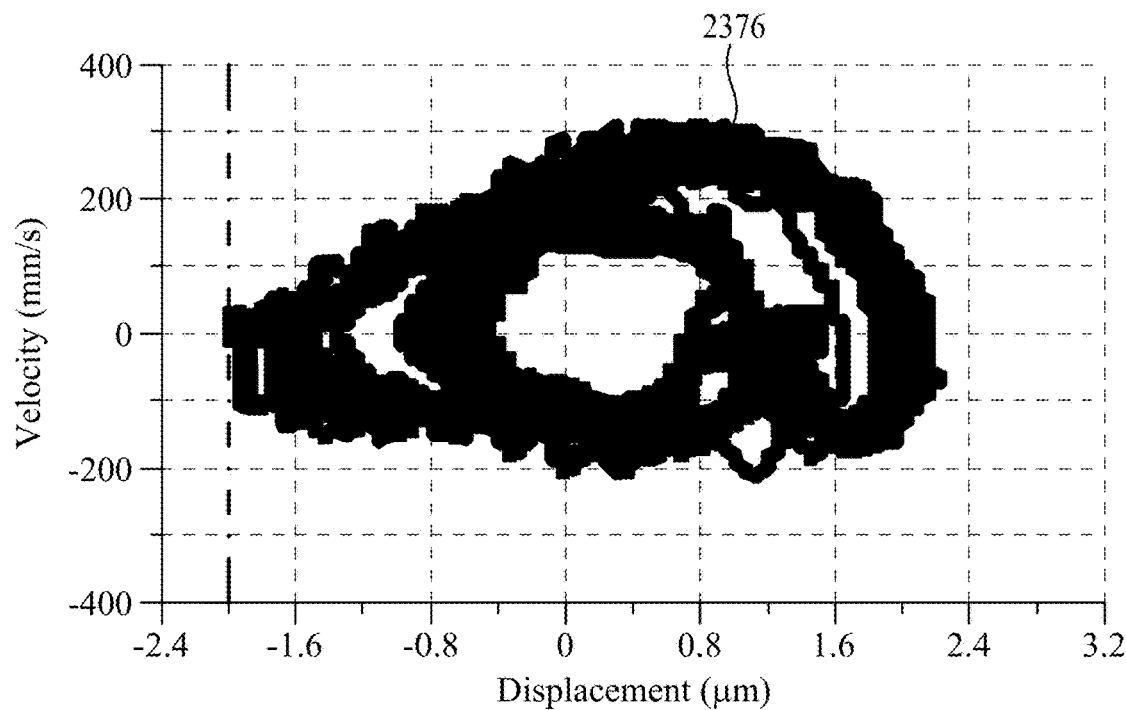
FIG. 23L is an exemplary graph illustrating a phase portrait of the second analyte sensor excited by $V_a$=7.650 V at f=16.430 kHz, according to aspects of the present disclosure.
Figure 23M:
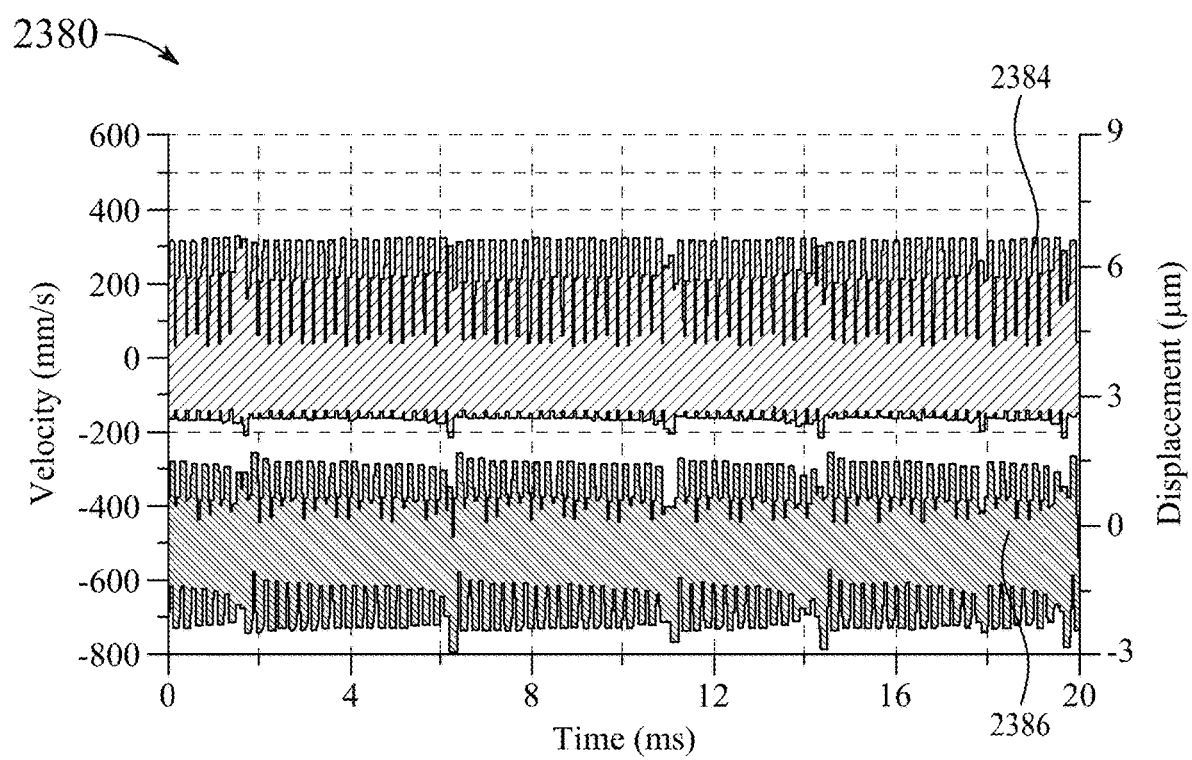
FIG. 23M is an exemplary graph illustrating tip velocity and displacement time-histories of the second analyte sensor excited by $V_a$=7.650 V at f=16.480 kHz, according to aspects of the present disclosure.
Figure 23N:
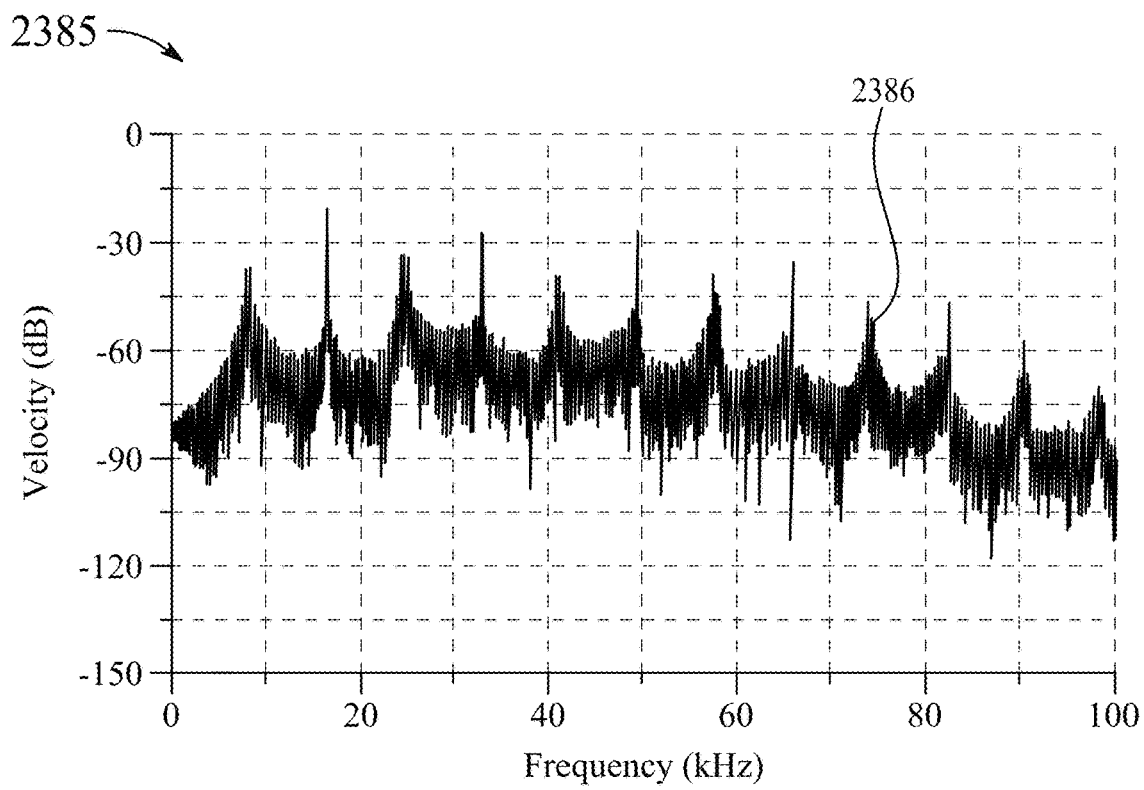
FIG. 23N is an exemplary graph illustrating a velocity FFT of the second analyte sensor excited by $V_a$=7.650V at f=16.480 kHz, according to aspects of the present disclosure.
Figure 23O:
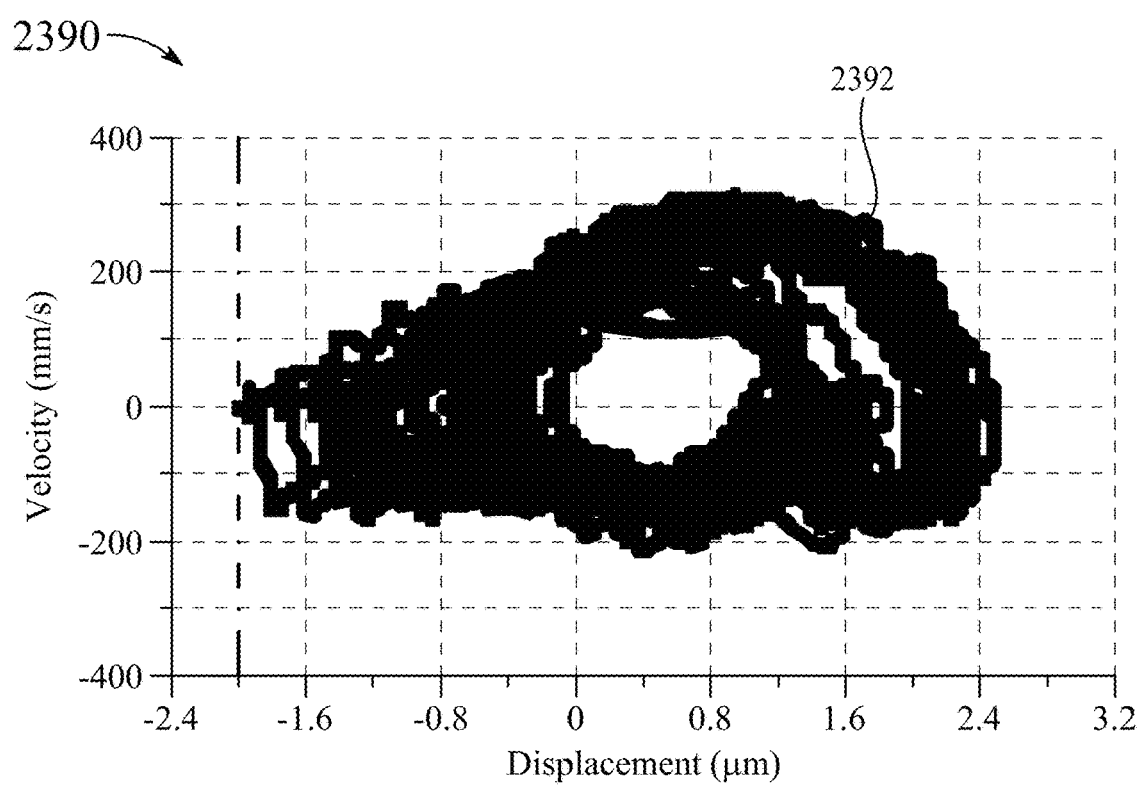
FIG. 23O is an exemplary graph illustrating a phase portrait of the second analyte sensor excited by $V_a$=7.650 V at f=16.480 kHz, according to aspects of the present disclosure.

FIG. 23K is an exemplary graph 2370 illustrating a velocity FFT of the first analyte sensor excited by $V_a$=7.650V at f=16.430 kHz. Curve 2372 indicates the velocity FFT of the second analyte sensor. FIG. 23L is an exemplary graph 2375 illustrating a phase portrait of the second analyte sensor excited by $V_a$=7.650 V at f=16.430 kHz. Curve 2376 indicates the phase portrait of the second analyte sensor. FIG. 23M is an exemplary graph 2380 illustrating tip velocity and displacement time-histories of the second analyte sensor excited by $V_a$=7.650 V at f=16.480 kHz. Curve 2382 represents the displacement, and curve 2384 represents the velocity. Block 2008 shows an enlarged view of the tapping mode oscillations. FIG. 23N is an exemplary graph 2385 illustrating a velocity FFT of the second analyte sensor excited by $V_a$=7.650V at f=16.480 kHz. Curve 2386 indicates the velocity FFT of the second analyte sensor. FIG. 23O is an exemplary graph 2390 illustrating a phase portrait of the second analyte sensor excited by $V_a$=7.650 V at f=16.480 kHz. Curve 2392 indicates the phase portrait of the second analyte sensor.

Referring to FIG. 23A-FIG. 23O, it can be observed that as the signal frequency was further increased to f=16.320; 16.40; 16.430; and 16.480 kHz, the average period of laminar flow increased. This can also be seen in the corresponding phase portraits where the density of the drifting orbit decreases over the same time span of 10 ms. The character of the ghost orbit did not change throughout this process as shown by the persistence of peaks in the FFT, at f, half of the frequency f=2, and their multiples. It can be observed that the time histories, FFTs, and phase portrait shown in FIG. 23A-FIG. 23F were collected over a time span of 20 ms. As the irregularity (bursts) faded away, the corresponding plots shown in FIG. 23G-FIG. 23O were collected over a time span of 10 ms. These results indicate that the analyte sensor is approaching the subcritical period-doubling bifurcation as the frequency of the signal increases.

Figure 24:
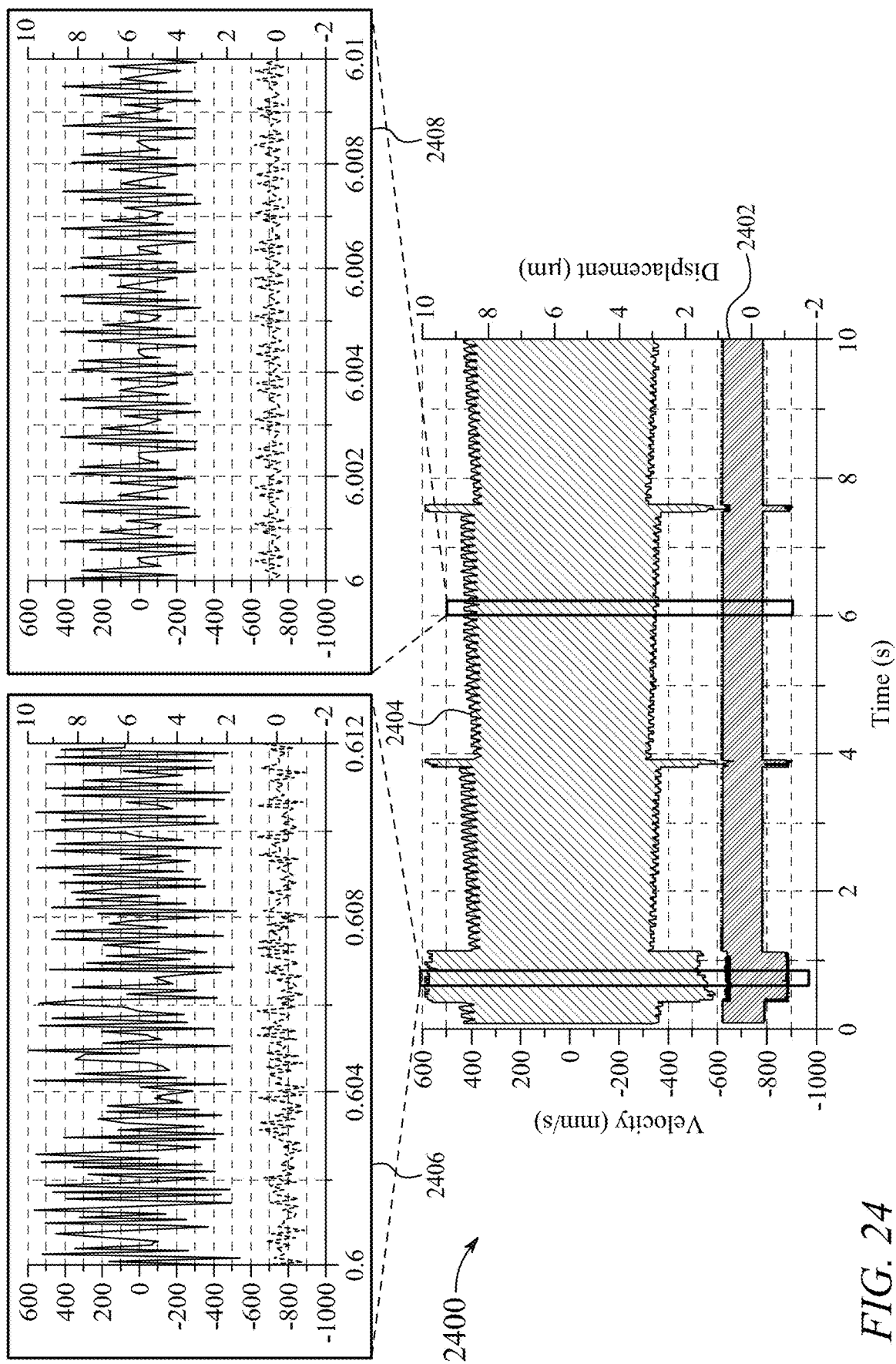
FIG. 24 is an exemplary graph illustrating tip velocity and displacement time-histories of the first analyte sensor excited by $V_a$=7.725 V at f=57 kHz, according to aspects of the present disclosure.

FIG. 24 is an exemplary graph 2400 illustrating tip velocity and displacement time-histories of the first analyte sensor excited by a voltage amplitude of $V_a$=7.725 V at f=57 kHz. Blocks 2404 and 2408 represent tip velocity and displacement time-histories of the first analyte sensor over two different times. In an aspect, the first analyte sensor operates in the intermittency type-IV. The intermittency type-IV (switching intermittency) was observed in the oscillations of the first analyte sensor. It is characterized by stretches of laminar flow in the vicinity of a ghost orbit interrupted at irregular interval by bursts. The bursts do not involve irregular motions as other intermittencies do. Instead, the bursts are arrested by a contracting orbit where they spend irregular intervals of time before being re-injected into the area of the ghost orbit. During experiments, contraction is provided by impacts of the sensor tip with the substrate, and re-injection is noise-induced. FIG. 24 shows the time histories of the velocity and displacement collected over 0.57 million cycles of excitation under the voltage waveform to $V_{ac}=V_{dc}$=7.725V and f=57 kHz. The sensor spent extended periods of time on a chaotic attractor before returning to the vicinity of the ghost orbit and resuming laminar flow episodes characterized by a time-envelope proportional to nT. The velocity and displacement time-histories show that laminar flow involves free oscillations, while the chaotic attractor involves tapping mode motions. While this pattern was found to persist for a long time, the intervals of time spent in laminar flow and on the chaotic attractor were irregular. Increasing the voltage waveform to $V_a$=7.87V while maintaining the excitation frequency at f=57 kHz increased the average time interval the sensor spends on the chaotic attractor, but did not introduce a major shift in the attractor size.

Figure 25A:
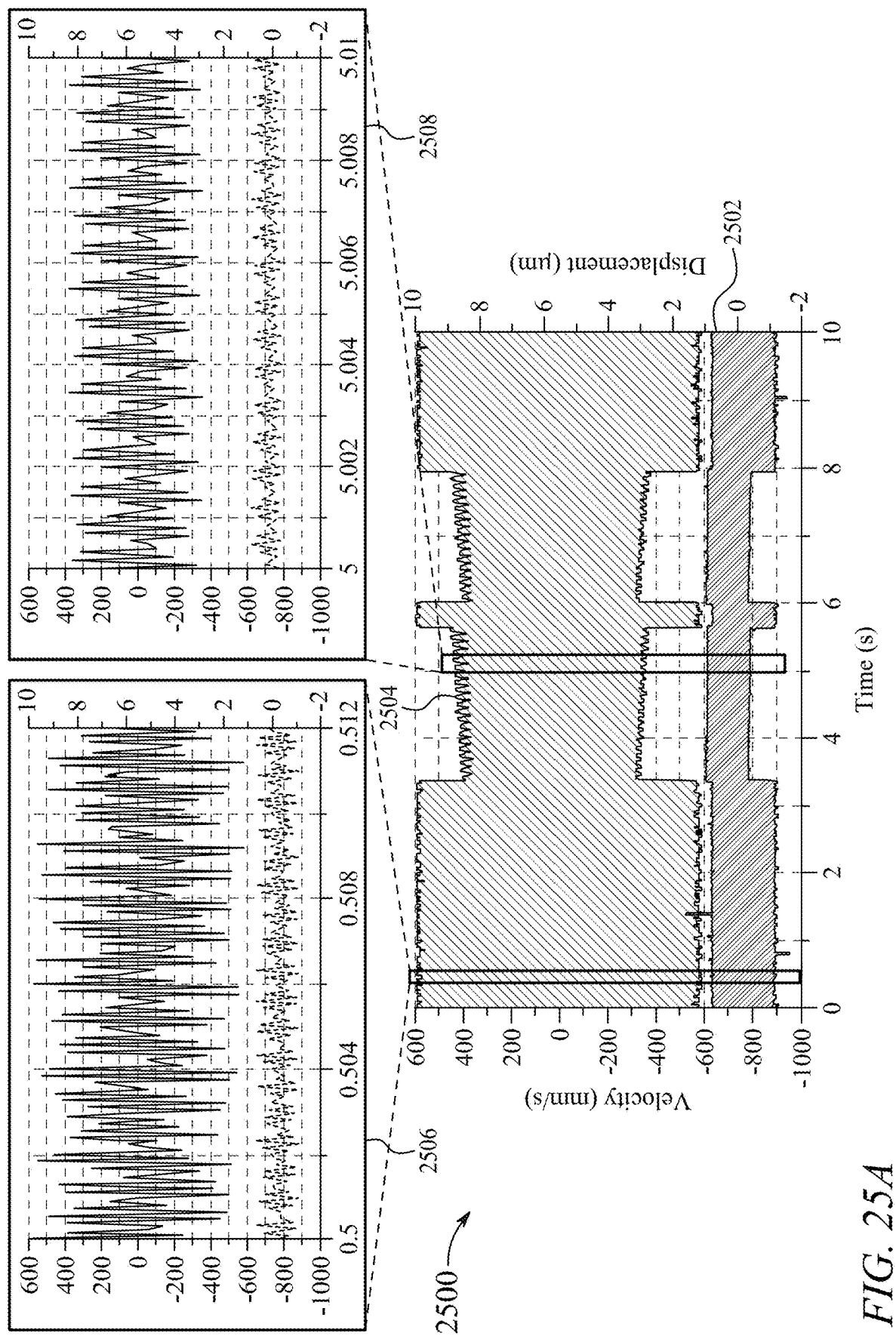
FIG. 25A is an exemplary graph illustrating tip velocity and displacement time-histories of the first analyte sensor excited by $V_a$=7.87 V at f=57 kHz, according to aspects of the present disclosure.

FIG. 25A is an exemplary graph 2500 illustrating a tip velocity and displacement time-histories of the first analyte sensor excited by a voltage amplitude of $V_a$=7.87 V at f=57 kHz. Curve 2502 indicates the displacement and curve 2504 shows the velocity. Blocks 2506 and 2508 represents tip velocity and displacement time-histories of the first analyte sensor over two different times.

Figure 25B:
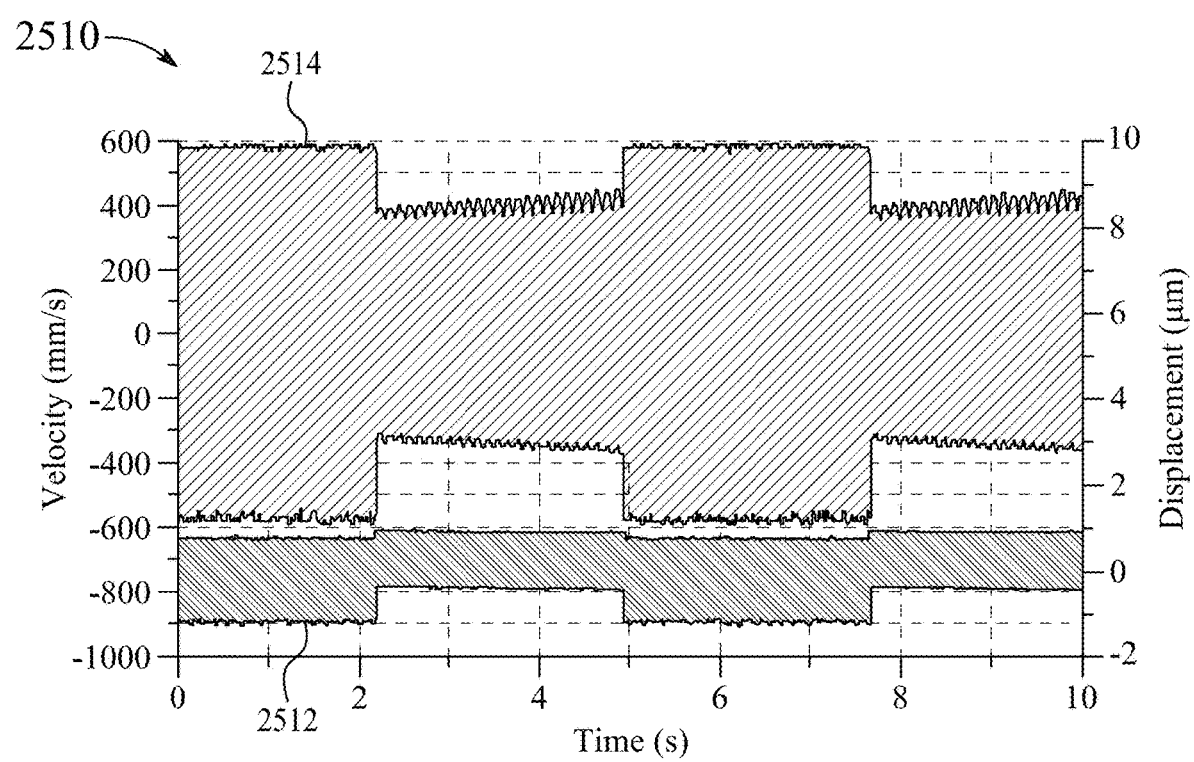
FIG. 25B is another exemplary graph illustrating tip velocity and displacement time-histories of the first analyte sensor excited by $V_a$=7.87 V at f=57 kHz, according to aspects of the present disclosure.

FIG. 25B is another exemplary graph 2510 illustrating a tip velocity and displacement time-histories of the first analyte sensor excited by a voltage amplitude of $V_a$=7.87 V at f=57 kHz. Curve 2512 indicates the displacement and curve 2514 shows the velocity.

FIG. 25A and FIG. 25B represent two independent observations of the first analyte sensor, each composed of 0.57 million excitation cycles, separated by 96 seconds. The velocity and displacement time-history of the sensor tip show recurrent episodes of sudden increase in the displacement and velocity range corresponding to the time stretches occupied by the chaotic attractor.

Figure 26A:
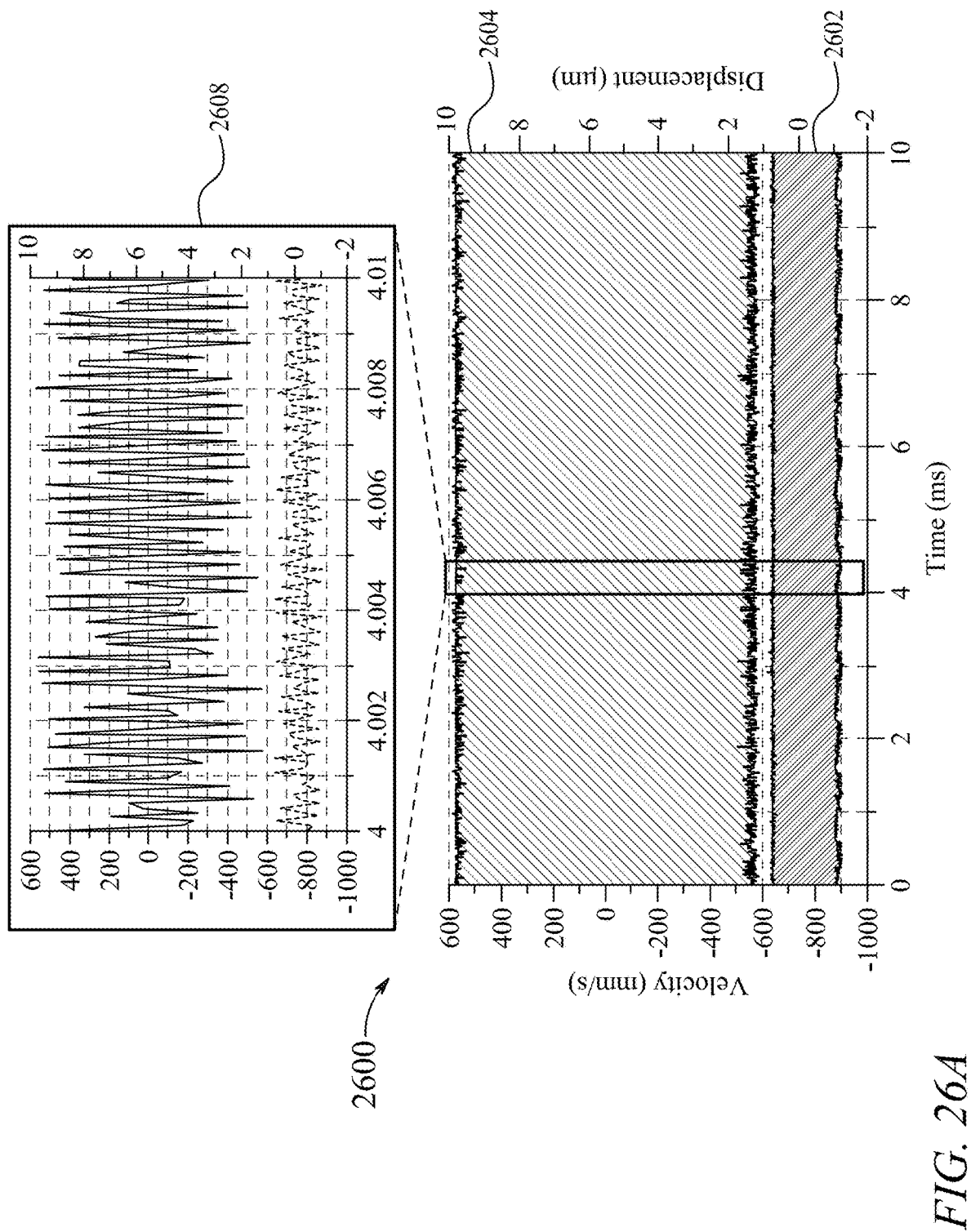
FIG. 26A is an exemplary graph illustrating a tip velocity and displacement time-histories of the first analyte sensor excited by $V_a$=7.87 V at f=58 kHz, according to aspects of the present disclosure.

FIG. 26A is an exemplary graph 2600 illustrating tip velocity and displacement time-histories of the first analyte sensor excited by a voltage amplitude of $V_a$=7.87 V at f=58 kHz. Curve 2602 indicates the displacement, and curve 2604 shows the velocity. Block 2608 represents tip velocity and displacement time-histories of the first analyte sensor over two different times.

Figure 26B:
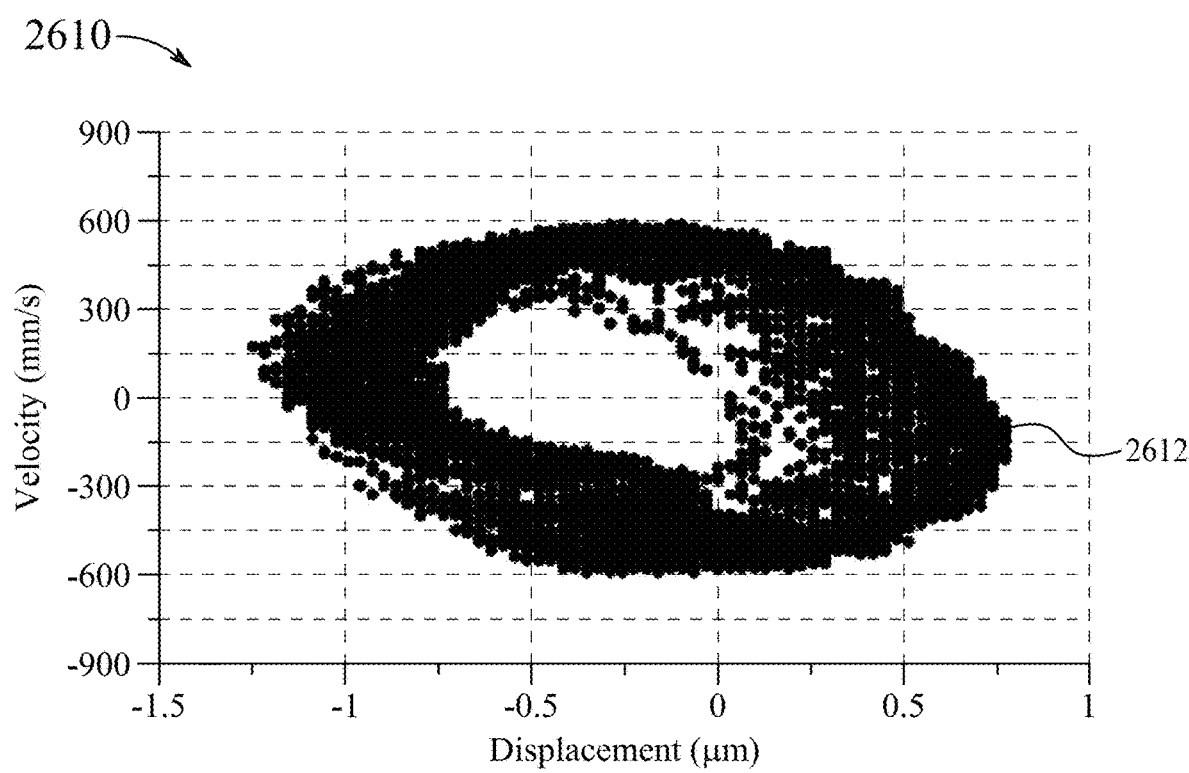
FIG. 26B is an exemplary graph illustrating a phase portrait of the first analyte sensor excited by $V_a$=7.87 V at f=58 kHz, according to aspects of the present disclosure.

The actuator spent more time on the chaotic attractor as the frequency was further increased and evolved into banded chaos at f=58 kHz, as shown in FIG. 26A-FIG. 26B. With a further rise in excitation frequency, the actuator leaves the intermediate branch of the frequency-response curve to the upper branch, where periodic free oscillations exist. FIG. 26B is an exemplary graph illustrating 2610 phase portrait of the first analyte sensor excited by a voltage amplitude of $V_a$=7.87 V at f=58 kHz. Curve 2612 indicates the phase portrait of the first analyte sensor.

The two types of analyte sensors and sensing mechanisms based on detection of linear changes in displacement, amplitude, quality factor, or the frequency shift of a sensor made of a microcantilever have been discussed in the present disclosure. Intermittency is a non-linear phenomenon. In intermittencies, the response is never periodic. Rather, the intermittency is comprised of a laminar phase in which the response is almost periodic but is in fact, progressively drifting away from the apparent "period" and turbulent phases where this almost periodic response is interrupted with completely aperiodic and anharmonic patterns of motion.

In an operative aspect, the micromechanical beam is configured to be actuated electrostatically, electromagnetically, or piezoelectrically and sensed capacitively. The operating point of the analyte sensor is set to a fixed frequency and amplitude corresponding to a periodic motion on the periodic boundary of a region of intermittency. Depending on whether intermittency occurs at lower or higher excitation frequencies, the analyte sensor is designed such that any change in the sensor mass will shift the frequency response of the analyte sensor relative to the frequency spectrum upwards upon a drop in the sensor mass, or downwards upon an increase in the sensor mass, respectively, thereby shifting the operating point into the frequency range where the intermittency prevails. As a result, the sensor response will change from periodic to aperiodic (intermittent) behavior.

Irregular bursts increase as the absolute mass change increase, moving the operating point further into the range of intermittency. Eventually irregular bursts dominate the response and eliminate regularity as the intermittency merges into the chaotic attractor present on the other side of the region of intermittency. The described analyte sensor uses measures of the relative prevalence of almost regular oscillations to irregular bursts as a metric of changes in mass. The upper bound on the mass sensitivity (maximum measurable change in mass) is imposed by the minimum frequency shift required to move the operating point into the chaotic attractor and eliminate regularity.

The present disclosure is configured to focus on a front-end system, where an output signal represents a change in output current in a capacitive measurement (detection) system or change in resistance in a piezoresistive measurement (detection) system. In an aspect, the intermittency-based sensors is configured as either binary or analog sensors.

A first embodiment is illustrated with respect to FIG. 1-FIG. 26. The first embodiment describes the intermittency-based analyte sensor 100. The intermittency-based analyte sensor 100 includes a microcantilever 102, a substrate 110, a plurality of electrodes 126, a contact pad 112, and a microcontroller 130. The microcantilever 102 has a micromechanical beam 104. The micromechanical beam 104 has a fixed end 106 and a free end 108. The substrate 110 is connected to the fixed end 106 of the micromechanical beam 104. The substrate 110 is shaped to have a depressed area which forms a gap below the micromechanical beam 104 between the fixed end 106 and the free end 108. The plurality of electrodes 126 is arranged in the substrate 110 below the micromechanical beam 104. The plurality of electrodes 126 are configured to connect to a biased source of alternating voltage. The frequency of the alternating voltage is in a frequency range which generates intermittencies in a motion of the free end 108. The contact pad 112 is connected to the fixed end 106. The microcontroller 130 is configured to: monitor a frequency response of the micromechanical beam 104, in the frequency range of the alternating voltage which generates intermittencies, over the range of 1,000 10,000 cycles, compare the frequency response to a calibration curve, and provide an alert that an analyte has deposited on the surface of the micromechanical beam 104 when the frequency response is less than a calibrated frequency response in the frequency range of the alternating voltage which generates intermittencies in the motion of the free end 108.

In an aspect, the intermittency-based analyte sensor 100 includes a polymer mixed with ethylene glycol deposited along the micromechanical beam 104, wherein the polymer mixed with ethylene glycol has an affinity to ethanol vapor, wherein the analyte is ethanol vapor.

In an aspect, the intermittency-based analyte sensor 100 includes a diode 118 connected to the contact pad 112 at the fixed end; a capacitor 116 connected to the diode 118; and a first pin and a second pin of the microcontroller 130 connected in parallel with the capacitor 116. The microcontroller 130 is configured to: measure a voltage between the first pin and the second pin over the range of 1,000-10,000 cycles of the alternating voltage which generates intermittencies in the motion of the free end, compare the measured voltage to a calibrated voltage in the frequency range, when the measured voltage is less than the calibrated voltage in the frequency range, determine that the analyte has deposited on the surface of the micromechanical beam 104, and generate the alert.

In an aspect, the microcontroller 130 is configured to: continuously sample a current at the contact pad 112, wherein a sampling rate is at least one order of magnitude higher than the alternating frequency; average the current for at least 10,000 cycles of the alternating voltage and generate an averaged current; calculate a phase angle between the alternating voltage and the averaged current; compare the phase angle to a baseline phase angle on the calibration curve; and generate the alert that an analyte has deposited on the surface of the micromechanical beam 104 when the phase angle is greater than zero.

In an aspect, the intermittency-based analyte sensor 100 includes a first end of a piezoresistor connected to the contact pad 112; a diode 118 connected to a second end of the piezoresistor; a capacitor 116 connected to the diode 118; and a first pin and a second pin of the microcontroller 130 connected in parallel with the capacitor 116; a third pin and a fourth pin of the microcontroller 130 connected in parallel with the piezoresistor. The microcontroller 130 is configured to: apply a constant voltage to the third pin and the fourth pin; measure a voltage between the first pin and the second pin after at least 10,000 cycles of the alternating voltage which generates intermittencies in the motion of the free end, compare the measured voltage to a calibrated voltage in the frequency range, when the measured voltage is less than the calibrated voltage in the frequency range, determine that the analyte has deposited on the surface of the micromechanical beam 104, and generate the alert.

In an aspect, the intermittency-based analyte sensor 100 includes a piezoresistor connected between the contact pad 112 at the fixed end and the microcontroller 130, wherein the microcontroller 130 is configured to: continuously sample a voltage across at the piezoresistor, wherein a sampling rate is at least one order of magnitude higher than the alternating frequency; average the current for at least 10,000 cycles of the alternating voltage and generate an averaged current; calculate a phase angle between the alternating voltage and the averaged current; compare the phase angle to a baseline phase angle on the calibration curve; and generate the alert that an analyte has deposited on the surface of the micromechanical beam 104 when the phase angle is greater than zero.

In an aspect, the intermittencies are one of: a type-I intermittency indicating the presence of non-resonant tapping mode oscillations at a voltage magnitude of 7.78 V, wherein the frequency range is 56 kHz to 56.5 kHz; a type-II intermittency indicating the presence of non-resonant tapping mode oscillations at a voltage magnitude of 7.725 V, wherein the frequency range is 30.93 kHz to 61.8 kHz; a type-III intermittency indicating the presence of non-resonant tapping mode oscillations at a voltage magnitude of 6.8625 V, wherein the frequency range is 26.0 kHz to 30.93 kHz; and a type-IV intermittency indicating the presence of non-resonant tapping mode oscillations at a voltage magnitude of 7.725 V, wherein the frequency range is 56 kHz to 58 kHz.

In an aspect, the intermittency-based analyte sensor 100 includes a circular plate located on the free end of the sensor; and a polymer mixed with ethylene glycol deposited on the circular plate, wherein the polymer mixed with ethylene glycol has affinity to ethanol vapor, wherein the analyte is ethanol vapor.

In an aspect, the intermittency-based analyte sensor 100 includes a diode 118 connected to the contact pad 112 at the fixed end; a capacitor 116 connected to the diode 118; and a first pin and a second pin of the microcontroller 130 connected in parallel with the capacitor 116. The microcontroller 130 is configured to: measure a voltage between the first pin and the second pin after at least 10,000 cycles of the alternating voltage which generates intermittencies in the motion of the free end, compare the measured voltage to a calibrated voltage in the frequency range, when the measured voltage is less than the calibrated voltage in the frequency range, determine that the analyte has deposited on the surface of the micromechanical beam 104, and generate the alert.

In an aspect, the microcontroller 130 is configured to: continuously sample a current at the contact pad 112, wherein a sampling rate is at least one order of magnitude higher than the alternating frequency; average the current for at least 10,000 cycles of the alternating voltage and generate an averaged current; calculate a phase angle between the alternating voltage and the averaged current; compare the phase angle to a baseline phase angle on the calibration curve; and generate the alert by the microcontroller 130 that an analyte has deposited on the surface of the micromechanical beam 104 when the phase angle is greater than zero.

In an aspect, the intermittency-based analyte sensor 100 includes a first end of a piezoresistor 244 connected to the contact pad 112, a diode 118 connected to a second end of the piezoresistor 244, a capacitor 116 connected to the diode 118, and a first pin and a second pin of the microcontroller 130, 230 connected in parallel with the capacitor 116, a third pin and a fourth pin of the microcontroller 130, 230 connected in parallel with the piezoresistor 244. The microcontroller 130 is configured to: apply a constant voltage to the third pin and the fourth pin; measure a voltage between the first pin and the second pin after at least 10,000 cycles of the alternating voltage which generates intermittencies in the motion of the free end, compare the measured voltage to a calibrated voltage in the frequency range, when the measured voltage is less than the calibrated voltage in the frequency range, determine that the analyte has deposited on the surface of the micromechanical beam 104, and generate the alert.

In an aspect, the intermittency-based analyte sensor 100 includes a piezoresistor 244 connected between the contact pad 112 at the fixed end and the microcontroller 130, wherein the microcontroller 130 is configured to: continuously sample a voltage across at the piezoresistor 244, wherein a sampling rate is at least one order of magnitude higher than the alternating frequency; average the current for at least 10,000 cycles of the alternating voltage and generate an averaged current; calculate a phase angle between the alternating voltage and the averaged current; compare the phase angle to a baseline phase angle on the calibration curve; and provide the alert that an analyte has deposited on the surface of the micromechanical beam 104 when the phase angle is greater than zero.

In an aspect, the intermittencies is a type-III intermittency indicating the presence of non-resonant tapping mode oscillations at a voltage magnitude of 7.65 V, wherein the frequency range is 16 kHz to 16.5 kHz.

In an aspect, the contact pad 112 is a gold contact pad located on the substrate 110 at a base of the fixed end of the micromechanical beam 104. The plurality of electrodes 126 are spaced along a length of the substrate below the fixed end and the free end. A second gold contact pad is located over a first electrode in line with the first gold contact and an insulation layer beneath the substrate 110. A DC bias voltage source connected to the plurality of electrodes 126, wherein the biased source of alternating current voltage includes an alternating voltage source connected in series with a DC bias voltage source.

A second embodiment is illustrated with respect to FIG. 1-FIG. 26. The second embodiment describes the method for using an intermittency-based analyte sensor 100. The method further includes applying, with a function generator, an alternating current to a plurality of electrodes 126 located in a substrate 110 below a micromechanical beam 104 of a microcantilever 102, wherein the microcantilever 102 has a fixed end connected to the substrate 110 and a free end, wherein the frequency of the alternating voltage is in a frequency range which generates intermittencies in a motion of the free end; applying, with a voltage supply, a bias voltage to the plurality of electrodes 126; monitoring, with a microcontroller 130, at a contact pad 112 located beneath the fixed end, a frequency response of the micromechanical beam 104, in the frequency range of the alternating voltage which generates intermittencies, over at least 10,000 cycles, comparing, by the microcontroller 130, the frequency response to a calibration curve, and providing, by the microcontroller 130, an alert that an analyte has deposited on the surface of the micromechanical beam 104 when the frequency response is less than a calibrated frequency response in the frequency range of the alternating voltage which generates intermittencies in the motion of the free end.

In an aspect, the method further includes depositing a polymer mixed with ethylene glycol at one of positions along the micromechanical beam 104 and on a circular plate on the free end, wherein the polymer mixed with ethylene glycol has affinity to ethanol vapor, wherein the analyte is ethanol vapor; connecting a diode 118 to the contact pad 112 at the fixed end; connecting a capacitor 116 to the diode 118; and measuring, with the microcontroller 130, a voltage across the capacitor 116 over the range of 1,000-10,000 cycles of the alternating voltage which generates intermittencies in the motion of the free end, comparing the measured voltage to a calibrated voltage in the frequency range, when the measured voltage is less than the calibrated voltage in the frequency range, determining that the analyte has deposited on the surface of the micromechanical beam 104, and generating the alert.

In an aspect, the method further includes depositing a polymer mixed with ethylene glycol at one of positions along the micromechanical beam 104 and on a circular plate on the free end, wherein the polymer mixed with ethylene glycol has affinity to ethanol vapor, wherein the analyte is ethanol vapor; continuously sampling, with the microcontroller 130, a current at the contact pad 112, wherein a sampling rate is at least one order of magnitude higher than the alternating frequency; averaging, with the microcontroller 130, the current for at least 10,000 cycles of the alternating voltage and generate an averaged current; calculating, with the microcontroller 130, a phase angle between the alternating voltage and the averaged current; comparing, with the microcontroller 130, the phase angle to a baseline phase angle on the calibration curve; and generating, with the microcontroller 130, the alert that an analyte has deposited on the surface of the micromechanical beam 104 when the phase angle is greater than zero.

In an aspect, the method further includes depositing a polymer mixed with ethylene glycol at one of positions along the micromechanical beam 104 and on a circular plate on the free end, wherein the polymer mixed with ethylene glycol has affinity to ethanol vapor, wherein the analyte is ethanol vapor; connecting a first end of a piezoresistor to the contact pad 112; connecting a diode 118 to a second end of the piezoresistor; connecting a capacitor 116 to the diode 118; and measuring, with the microcontroller 130, a voltage across the capacitor 116 over the range of 1,000-10,000 cycles of the alternating voltage which generates intermittencies in the motion of the free end. The method further includes comparing the measured voltage to a calibrated voltage in the frequency range, when the measured voltage is less than the calibrated voltage in the frequency range, determining that the analyte has deposited on the surface of the micromechanical beam 104, and generating the alert.

In an aspect, the method further includes depositing a polymer mixed with ethylene glycol at one of positions along the micromechanical beam 104 and on a circular plate on the free end, wherein the polymer mixed with ethylene glycol has affinity to ethanol vapor, wherein the analyte is ethanol vapor; connecting a first end of a piezoresistor to the contact pad 112; continuously sampling, with the microcontroller 130, a current at the contact pad 112, wherein a sampling rate is at least one order of magnitude higher than the alternating frequency; averaging, with the microcontroller 130, the current for at least 10,000 cycles of the alternating voltage and generate an averaged current; calculating, with the microcontroller 130, a phase angle between the alternating voltage and the averaged current; comparing, with the microcontroller 130, the phase angle to a baseline phase angle on the calibration curve; and generating, with the microcontroller 130, the alert that an analyte has deposited on the surface of the micromechanical beam 104 when the phase angle is greater than zero.

A third embodiment is illustrated with respect to FIG. 1-FIG. 26. The third embodiment describes method for calibrating an intermittency based analyte sensor 100. The method includes applying, with a function generator, a first alternating voltage having a first amplitude to a plurality of electrodes 126 located in a substrate 110 below a micromechanical beam 104 of a microcantilever 102, wherein the microcantilever 102 has a fixed end connected to the substrate 110 and a free end, wherein a first frequency of the first alternating voltage is swept over a first frequency range from five kHz to 90 kHz. The method includes measuring, with a vibrometer, a first displacement of a tip of the micromechanical beam 104 in response to the first alternating current. The method includes monitoring, with a CCD video camera, changes in a first frequency response of the free end due to the first alternating current and recording, with an oscilloscope, a first velocity of the free end. The method includes detecting a second frequency range in which intermittencies in the first frequency response are found, recording, in a database, a baseline calibration curve of the first amplitude and a baseline phase of a second frequency response in the second frequency range in which the intermittencies are found, exposing the intermittency-based analyte sensor 100 to a source of analyte, generating a biased alternating current by increasing, with a voltage generator, an amplitude of the first alternating current, sweeping, with the function generator, the biased alternating current over a third frequency range from 10 KHz below the second frequency range in which the intermittencies were found to 10 KHz above the second frequency range in which the intermittencies were found, measuring, with the vibrometer, a second displacement of a tip of the micromechanical beam 104 in response to the biased alternating current, monitoring, with the CCD video camera, changes in the second displacement of the free end due to the biased alternating current, and recording, with the oscilloscope, a second velocity of the free end. The method includes detecting a third frequency range in which intermittencies in the second frequency response are found, determining a phase of the third frequency range, comparing, by a microcontroller connected to the database, the function generator, the source of biased voltage, the vibrometer, the CCD camera and the oscilloscope, the phase of the third frequency range to the phase of the second frequency range, generating, by the microcontroller, an analyte calibration curve of the biased amplitude and the phase of the third frequency range, and providing the third frequency range and the biased amplitude to intermittency based analyte sensor 100 as operating parameters.

Next, further details of the hardware description of the computing environment of FIG. 1 according to exemplary embodiments is described with reference to FIG. 27.

Figure 27:
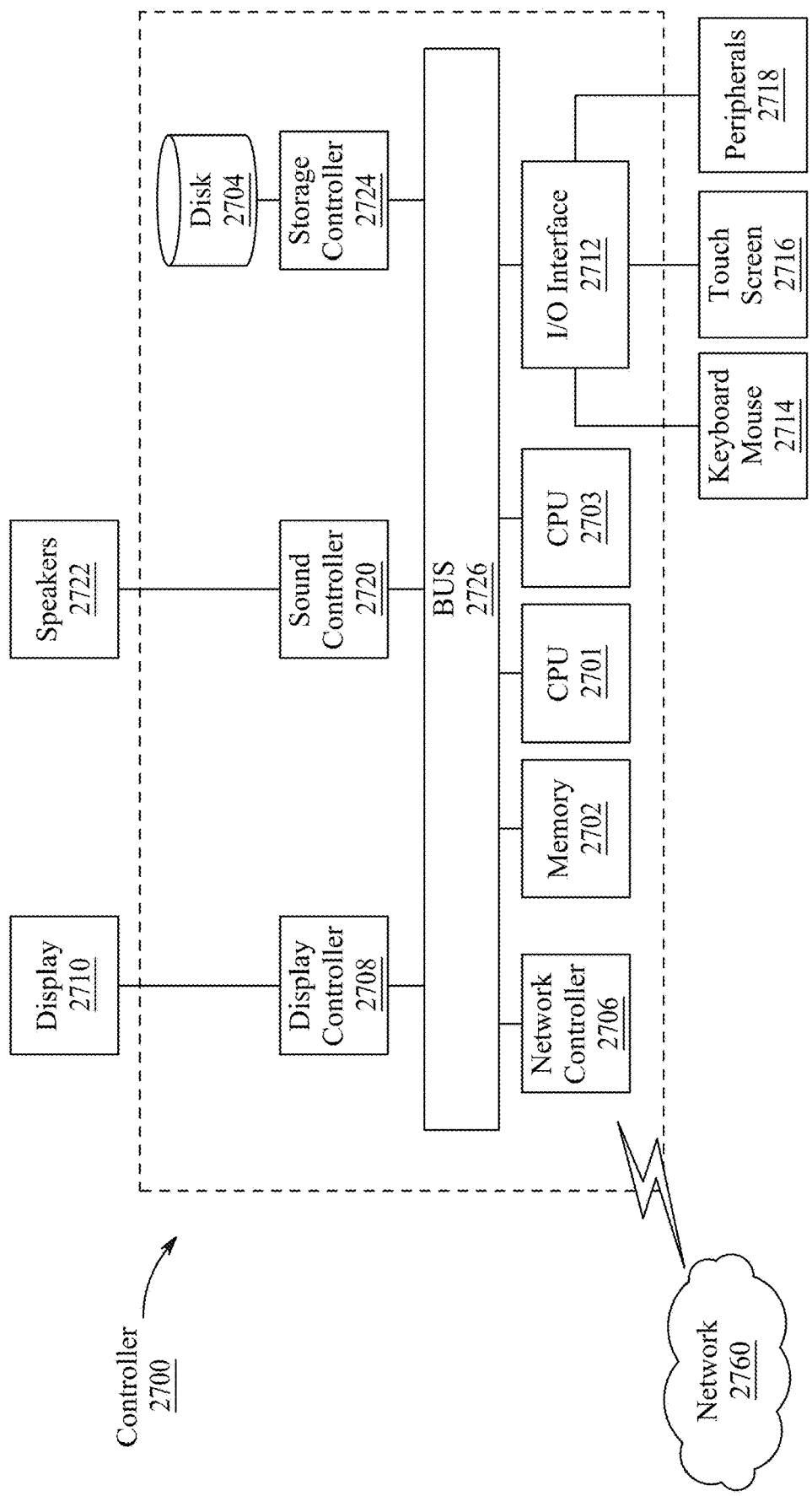
FIG. 27 is an illustration of a non-limiting example of details of computing hardware used in the computing system, according to aspects of the present disclosure.

In FIG. 27, a controller 2700 is described as representative of the intermittency-based analyte sensor 100 of FIG. 1 in which the microcontroller 130 is a computing device which includes a CPU 2701 which performs the processes described above/below. FIG. 27 is an illustration of a non-limiting example of details of computing hardware used in the computing system, according to exemplary aspects of the present disclosure. In FIG. 27, a controller 2700 is described which is a computing device (that includes the microcontroller 130) and includes a CPU 2701 which performs the processes described above/below. The process data and instructions may be stored in memory 2702. These processes and instructions may also be stored on a storage medium disk 2704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 2701, 2703 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 2701 or CPU 2703 may be a Xenon or Core processor from Intel of America or an Opteron processor from AMD of America, or may be other processor types that would be recognized by one of ordinary skill in the art. Alternatively, the CPU 2701, 2703 may be implemented on an FPGA, ASIC, PLD or using discrete logic circuits, as one of the ordinary skill in the art would recognize. Further, CPU 2701, 2703 may be implemented as multiple processors cooperatively working in parallel to perform the instructions of the inventive processes described above.

The computing device in FIG. 27 also includes a network controller 2706, such as an Intel Ethernet PRO network interface card from Intel Corporation of America, for interfacing with network 2760. As can be appreciated, the network 2760 can be a public network, such as the Internet, or a private network such as an LAN or WAN network, or any combination thereof and can also include PSTN or ISDN sub-networks. The network 2760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 2708, such as a NVIDIA Geforce GTX or Quadro graphics adaptor from NVIDIA Corporation of America for interfacing with display 2710, such as a Hewlett Packard HPL2445w LCD monitor. A general purpose I/O interface 2712 interfaces with a keyboard and/or mouse 2714 as well as a touch screen panel 2716 on or separate from display 2710. General purpose I/O interface also connects to a variety of peripherals 2718 including printers and scanners, such as an OfficeJet or DeskJet from Hewlett Packard.

A sound controller 2720 is also provided in the computing device such as Sound Blaster X-Fi Titanium from Creative, to interface with speakers/microphone 2722 thereby providing sounds and/or music.

The general-purpose storage controller 2724 connects the storage medium disk 2704 with communication bus 2726, which may be an ISA, EISA, VESA, PCI, or similar, for interconnecting all of the components of the computing device. A description of the general features and functionality of the display 2710, keyboard and/or mouse 2714, as well as the display controller 2708, storage controller 2724, network controller 2706, sound controller 2720, and general purpose I/O interface 2712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 28.

Figure 28:
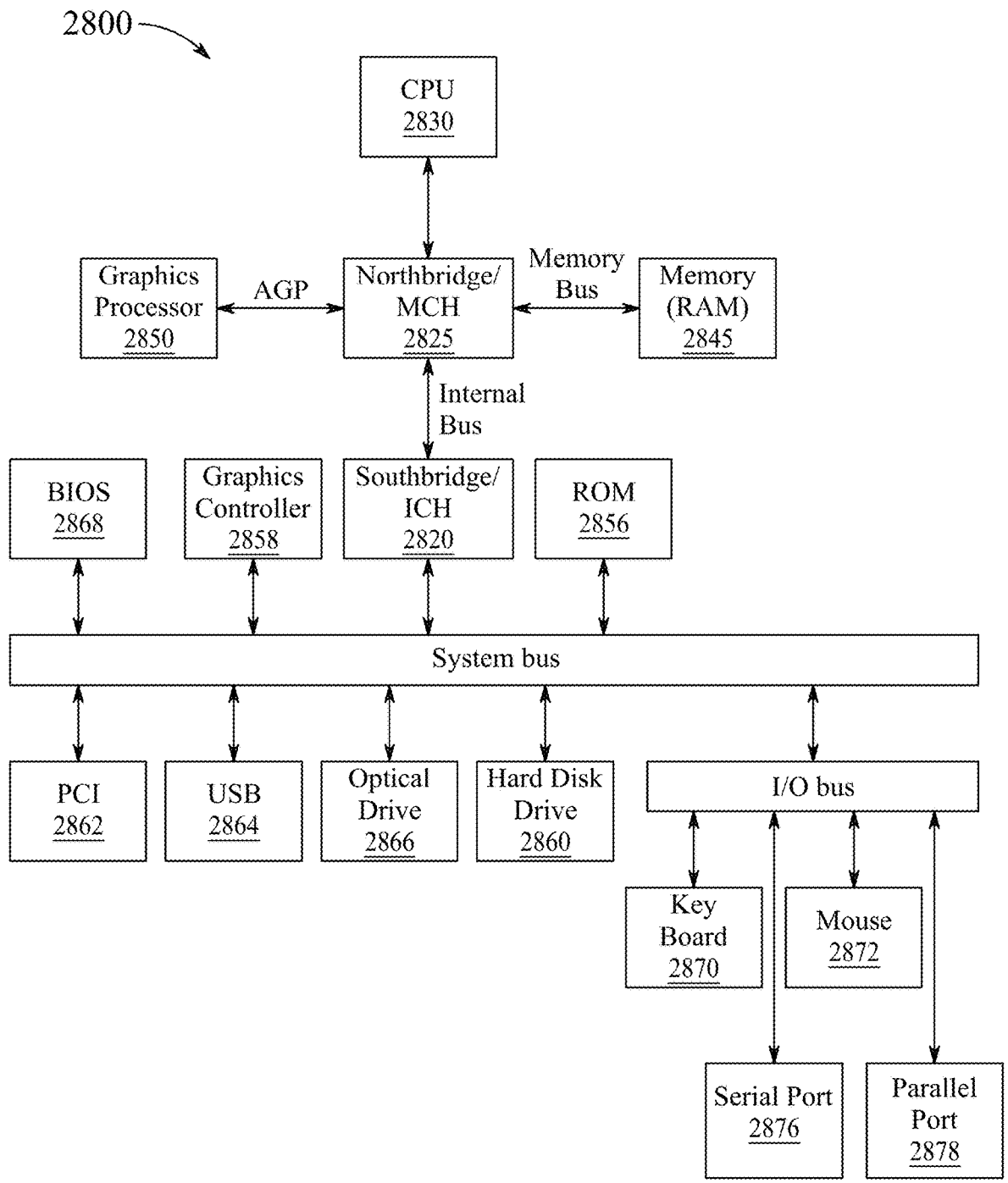
FIG. 28 is an exemplary schematic diagram of a data processing system used within the computing system, according to aspects of the present disclosure.

FIG. 28 shows a schematic diagram of a data processing system 2800 used within the computing system, according to exemplary aspects of the present disclosure. The data processing system 2800 is an example of a computer in which code or instructions implementing the processes of the illustrative aspects of the present disclosure may be located.

In FIG. 28, data processing system 2880 employs a hub architecture including a north bridge and memory controller hub (NB/MCH) 2825 and a south bridge and input/output (I/O) controller hub (SB/ICH) 2820. The central processing unit (CPU) 2830 is connected to NB/MCH 2825. The NB/MCH 2825 also connects to the memory 2845 via a memory bus, and connects to the graphics processor 2850 via an accelerated graphics port (AGP). The NB/MCH 2825 also connects to the SB/ICH 2820 via an internal bus (e.g., a unified media interface or a direct media interface). The CPU Processing unit 2830 may contain one or more processors and even may be implemented using one or more heterogeneous processor systems.

Figure 29:
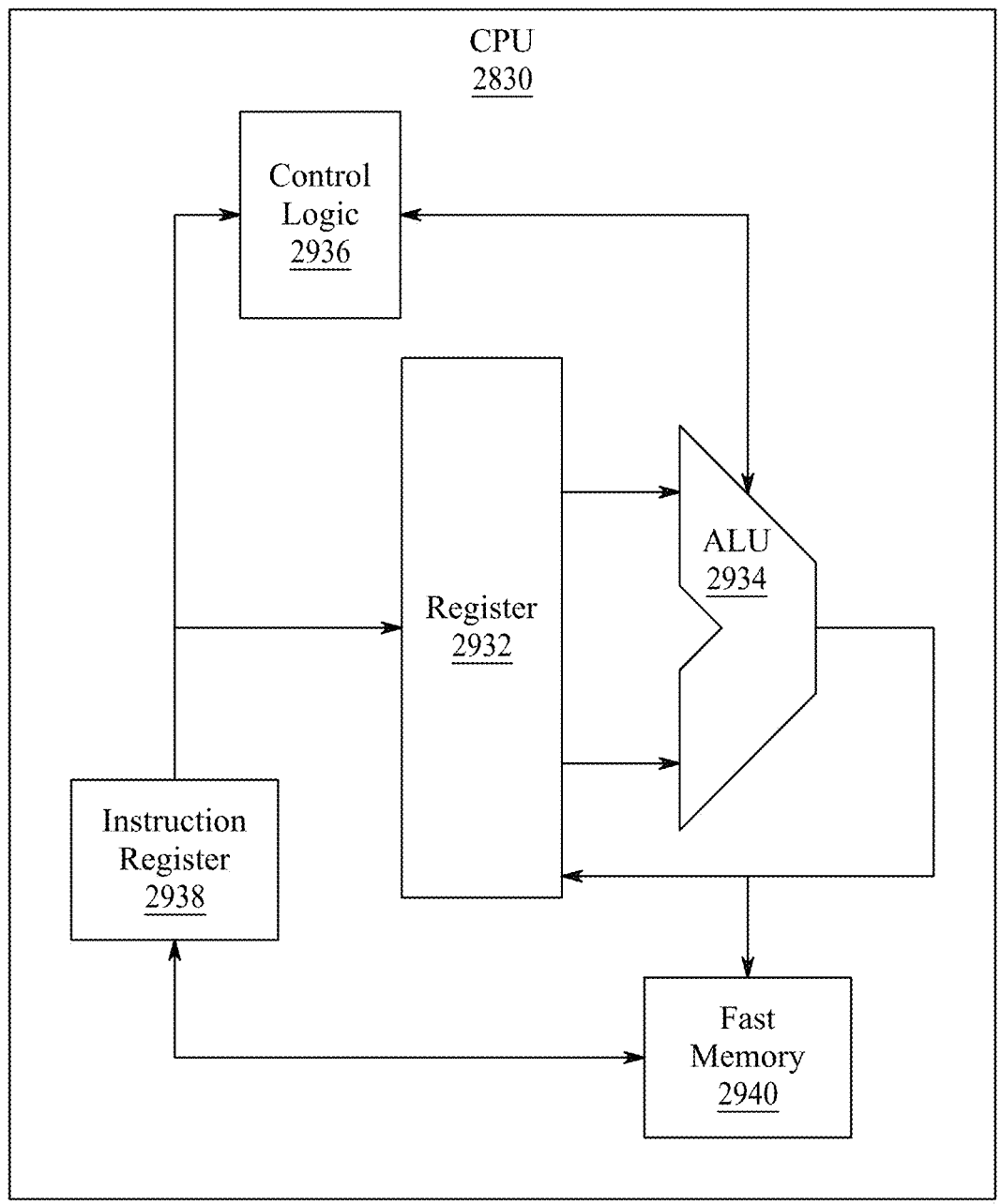
FIG. 29 is an exemplary schematic diagram of a processor used with the computing system, according to aspects of the present disclosure.

For example, FIG. 29 shows one aspects of the present disclosure of CPU 2830. In one aspects of the present disclosure, the instruction register 2938 retrieves instructions from the fast memory 2940. At least part of these instructions is fetched from the instruction register 2938 by the control logic 2936 and interpreted according to the instruction set architecture of the CPU 2830. Part of the instructions can also be directed to the register 2932. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 2934 that loads values from the register 2932 and performs logical and mathematical operations on the loaded values according to the instructions. The results from these operations can be feedback into the register and/or stored in the fast memory 2940. According to certain aspects of the present disclosures, the instruction set architecture of the CPU 2830 can use a reduced instruction set architecture, a complex instruction set architecture, a vector processor architecture, a very large instruction word architecture. Furthermore, the CPU 2830 can be based on the Von Neuman model or the Harvard model. The CPU 2830 can be a digital signal processor, an FPGA, an ASIC, a PLA, a PLD, or a CPLD. Further, the CPU 2830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 28, the data processing system 2880 can include that the SB/ICH 2820 is coupled through a system bus to an I/O Bus, a read only memory (ROM) 2856, universal serial bus (USB) port 2864, a flash binary input/output system (BIOS) 2868, and a graphics controller 2858. PCI/PCIe devices can also be coupled to SB/ICH 2820 through a PCI bus 2862.

The PCI devices may include, for example, Ethernet adapters, add-in cards, and PC cards for notebook computers. The Hard disk drive 2860 and CD-ROM 2856 can use, for example, an integrated drive electronics (IDE) or serial advanced technology attachment (SATA) interface. In one aspect of the present disclosure the I/O bus can include a super I/O (SIO) device.

Further, the hard disk drive (HDD) 2860 and optical drive 2866 can also be coupled to the SB/ICH 2820 through a system bus. In one aspects of the present disclosure, a keyboard 2870, a mouse 2872, a parallel port 2878, and a serial port 2876 can be connected to the system bus through the I/O bus. Other peripherals and devices that can be connected to the SB/ICH 2820 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 30:
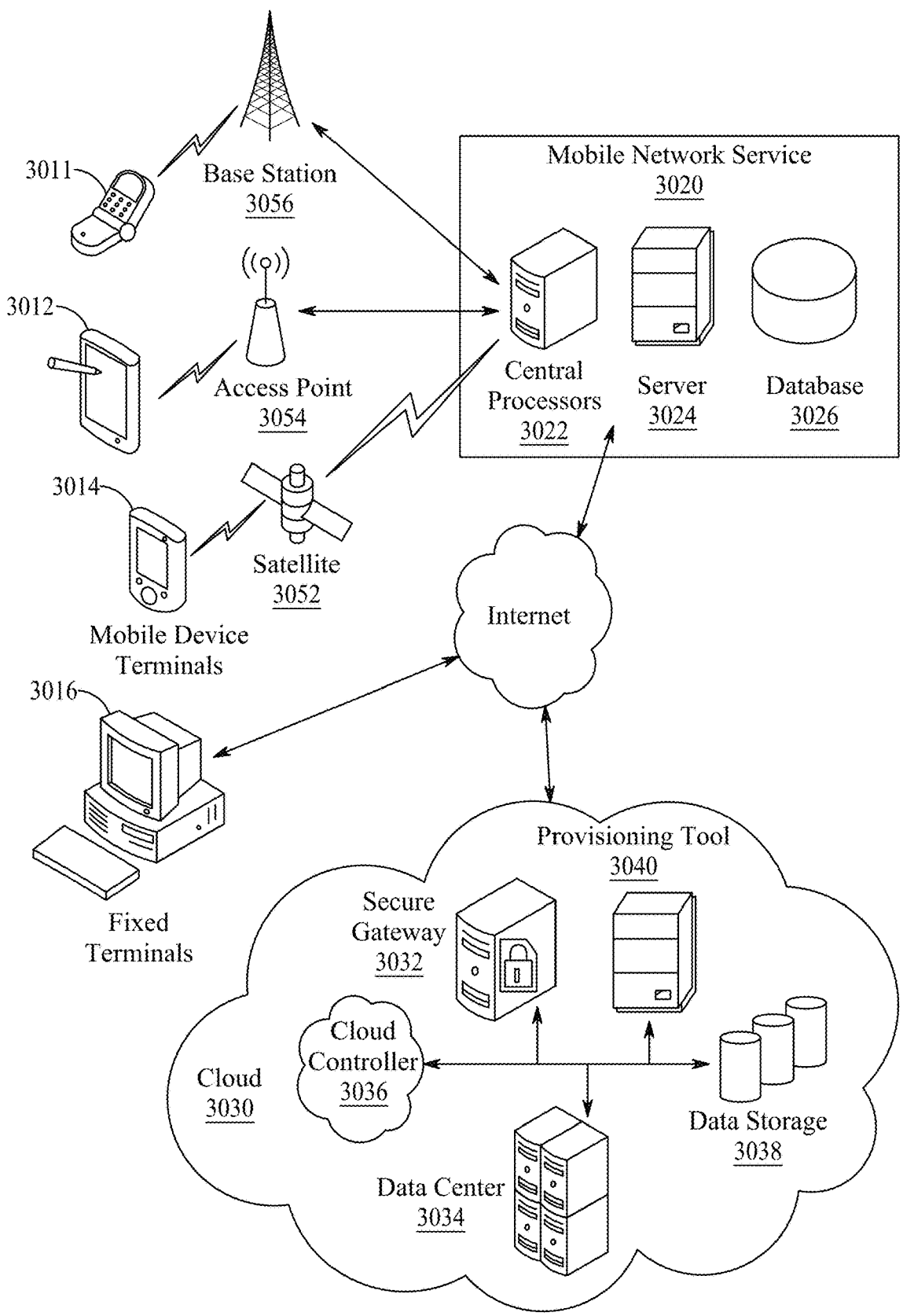
FIG. 30 is an illustration of a non-limiting example of distributed components that may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 30, in addition to various human interface and communication devices (e.g., display monitors, smart phones, tablets, personal digital assistants (PDAs)). More specifically, FIG. 30 illustrates client devices including smart phone 3011, tablet 3012, mobile device terminal 3014 and fixed terminals 3016. These client devices may be commutatively coupled with a mobile network service 3020 via base station 3056, access point 3054, satellite 3052 or via an internet connection. Mobile network service 3020 may comprise central processors 3022, server 3024 and database 3026. Fixed terminals 3016 and mobile network service 3020 may be commutatively coupled via an internet connection to functions in cloud 3030 that may comprise security gateway 3032, data center 3034, cloud controller 3036, data storage 3038 and provisioning tool 3040. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the disclosure may be practiced otherwise than as specifically described herein.

The invention claimed is:
1. An intermittency-based analyte sensor, comprising:
a microcantilever having a micromechanical beam, wherein the micromechanical beam has a fixed end and a free end, wherein a surface of the micromechanical beam is configured to receive a deposit of a target analyte;
a substrate connected to the fixed end of the micromechanical beam, wherein the substrate is shaped to have a depressed area which forms a gap below the micromechanical beam between the fixed end and the free end;
a plurality of electrodes arranged in the substrate below the micromechanical beam, wherein the plurality of electrodes are configured to connect to a biased source of alternating voltage, wherein a frequency of the biased source of alternating voltage is in a frequency range which generates intermittencies in a motion of the free end;
a contact pad connected to the fixed end; and
a microcontroller connected to the plurality of electrodes, wherein the microcontroller includes an electrical circuitry, a memory having program instructions and a calibration curve which includes frequency responses in the frequency range which generates intermittencies in the motion of the free end, and at least one processor configured to execute the program instructions to:
monitor the frequency responses of the micromechanical beam in the frequency range of the alternating voltage which generates intermittencies, over a range selected from 1,000 cycles to 10,000 cycles,
average the frequency responses of the micromechanical beam over the range selected from 1,000 cycles to 10,000 cycles,
compare the average of the frequency responses to the frequency responses of the calibration curve, and
provide an alert that the target analyte has deposited on the surface of the micromechanical beam when the average of the frequency responses is less than a voltage of the frequency responses of the calibration curve in the frequency range which generates intermittencies in the motion of the free end.

2. The intermittency-based analyte sensor of claim 1, further comprising:
a polymer mixed with ethylene glycol deposited along the micromechanical beam, wherein the polymer mixed with ethylene glycol has affinity to ethanol vapor, wherein the target analyte is ethanol vapor.

3. The intermittency-based analyte sensor of claim 2, further comprising:
a diode connected to the contact pad at the fixed end;
a capacitor connected to the diode; and
a first pin and a second pin of the microcontroller connected in parallel with the capacitor, wherein the microcontroller is configured to:
measure a voltage of the capacitor after the capacitor is charged for a number of cycles selected from the range of 1,000 cycles to 10,000 cycles of the alternating voltage which generates intermittencies in the motion of the free end,
compare the measured voltage to a voltage of the frequency responses of the calibration curve,
when the measured voltage is less than the voltage of the frequency responses of the calibration curve,
determine that the target analyte has deposited on the surface of the micromechanical beam, and
generate the alert.

4. The intermittency-based analyte sensor of claim 2, wherein the microcontroller is configured to:
continuously sample a current at the contact pad, wherein a sampling rate is at least one order of magnitude higher than the alternating frequency;
average the current over the range selected from 1,000 cycles to 10,000 cycles of the alternating voltage and generate an averaged current;
calculate a phase angle between the alternating voltage and the averaged current;
compare the phase angle to a baseline phase angle of the frequency responses of the calibration curve; and
generate the alert that the target analyte has deposited on the surface of the micromechanical beam when the phase angle is greater than zero.

5. The intermittency-based analyte sensor of claim 2, further comprising:
a first end of a piezoresistor connected to the contact pad;
a diode connected to a second end of the piezoresistor;
a capacitor connected to the diode; and
a first pin and a second pin of the microcontroller connected in parallel with the capacitor;
a third pin and a fourth pin of the microcontroller connected in parallel with the piezoresistor, wherein the microcontroller is configured to:
apply a constant voltage to the third pin and the fourth pin;
measure a voltage between the first pin and the second pin after number of cycles selected from the range of 1,000 cycles to 10,000 cycles of the alternating voltage which generates intermittencies in the motion of the free end,
compare the measured voltage to a calibrated voltage in the frequency range,
when the measured voltage is less than the calibrated voltage of the frequency responses of the calibration curve,
determine that the target analyte has deposited on the surface of the micromechanical beam, and
generate the alert.

6. The intermittency-based analyte sensor of claim 2, further comprising:
a piezoresistor connected between the contact pad at the fixed end and the microcontroller, wherein the microcontroller is configured to:
continuously sample a voltage across the piezoresistor, wherein a sampling rate is at least one order of magnitude higher than the alternating frequency;
average the current for a number of cycles selected from the range of 1,000-10,000 cycles of the alternating voltage and generate an averaged current;
calculate a phase angle between the alternating voltage and the averaged current;
compare the phase angle to a baseline phase angle of the frequency responses of the calibration curve; and
generate the alert that the target analyte has deposited on the surface of the micromechanical beam when the phase angle is greater than zero.

7. The intermittency-based analyte sensor of claim 2, wherein the intermittencies are one of:
a type-I intermittency indicating the presence of non-resonant tapping mode oscillations at a voltage magnitude of 7.78 V, wherein the frequency range is 56 kHz to 56.5 kHz;
a type-II intermittency indicating the presence of non-resonant tapping mode oscillations at a voltage magnitude of 7.725 V, wherein the frequency range is 30.93 kHz to 61.8 kHz;
a type-III intermittency indicating the presence of non-resonant tapping mode oscillations at a voltage magnitude of 6.8625 V, wherein the frequency range is 26.0 kHz to 30.93 kHz; and
a type-IV intermittency indicating the presence of non-resonant tapping mode oscillations at a voltage magnitude of 7.725 V, wherein the frequency range is 56 kHz to 58 kHz.

8. The intermittency-based analyte sensor of claim 1, further comprising:
a circular plate located on the free end of the micromechanical beam; and
a polymer mixed with ethylene glycol deposited on the circular plate, wherein the polymer mixed with ethylene glycol has affinity to ethanol vapor, wherein the target analyte is ethanol vapor.

9. The intermittency-based analyte sensor of claim 8, further comprising:
a diode connected to the contact pad at the fixed end;
a capacitor connected to the diode; and
a first pin and a second pin of the microcontroller connected in parallel with the capacitor, wherein the microcontroller is configured to:
measure a voltage between the first pin and the second pin after a number of cycles selected from the range of 1,000 cycles to 10,000 cycles of the alternating voltage which generates intermittencies in the motion of the free end,
compare the measured voltage to a calibrated voltage of the frequency responses of the calibration curve,
when the measured voltage is less than the calibrated voltage of the frequency responses of the calibration curve,
determine that the target analyte has deposited on the surface of the micromechanical beam, and
generate the alert.

10. The intermittency-based analyte sensor of claim 9, wherein the microcontroller is configured to:
continuously sample a current at the contact pad, wherein a sampling rate is at least one order of magnitude higher than the alternating frequency;
average the current over the range selected from 1,000 cycles to 10,000 cycles of the alternating voltage and generate an averaged current;
calculate a phase angle between the alternating voltage and the averaged current;
compare the phase angle to a baseline phase angle of the frequency responses of the calibration curve; and
generate the alert that the target analyte has deposited on the surface of the micromechanical beam when the phase angle is greater than zero.

11. The intermittency-based analyte sensor of claim 8, further comprising:
a first end of a piezoresistor connected to the contact pad;
a diode connected to a second end of the piezoresistor;
a capacitor connected to the diode; and
a first pin and a second pin of the microcontroller connected in parallel with the capacitor;
a third pin and a fourth pin of the microcontroller connected in parallel with the piezoresistor, wherein the microcontroller is configured to:
apply a constant voltage to the third pin and the fourth pin,
measure a voltage between the first pin and the second pin after a number of cycles selected from the range of 1,000 cycles to 10,000 cycles of the alternating voltage which generate intermittencies in the motion of the free end,
compare the measured voltage to a calibrated voltage in the frequency range,
when the measured voltage is less than the calibrated voltage of the frequency responses of the calibration curve,
determine that the target analyte has deposited on the surface of the micromechanical beam, and
generate the alert.

12. The intermittency-based analyte sensor of claim 8, further comprising:
a piezoresistor connected between the contact pad at the fixed end and the microcontroller, wherein the microcontroller is configured to:
continuously sample a voltage across at the piezoresistor, wherein a sampling rate is at least one order of magnitude higher than the alternating frequency;
average the current during the selected number of cycles of the alternating voltage and generate an averaged current;
calculate a phase angle between the alternating voltage and the averaged current;
compare the phase angle to a baseline phase angle of the frequency responses of the calibration curve; and
provide the alert that the target analyte has deposited on the surface of the micromechanical beam when the phase angle is greater than zero.

13. The intermittency-based analyte sensor of claim 8, wherein the intermittencies are a type III intermittency indicating the presence of non-resonant tapping mode oscillations at a voltage magnitude of 7.65 V, wherein the frequency range is 16 kHz to 16.5 kHz.

14. The intermittency-based analyte sensor of claim 1, comprising:
wherein the contact pad is a gold contact pad located on the substrate at a base of the fixed end of the micromechanical beam;
wherein the plurality of electrodes are spaced along a length of the substrate below the fixed end and the free end;
a second gold contact pad located over a first electrode in line with the first gold contact;
an insulation layer beneath the substrate; and
a DC bias voltage source connected to the plurality of electrodes, wherein the biased source of alternating voltage includes an alternating voltage source connected in series with a DC bias voltage source.

15. A method for using an intermittency-based analyte sensor, comprising:
applying, with a function generator, an alternating voltage to a plurality of electrodes located in a substrate below a micromechanical beam of a microcantilever, wherein the microcantilever has a fixed end connected to the substrate and a free end, wherein a frequency of the alternating voltage is in a frequency range which generates intermittencies in a motion of the free end;
applying, with a voltage supply, a bias voltage to the plurality of electrodes;
exposing the micromechanical beam to a target analyte;
monitoring, with a microcontroller connected to the plurality of electrodes, at a contact pad located beneath the fixed end, a frequency response of the micromechanical beam after a number of cycles selected from a range of 1,000 cycles to 10,000 cycles of the alternating voltage which generate intermittencies in the motion of the free end;
averaging the frequency response over the range selected from 1,000 cycles to 10,000 cycles;
comparing, by the microcontroller, the average of the frequency response to a calibration curve which includes frequency responses in the frequency range which generates intermittencies in the motion of the free end; and
providing, by the microcontroller, an alert that the target analyte has deposited on the surface of the micromechanical beam when the average of the frequency response is less than the frequency responses of the calibration curve in the frequency range which generates intermittencies in the motion of the free end.

16. The method of claim 15, further comprising:
depositing a polymer mixed with ethylene glycol at one of positions along the micromechanical beam and on a circular plate on the free end, wherein the polymer mixed with ethylene glycol has affinity to ethanol vapor, wherein the target analyte is ethanol vapor;
connecting a diode to the contact pad at the fixed end;
connecting a capacitor to the diode; and
measuring, with the microcontroller, a voltage across the capacitor after the capacitor is charged for a number of cycles selected from the range of 1,000 cycles to 10,000 cycles of the alternating voltage which generate intermittencies in the motion of the free end;
comparing the measured voltage to a calibrated voltage of the frequency responses of the calibration curve;
when the measured voltage is less than the calibrated voltage of the frequency responses of the calibration curve,
    determining that the target analyte has deposited on the surface of the micromechanical beam, and
generating the alert.

17. The method of claim 15, further comprising:
depositing a polymer mixed with ethylene glycol at one of positions along the micromechanical beam and on a circular plate on the free end, wherein the polymer mixed with ethylene glycol has affinity to ethanol vapor, wherein the target analyte is ethanol vapor;
continuously sampling, with the microcontroller, a current at the contact pad, wherein a sampling rate is at least one order of magnitude higher than the alternating frequency;
averaging, with the microcontroller, the current during the selected number of cycles of the alternating voltage and generating an averaged current;
calculating, with the microcontroller, a phase angle between the alternating voltage and the averaged current;
comparing, with the microcontroller, the phase angle to a baseline phase angle of the frequency responses of the calibration curve; and
generating, with the microcontroller, the alert that the target analyte has deposited on the surface of the micromechanical beam when the phase angle is greater than zero.

18. The method of claim 15, further comprising:
depositing a polymer mixed with ethylene glycol at one of positions along the micromechanical beam and on a circular plate on the free end, wherein the polymer mixed with ethylene glycol has affinity to ethanol vapor, wherein the target analyte is ethanol vapor;
connecting a first end of a piezoresistor to the contact pad;
connecting a diode to a second end of the piezoresistor;
connecting a capacitor to the diode;
    measuring, with the microcontroller, a voltage across the capacitor after a number of cycles selected from the range of 1,000 cycles to 10,000 cycles of the alternating voltage which generate intermittencies in the motion of the free end;
    comparing the measured voltage to a calibrated voltage of the frequency responses of the calibration curve; and
    when the measured voltage is less than the calibrated voltage of the frequency responses of the calibration curve,
        determining that the target analyte has deposited on the surface of the micromechanical beam, and
    generating the alert.

19. The method of claim 18, further comprising:
depositing a polymer mixed with ethylene glycol at one of positions along the micromechanical beam and on a circular plate on the free end, wherein the polymer mixed with ethylene glycol has affinity to ethanol vapor, wherein the target analyte is ethanol vapor;
connecting a first end of a piezoresistor to the contact pad;
continuously sampling, with the microcontroller, a current at the contact pad, wherein a sampling rate is at least one order of magnitude higher than the alternating frequency;
averaging, with the microcontroller, the current during the selected number of cycles of the alternating voltage and generating an averaged current;
calculating, with the microcontroller, a phase angle between the alternating voltage and the averaged current;
comparing, with the microcontroller, the phase angle to a baseline phase angle of the frequency responses of the calibration curve; and
generating, with the microcontroller, the alert that the target analyte has deposited on the surface of the micromechanical beam when the phase angle is greater than zero.

\* \* \* \* \*